(12) United States Patent
Pang et al.

(10) Patent No.: US 9,294,869 B2
(45) Date of Patent: Mar. 22, 2016

(54) METHODS, SYSTEMS AND APPARATUS TO AFFECT RF TRANSMISSION FROM A NON-LINKED WIRELESS CLIENT

(71) Applicants: Hawk Yin Pang, San Jose, CA (US); Thomas Alan Donaldson, Nailsworth (GB)

(72) Inventors: Hawk Yin Pang, San Jose, CA (US); Thomas Alan Donaldson, Nailsworth (GB)

(73) Assignee: Aliphcom, San Francisco, CA (US)

( * ) Notice: Subject to any disclaimer, the term of this patent is extended or adjusted under 35 U.S.C. 154(b) by 0 days.

(21) Appl. No.: 14/144,517

(22) Filed: Dec. 30, 2013

(65) Prior Publication Data

US 2015/0189461 A1 Jul. 2, 2015

(51) Int. Cl.
*H04B 5/00* (2006.01)
*H04W 4/00* (2009.01)
*H04W 76/02* (2009.01)
*H04W 84/12* (2009.01)
*H04W 88/06* (2009.01)

(52) U.S. Cl.
CPC ............ *H04W 4/008* (2013.01); *H04W 76/023* (2013.01); *H04W 84/12* (2013.01); *H04W 88/06* (2013.01)

(58) Field of Classification Search
CPC ....... H04W 4/008; H04W 76/023; H04B 5/00
USPC ........ 455/41.1, 41.2, 41.3, 556.1, 552.1, 557, 455/67.11
See application file for complete search history.

(56) References Cited

U.S. PATENT DOCUMENTS 6,069,587 A 5/2000 Lynch et al.
6,194,981 B1 2/2001 Henderson et al.
(Continued)

FOREIGN PATENT DOCUMENTS

JP 2003/188639 A2 7/2003
KR 10-0743100 B1 7/2007
(Continued)

OTHER PUBLICATIONS

Copenheaver, Blaine R., Notification of Transmittal of the International Search Report and the Written Opinion of the International Searching Authority (International Publication No. WO 2015/013726 mailed Nov. 14, 2014), International Searching Authority.
(Continued)

*Primary Examiner* — Marceau Milord
(74) *Attorney, Agent, or Firm* — Kokka & Backus, PC

(57) ABSTRACT

Embodiments of the present application relate generally to wireless electronics, wireless portable electronics, wireless media presentation devices, audio/video systems, and more specifically to passive or active RF proximity detection of wireless client devices in an environment that may or may not include wireless access points. A wireless client device may be forced, triggered, or configured to broadcast a wireless scan (e.g., an active WiFi scan) that includes data (e.g., packets) that may be discovered by a wireless media device (e.g., received by RF circuitry in the media device) and information from the wireless scan may be used by the wireless media device to detect presence of the wireless client device and/or its user, to establish a wireless data communications link with the wireless client device, to determine proximity of the wireless client device to the wireless media device, and for near field communication (NFC) with the wireless client device.

20 Claims, 32 Drawing Sheets

(56) References Cited

U.S. PATENT DOCUMENTS

| | | | |
|---|---|---|---|
| 6,633,281 B2 | 10/2003 | Lin et al. | |
| 6,911,952 B2 | 6/2005 | Sievenpiper et al. | |
| 7,065,382 B2 | 6/2006 | Alanara et al. | |
| 7,099,676 B2 * | 8/2006 | Law et al. | 455/456.6 |
| 7,132,973 B2 | 11/2006 | Jindal | |
| 7,330,156 B2 | 2/2008 | Arkko et al. | |
| 7,450,072 B2 | 11/2008 | Kim et al. | |
| 7,636,554 B2 | 12/2009 | Sugar et al. | |
| 7,653,883 B2 | 1/2010 | Hotelling | |
| 7,714,783 B2 | 5/2010 | Niu et al. | |
| 7,826,346 B2 | 11/2010 | Seki et al. | |
| 7,843,327 B1 | 11/2010 | DiMartino et al. | |
| 7,890,661 B2 | 2/2011 | Spurgat | |
| 7,979,033 B2 | 7/2011 | Rofougaran | |
| 8,045,926 B2 | 10/2011 | Martikkala et al. | |
| 8,073,400 B2 | 12/2011 | Gorbachov | |
| 8,244,179 B2 * | 8/2012 | Dua | 455/41.2 |
| 8,248,982 B2 | 8/2012 | Abhishek | |
| 8,314,746 B2 | 11/2012 | Nikitin et al. | |
| 8,314,749 B2 | 11/2012 | Shtrom et al. | |
| 8,320,971 B2 | 11/2012 | Roberts et al. | |
| 8,560,029 B2 | 10/2013 | Ash, Jr. et al. | |
| 8,583,066 B2 | 11/2013 | Soul et al. | |
| 8,611,445 B2 | 12/2013 | Rajendran et al. | |
| 8,620,348 B2 | 12/2013 | Shrivastava et al. | |
| 8,676,255 B2 | 3/2014 | Moelker et al. | |
| 8,861,635 B2 | 10/2014 | Wang et al. | |
| 8,873,662 B2 | 10/2014 | Sesia et al. | |
| 8,989,053 B1 * | 3/2015 | Skaaksrud et al. | 370/255 |
| 2001/0027560 A1 | 10/2001 | Simon | |
| 2005/0136990 A1 | 6/2005 | Hardacker et al. | |
| 2006/0132360 A1 | 6/2006 | Caimi et al. | |
| 2006/0161621 A1 | 7/2006 | Rosenberg | |
| 2008/0005418 A1 | 1/2008 | Julian | |
| 2008/0012764 A1 | 1/2008 | Kang et al. | |
| 2008/0278167 A1 | 11/2008 | Vaughan, Jr. | |
| 2008/0279137 A1 * | 11/2008 | Pernu et al. | 370/328 |
| 2008/0310487 A1 | 12/2008 | Hammerschmidt et al. | |
| 2009/0046140 A1 | 2/2009 | Lashmet et al. | |
| 2009/0079883 A1 | 3/2009 | Banks et al. | |
| 2009/0195453 A1 | 8/2009 | Kim | |
| 2009/0238384 A1 | 9/2009 | Beauchamp | |
| 2009/0243824 A1 | 10/2009 | Peterson | |
| 2010/0001963 A1 | 1/2010 | Doray et al. | |
| 2010/0060506 A1 | 3/2010 | Maier | |
| 2010/0173585 A1 | 7/2010 | Button et al. | |
| 2010/0210312 A1 | 8/2010 | Kim et al. | |
| 2010/0278346 A1 | 11/2010 | Hogue et al. | |
| 2010/0306022 A1 | 12/2010 | Plut | |
| 2010/0317399 A1 | 12/2010 | Rodriguez | |
| 2011/0075589 A1 * | 3/2011 | Bradley et al. | 370/254 |
| 2011/0084782 A1 | 4/2011 | Kanno | |
| 2011/0086598 A1 | 4/2011 | Ali et al. | |
| 2011/0113272 A1 | 5/2011 | Tsai et al. | |
| 2011/0126119 A1 | 5/2011 | Young et al. | |
| 2011/0261274 A1 | 10/2011 | Shiue et al. | |
| 2011/0298581 A1 | 12/2011 | Hsu | |
| 2012/0017147 A1 | 1/2012 | Mark | |
| 2012/0040716 A1 | 2/2012 | Kuncl et al. | |
| 2012/0090005 A1 | 4/2012 | Marlow et al. | |
| 2012/0154276 A1 | 6/2012 | Shin et al. | |
| 2012/0208461 A1 | 8/2012 | Choi et al. | |
| 2012/0208466 A1 | 8/2012 | Park et al. | |
| 2012/0214546 A1 | 8/2012 | Osaka | |
| 2012/0262354 A1 | 10/2012 | He et al. | |
| 2012/0262487 A1 | 10/2012 | Huebner | |
| 2012/0289160 A1 | 11/2012 | Palin et al. | |
| 2012/0315839 A1 * | 12/2012 | Mumcuoglu et al. | 455/2.01 |
| 2013/0035050 A1 | 2/2013 | Gao et al. | |
| 2013/0045680 A1 | 2/2013 | Dua et al. | |
| 2013/0051261 A1 | 2/2013 | Kazmi et al. | |
| 2013/0154811 A1 | 6/2013 | Ferren et al. | |
| 2013/0211270 A1 | 8/2013 | St. Laurent et al. | |
| 2013/0214166 A1 | 8/2013 | Barlow et al. | |
| 2013/0216071 A1 | 8/2013 | Maher et al. | |
| 2013/0217342 A1 | 8/2013 | Abdul-Gaffor et al. | |
| 2013/0330084 A1 | 12/2013 | Du et al. | |
| 2013/0331031 A1 | 12/2013 | Palin et al. | |
| 2014/0023123 A1 | 1/2014 | Wang et al. | |
| 2014/0047487 A1 | 2/2014 | Guedalia et al. | |
| 2014/0050326 A1 | 2/2014 | Vesa et al. | |
| 2014/0092218 A1 | 4/2014 | Xu et al. | |
| 2014/0143682 A1 * | 5/2014 | Druck | 715/752 |
| 2014/0194062 A1 | 7/2014 | Palin et al. | |
| 2014/0256249 A1 | 9/2014 | Tse et al. | |
| 2014/0331135 A1 | 11/2014 | Sukoff et al. | |
| 2014/0342660 A1 | 11/2014 | Fullam | |
| 2014/0347565 A1 | 11/2014 | Fullam et al. | |
| 2014/0354441 A1 | 12/2014 | Luna | |
| 2014/0368740 A1 | 12/2014 | Roberts | |
| 2014/0369526 A1 | 12/2014 | Roberts | |
| 2015/0029067 A1 | 1/2015 | Pang et al. | |
| 2015/0061829 A1 * | 3/2015 | Williams et al. | 340/5.61 |
| 2015/0071437 A1 * | 3/2015 | Chastain et al. | 380/249 |

FOREIGN PATENT DOCUMENTS

| | | |
|---|---|---|
| WO | 2006/115363 A1 | 11/2006 |
| WO | 2012/143936 A1 | 10/2012 |
| WO | 2014/160501 | 10/2014 |
| WO | 2014/189863 | 11/2014 |
| WO | 2014/193687 | 12/2014 |
| WO | 2014/205011 | 12/2014 |
| WO | 2015/013726 | 1/2015 |
| WO | 2015/017774 | 2/2015 |
| WO | 2015/058215 | 4/2015 |

OTHER PUBLICATIONS

Young, Lee W., Notification of Transmittal of the International Search Report and the Written Opinion of the International Searching Authority (International Publication No. WO 2015/058215 mailed Apr. 3, 2015), International Searching Authority.

Ayotunde, Ayodeji O., Office Action (U.S. Appl. No. 13/952,532 mailed Apr. 21, 2015), U.S. Patent and Trademark Office.

Young, Lee W., Notification of Transmittal of the International Search Report and the Written Opinion of the International Searching Authority (International Publication No. WO 2015/017774 mailed Jan. 16, 2015), International Searching Authority.

Milord, Marceau, Notice of Allowability PTOL-37 (U.S. Appl. No. 14/637,387 mailed Jun. 19, 2015), U.S. Patent and Trademark Office.

Milord, Marceau, Notice of Allowability PTOL-37 (U.S. Appl. No. 13/957,337 mailed Dec. 3, 2014), U.S. Patent and Trademark Office.

Young, Lee W., Notification of Transmittal of the International Search Report and the Written Opinion of the International Searching Authority (International Publication No. WO 2014/205011 mailed Jan. 22, 2015), International Searching Authority.

Chen, Junpeng, Office Action (U.S. Appl. No. 13/919,307 mailed Jan. 14, 2015), U.S. Patent and Trademark Office.

Young, Lee W., Notification of Transmittal of the International Search Report and the Written Opinion of the International Searching Authority (International Publication No. WO 2014/160501 mailed Sep. 4, 2014), International Searching Authority.

Young, Lee W., Notification of Transmittal of the International Search Report and the Written Opinion of the International Searching Authority (International Publication No. WO 2014/193687 mailed Nov. 13, 2014), International Searching Authority.

Talukder, MD K., Office Action (U.S. Appl. No. 13/898,465 mailed Mar. 4, 2015), U.S. Patent and Trademark Office.

Young, Lee W., Notification of Transmittal of the International Search Report and the Written Opinion of the International Searching Authority (International Publication No. WO 2014/189863 mailed Nov. 13, 2014), International Searching Authority.

Dowling, William C., Office Action (U.S. Appl. No. 13/898,472 mailed Mar. 11, 2015), U.S. Patent and Trademark Office.

\* cited by examiner

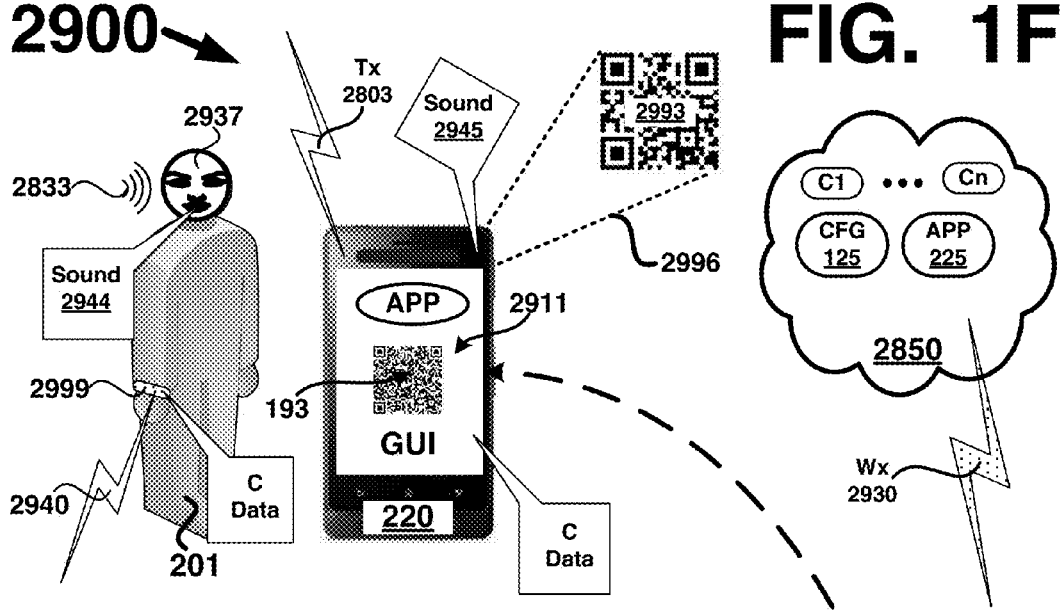
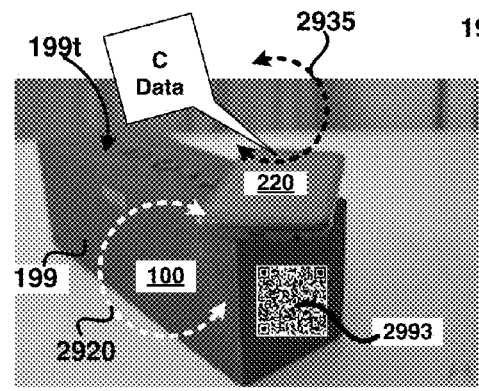
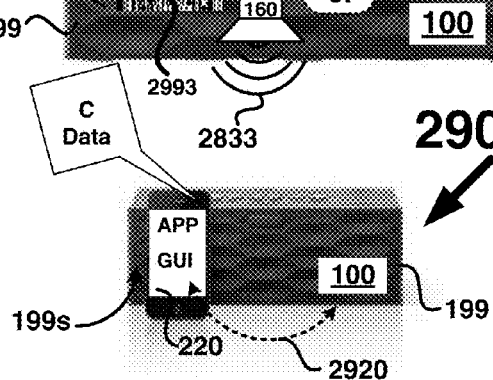
FIG. 1F

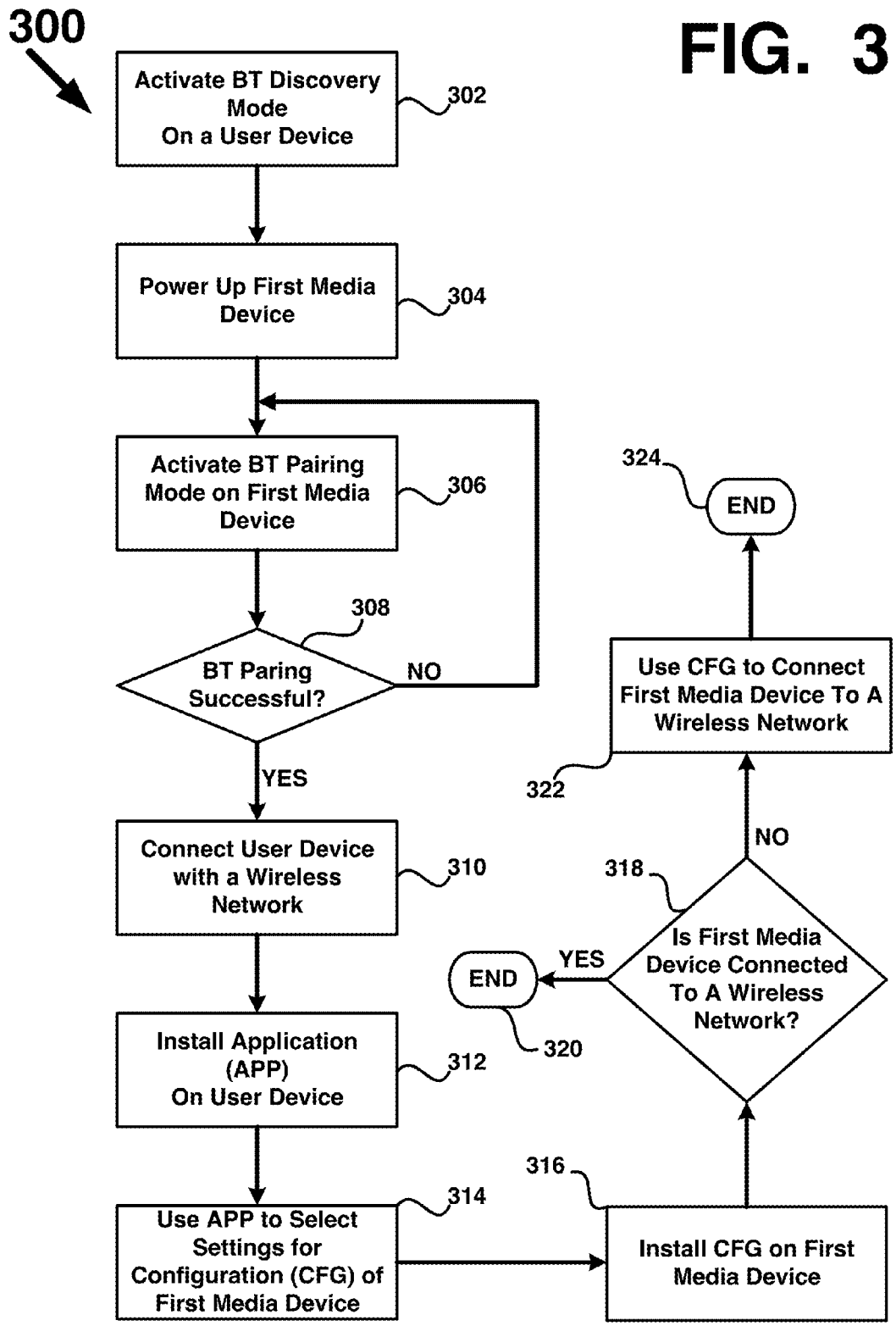

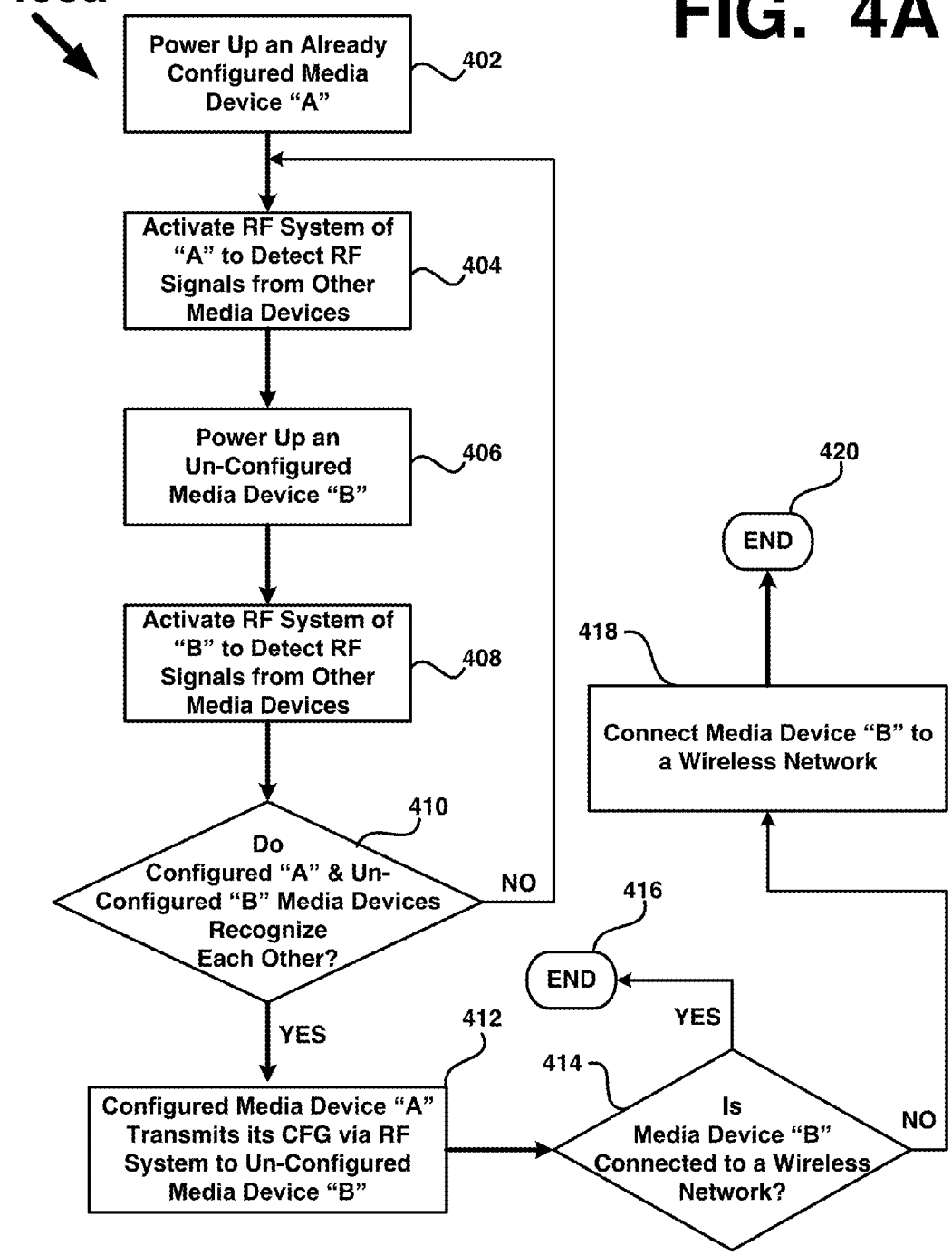

METHODS, SYSTEMS AND APPARATUS TO AFFECT RF TRANSMISSION FROM A NON-LINKED WIRELESS CLIENT

CROSS-REFERENCE TO RELATED APPLICATIONS

This application is related to the following applications: U.S. patent application Ser. No. 13/952,532, filed on Jul. 26, 2013, and titled "Radio Signal Pickup From An Electrically Conductive Substrate Utilizing Passive Slits"; U.S. patent application Ser. No. 13/957,337, filed on Aug. 1, 2013, and titled "RF ARCHITECTURE UTILIZING A MIMO CHIPSET FOR NEAR FIELD PROXIMITY SENSING AND COMMUNICATION"; U.S. patent application Ser. No. 13/919,307, filed on Jun. 17, 2013, and titled "Determining Proximity For Devices Interacting With Media Devices"; and U.S. patent application Ser. No. 13/802,646, filed on Mar. 13, 2013, and titled "Proximity-Based Control Of Media Devices For Media Presentations"; all of which are hereby incorporated by reference in their entirety for all purposes.

FIELD

Embodiments of the present application relate generally to the field of wireless electronics, wireless portable electronics, wireless media presentation devices, audio/video systems, and more specifically to passive and/or active RF proximity detection of wireless client devices.

BACKGROUND

Conventional wireless communication protocols and wireless client devices that implement those protocols may be configured for wireless scanning that is passive or active. Passive scanning may comprise the wireless client device waiting to receive via one of its RF systems, a beacon frame from a wireless access point, such as a WiFi router, or the like. Active scanning may comprise the wireless client device actively attempting to locate a wireless access point by transmitting, using one if its RF systems, a probe request frame (e.g., a broadcast probe request) and waiting for probe response from a wireless access point (if any), such as the aforementioned WiFi router, for example. The conventional probe request may be transmitted on one or more allowable frequency channels, such as one or more of the IEEE 802.x frequency channels used for wireless networks (e.g., 802.11a, b, g, n, etc.), for example.

The active scanning scenario may typically require at least two devices, the wireless client device and the wireless access point. However, in some applications it may be desirable for the wireless client device to actively scan (e.g., transmit probe requests, 802.11 frame types, or pings) sans a wireless access point or without being connected with or having credentials for (e.g., password) for a wireless access point. The wireless access point may be absent, out of range, or otherwise unavailable (e.g., no access credentials) or non-responsive to the active scans transmitted by the wireless client device. Nevertheless, during active scanning, the wireless client device may be discoverable by other wireless devices due to the RF signal it is transmitting (e.g., transmission of probe requests, 802.11 frame types, pings, or other types of RF transmissions and data), for example.

Thus, there is a need for methods, systems and apparatus that may actively cause transmission of active scans and/or passively take advantage of active scans by a wireless client device to effectuate one or more actions including but not limited to discovering the wireless client device, establishing a wireless data communications link with the wireless client device, handling content on the wireless client device, and harvesting content from the wireless client device.

BRIEF DESCRIPTION OF THE DRAWINGS

Various embodiments or examples ("examples") of the present application are disclosed in the following detailed description and the accompanying drawings. The drawings are not necessarily to scale:

FIG. 1F depicts non-limiting examples of contact between a wireless client device and a wireless media device and subsequent wireless linking and content transfer according to an embodiment of the present application;

FIG. 3 depicts one example of a flow diagram of a process for installing an application on a user device and configuring a first media device using the application according to an embodiment of the present application;

FIGS. 4A and 4B depict example flow diagrams for processes for configuring an un-configured media device according to embodiments of the present application;

DETAILED DESCRIPTION

Various embodiments or examples may be implemented in numerous ways, including as a system, a process, a method, an apparatus, a user interface, or a series of program instructions on a non-transitory computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

Figure 1A:
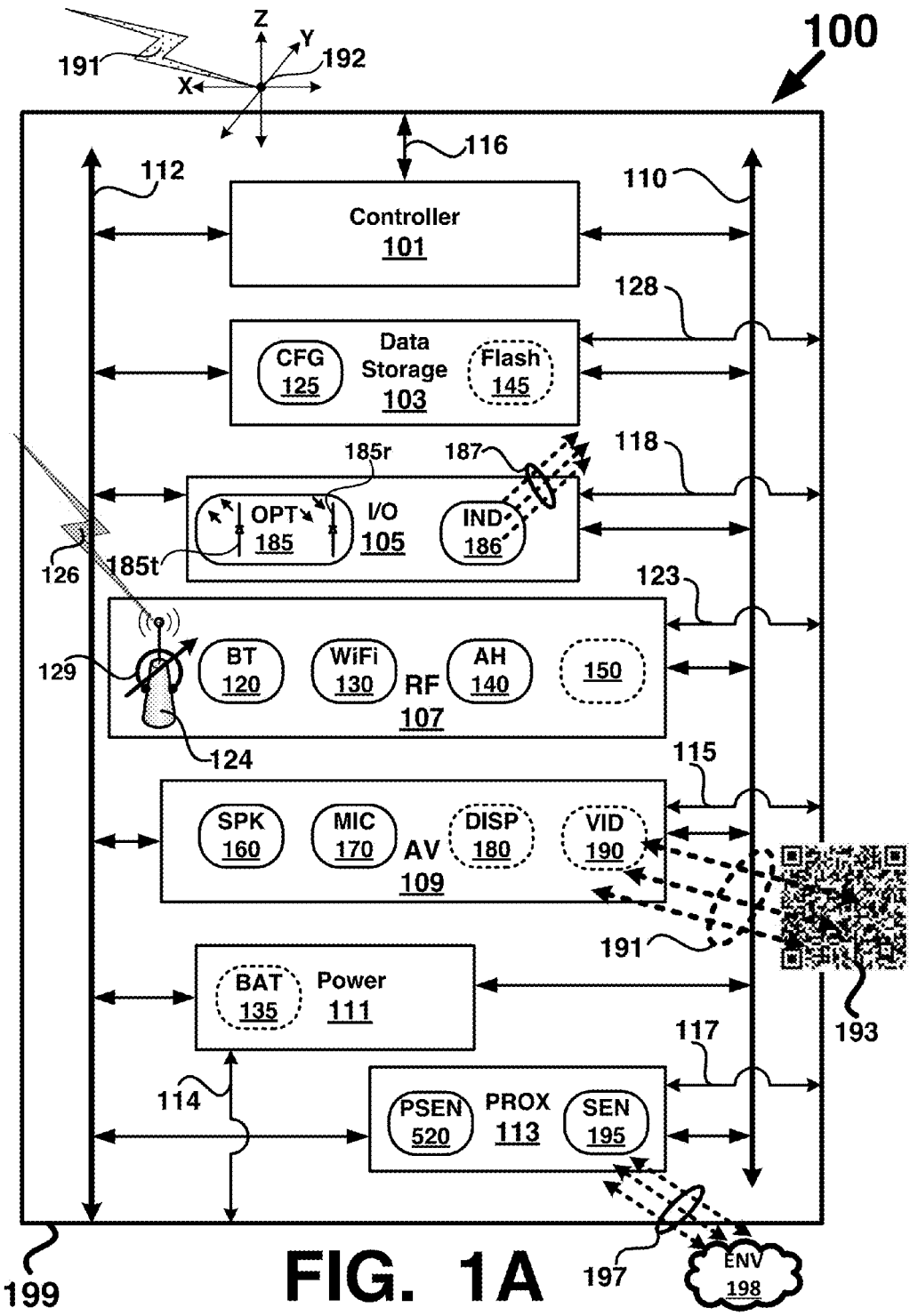
FIG. 1A depicts a block diagram of one example of a wireless media device according to an embodiment of the present application.

FIG. 1A depicts a block diagram of one embodiment of a media device 100 having systems including but not limited to a controller 101, a data storage (DS) system 103, a input/output (I/O) system 105, a radio frequency (RF) system 107, an audio/video (A/V) system 109, a power system 111, and a proximity sensing (PROX) system 113. A bus 110 enables electrical communication between the controller 101, DS system 103, I/O system 105, RF system 107, AV system 109, power system 111, and PROX system 113. Power bus 112 supplies electrical power from power system 111 to the controller 101, DS system 103, I/O system 105, RF system 107, AV system 109, and PROX system 113.

Power system 111 may include a power source internal to the media device 100 such as a battery (e.g., AA or AAA batteries) or a rechargeable battery (e.g., such as a lithium ion type or nickel metal hydride type battery, etc.) denoted as BAT 135. Power system 111 may be electrically coupled with a port 114 for connecting an external power source (not shown) such as a power supply that connects with an external AC or DC power source. Examples include but are not limited to a wall wart type of power supply that converts AC power to DC power or AC power to AC power at a different voltage level. In other examples, port 114 may be a connector (e.g., an IEC connector) for a power cord that plugs into an AC outlet or other type of connecter, such as a universal serial bus (USB) connector, a TRS plug, or a TRRS plug. Power system 111 may provide DC power for the various systems of media device 100. Power system 111 may convert AC or DC power into a form usable by the various systems of media device 100. Power system 111 may provide the same or different voltages to the various systems of media device 100. In applications where a rechargeable battery is used for BAT 135, the external power source may be used to power the power system 111 (e.g., via port 114), recharge BAT 135, or both.

Further, power system 111 on its own or under control or controller 101 may be configured for power management to reduce power consumption of media device 100, by for example, reducing or disconnecting power from one or more of the systems in media device 100 when those systems are not in use or are placed in a standby or idle mode. Power system 111 may also be configured to monitor power usage of the various systems in media device 100 and to report that usage to other systems in media device 100 and/or to other devices (e.g., including other media devices 100) using one or more of the I/O system 105, RF system 107, and AV system 109, for example. Operation and control of the various functions of power system 111 may be externally controlled by other devices (e.g., including other media devices 100).

Controller 101 controls operation of media device 100 and may include a non-transitory computer readable medium, such as executable program code to enable control and operation of the various systems of media device 100. DS 103 may be used to store executable code used by controller 101 in one or more data storage mediums such as ROM, RAM, SRAM, RAM, SSD, Flash, etc., for example. Controller 101 may include but is not limited to one or more of a microprocessor (µP), a microcontroller (µP), a digital signal processor (DSP), a baseband processor, a system on chip (SoC), a field programmable gate array (FPGA), an application specific integrated circuit (ASIC), just to name a few. Processors used for controller 101 may include a single core or multiple cores (e.g., dual core, quad core, etc.). Port 116 may be used to electrically couple controller 101 to an external device (not shown).

DS system 103 may include but is not limited to non-volatile memory (e.g., Flash memory), SRAM, DRAM, ROM, SSD, just to name a few. In that the media device 100 in some applications is designed to be compact, portable, or to have a small size footprint, memory in DS 103 will typically be solid state memory (e.g., no moving or rotating components); however, in some application a hard disk drive (HDD) or hybrid HDD may be used for all or some of the memory in DS 103. In some examples, DS 103 may be electrically coupled with a port 128 for connecting an external memory source (e.g., USB Flash drive, SD, SDHC, SDXC, microSD, Memory Stick, CF, SSD, etc.). Port 128 may be a USB or mini USB port for a Flash drive or a card slot for a Flash memory card. In some examples as will be explained in greater detail below, DS 103 includes data storage for configuration data, denoted as CFG 125, used by controller 101 to control operation of media device 100 and its various systems. DS 103 may include APP 225 for one or more wireless user devices as will be described below. DS 103 may include memory designate for use by other systems in media device 100 (e.g., access credentials, MAC addresses for WiFi 130, SSID's, network passwords, data for settings and parameters for A/V 109, and other data for operation and/or control of media device 100, etc.). DS 103 may also store data used as an operating system (OS) for controller 101. If controller 101 includes a DSP, then DS 103 may store data, algorithms, program code, an OS, etc. for use by the DSP, for example. In some examples, one or more systems in media device 100 may include their own data storage systems.

DS 103 may include algorithms, data, executable program code and the like for execution on controller 101 or in other media devices 100, that implement processes including but not limited to RF signal strength measurement, received signal strength indicator (RSSI) measurement, proximity detection, voice recognition, voice processing, image recognition, facial recognition, gesture recognition, motion analysis (e.g., from motion signals generated by an accelerometer, motion sensor, or gyroscope, etc.), image processing, noise cancellation, subliminal cue generation, content from one or more user devices or external source, and an awareness user interface, just to name a few. In some applications, at least a portion of the algorithms, data, executable program code and the like may reside in one or more external locations (e.g., resource 2850 or 250a of FIGS. 1E, F, J and 2A). In some applications, at least a portion of the algorithms, data, executable program code and the like may be processed by an external compute engine (e.g., server 250b of FIG. 1C, another media device 100, or a user device).

I/O system 105 may be used to control input and output operations between the various systems of media device 100 via bus 110 and between systems external to media device 100 via port 118. Port 118 may be a connector (e.g., USB, HDMI, Ethernet, fiber optic, Toslink, Firewire, IEEE 1394, or other) or a hard wired (e.g., captive) connection that facilitates coupling I/O system 105 with external systems. In some examples port 118 may include one or more switches, buttons, or the like, used to control functions of the media device 100 such as a power switch, a standby power mode switch, a button for wireless pairing, an audio muting button, an audio volume control, an audio mute button, a button for connecting/disconnecting from a WiFi network, an infrared (IR) transceiver, just to name a few. I/O system 105 may also control indicator lights, audible signals, or the like (not shown) that give status information about the media device 100, such as a light to indicate the media device 100 is powered up, a light to indicate the media device 100 is in wireless communication (e.g., WiFi, Bluetooth®, WiMAX, cellular, etc.), a light to indicate the media device 100 is Bluetooth® paired, in Bluetooth® pairing mode, Bluetooth® communication is enabled, a light to indicate the audio and/or microphone is muted, just to name a few. Audible signals may be generated by the I/O system 105 or via the AV system 107 to indicate status, etc. of the media device 100. Audible signals may be used to announce Bluetooth® status, powering up or down the media device 100, muting the audio or microphone, an incoming phone call, a new message such as a text, email, or SMS, just to name a few. In some examples, I/O system 105 may use optical technology to wirelessly communicate with other media devices 100 or other devices. Examples include but are not limited to infrared (IR) transmitters, receivers, transceivers, an IR LED, and an IR detector, just to name a few. I/O system 105 may include an optical transceiver OPT 185 that includes an optical transmitter 185t (e.g., an IR LED) and an optical receiver 185r (e.g., a photo diode). OPT 185 may include the circuitry necessary to drive the optical transmitter 185t with encoded signals and to receive and decode signals received by the optical receiver 185r. Bus 110 may be used to communicate signals to and from OPT 185. OPT 185 may be used to transmit and receive IR commands consistent with those used by infrared remote controls used to control AV equipment, televisions, computers, and other types of systems and consumer electronics devices. The IR commands may be used to control and configure the media device 100, or the media device 100 may use the IR commands to configure/re-configure and control other media devices or other user devices, for example. I/O system 105 may include one or more indicator lights (e.g., IND 186), such as an LED that emits light 187, for example. IND 186 may be used to notify a user of system status, get a user's attentions, to indicate actions being taking by the media device 100 such as BT pairing, powered up or standby status, just to name a few.

RF system 107 includes at least one RF antenna 124 that is electrically coupled with a plurality of radios (e.g., RF transceivers) including but not limited to a Bluetooth® (BT) transceiver 120, a WiFi transceiver 130 (e.g., for wireless communications over a wireless and/or WiMAX network), and a proprietary Ad Hoc (AH) transceiver 140 pre-configured (e.g., at the factory) to wirelessly communicate with a proprietary Ad Hoc wireless network (AH-WiFi) (not shown). AH 140 and AH-WiFi are configured to allow wireless communications between similarly configured media devices (e.g., an ecosystem comprised of a plurality of similarly configured media devices) as will be explained in greater detail below. RF system 107 may include more or fewer radios than depicted in FIG. 1A and the number and type of radios will be application dependent. Furthermore, radios in RF system 107 need not be transceivers, RF system 107 may include radios that transmit only or receive only, for example. Optionally, RF system 107 may include a radio 150 configured for RF communications using a proprietary format, frequency band, or other existent now or to be implemented in the future. Radio 150 may be used for cellular communications (e.g., 3G, 4G, or other), for example. Antenna 124 may be configured to be a de-tunable antenna such that it may be de-tuned 129 over a wide range of RF frequencies including but not limited to licensed bands, unlicensed bands, WiFi, WiMAX, cellular bands, Bluetooth®, from about 2.0 GHz to about 6.0 GHz range, and broadband, just to name a few. RF system 107 may include one or more antennas 124 and may also include one or more de-tunable antennas 124 that may be de-tuned 129. As will be discussed below, PROX system 113 may use the de-tuning 129 capabilities of antenna 124 to sense proximity of the user, wireless user devices, other people, the relative locations of other media devices 100, just to name a few. Radio 150 (e.g., a transceiver) or other transceiver in RF 107, may be used in conjunction with the de-tuning 129 capabilities of antenna 124 to sense proximity, to detect and or spatially locate other RF sources such as those from other media devices 100, devices of a user, just to name a few. RF system 107 may include a port 123 configured to connect the RF system 107 with an external component or system, such as an external RF antenna, for example. The transceivers depicted in FIG. 1A are non-limiting examples of the type of transceivers that may be included in RF system 107. RF system 107 may include a first transceiver configured to wirelessly communicate using a first protocol, a second transceiver configured to wirelessly communicate using a second protocol, a third transceiver configured to wirelessly communicate using a third protocol, and so on. One of the transceivers in RF system 107 may be configured for short range RF communications (e.g., near field communication (NFC)), such as within a range from about 1 meter to about 15 meters, or less, for example. NFC may be in a range of about 0.3 meters or less, for example. Another one of the transceivers in RF system 107 may be configured for long range RF communications, such any range up to about 50 meters or more, for example. Short range RF may include Bluetooth®; whereas, long range RF may include WiFi, WiMAX, cellular, and Ad Hoc wireless, for example.

AV system 109 includes at least one audio transducer, such as a loud speaker 160 (speaker 160 hereinafter), a microphone 170, or both. AV system 109 further includes circuitry such as amplifiers, preamplifiers, or the like as necessary to drive or process signals to/from the audio transducers. Optionally, AV system 109 may include a display (DISP) 180, video device (VID) 190 (e.g., an image capture device, a web CAM, video/still camera, etc.), or both. DISP 180 may be a display and/or touch screen (e.g., a LCD, OLED, or flat panel display) for displaying video media, information relating to operation of media device 100, content C available to or operated on by the media device 100, content Ct transferred from other devices such as wireless user devices (e.g., a smartphone or pad), content C queued for playback and/or currently being played back, playlists for media, date and/or time of day, alphanumeric text and characters, caller ID, file/directory information, a GUI, just to name a few. A port 122 may be used to electrically couple AV system 109 with an external device and/or external signals. Port 122 may be a USB, HDMI, Firewire/IEEE-1394, 3.5 mm audio jack, or other. For example, port 122 may be a 3.5 mm audio jack for connecting an external speaker, headphones, earphones, etc. for listening to audio content being processed by media device 100. As another example, port 122 may be a 3.5 mm audio jack for connecting an external microphone or the audio output from an external device. In some examples, SPK 160 may include but is not limited to one or more active or passive audio transducers such as woofers, concentric drivers, tweeters, super tweeters, midrange drivers, sub-woofers, passive radiators, just to name a few. MIC 170 may include one or more microphones and the one or more microphones may have any polar pattern suitable for the intended application including but not limited to omni-directional, directional, bi-directional, uni-directional, bi-polar, uni-polar, any variety of cardioid pattern, and shotgun, for example. MIC 170 may be configured for mono, stereo, or other. MIC 170 may be configured to be responsive (e.g., generate an electrical signal in response to sound) to any frequency range including but not limited to ultrasonic, infrasonic, from about 20 Hz to about 20 kHz, and any range within or outside of human hearing. In some applications, the audio transducer of AV system 109 may serve dual roles as both a speaker and a microphone.

Circuitry in AV system 109 may include but is not limited to a digital-to-analog converter (DAC) and algorithms for decoding and playback of media files such as MP3, FLAG, AIFF, ALAC, WAV, MPEG, QuickTime, AVI, compressed media files, uncompressed media files, and lossless media files, just to name a few, for example. A DAC may be used by AV system 109 to decode wireless data from a user device or from any of the radios in RF system 107. AV system 109 may also include an analog-to-digital converter (ADC) for converting analog signals, from MIC 170 for example, into digital signals for processing by one or more system in media device 100.

Media device 100 may be used for a variety of applications including but not limited to wirelessly communicating with other wireless devices, other media devices 100, wireless networks, and the like for playback of media (e.g., streaming content), such as audio, for example. The actual source for the media need not be located on a user's device (e.g., smart phone, MP3 player, iPod, iPhone, iPad, Android, laptop, PC, etc.). For example, media files to be played back on media device 100 may be located on the Internet, a web site, or in the Cloud, and media device 100 may access (e.g., over a WiFi network via WiFi 130) the files, process data in the files, and initiate playback of the media files. Media device 100 may access or store in its memory a playlist or favorites list and playback content listed in those lists. In some applications, media device 100 will store content (e.g., files) to be played back on the media device 100 or on another media device 100.

Media device 100 may include a housing, a chassis, an enclosure or the like, denoted in FIG. 1A as 199. The actual shape, configuration, dimensions, materials, features, design, ornamentation, aesthetics, and the like of housing 199 will be application dependent and a matter of design choice. Therefore, housing 199 need not have the rectangular form depicted in FIG. 1A or the shape, configuration etc., depicted in the Drawings of the present application. Nothing precludes housing 199 from comprising one or more structural elements, that is, the housing 199 may be comprised of several housings that form media device 100. Housing 199 may be configured to be worn, mounted, or otherwise connected to or carried by a human being. For example, housing 199 may be configured as a wristband, an earpiece, a headband, a headphone, a headset, an earphone, a hand held device, a portable device, a desktop device, just to name a few.

In other examples, housing 199 may be configured as speaker, a subwoofer, a conference call speaker, an intercom, a media playback device, just to name a few. If configured as a speaker, then the housing 199 may be configured as a variety of speaker types including but not limited to a left channel speaker, a right channel speaker, a center channel speaker, a left rear channel speaker, a right rear channel speaker, a subwoofer, a left channel surround speaker, a right channel surround speaker, a left channel height speaker, a right channel height speaker, any speaker in a 3.1, 5.1, 7.1, 9.1 or other surround sound format including those having two or more subwoofers or having two or more center channels, for example. In other examples, housing 199 may be configured to include a display (e.g., DISP 180) for viewing video, serving as a touch screen interface for a user, providing an interface for a GUI, for example.

PROX system 113 may include one or more sensors denoted as SEN 195 that are configured to sense 197 an environment 198 external to the housing 199 of media device 100. Using SEN 195 and/or other systems in media device 100 (e.g., antenna 124, SPK 160, MIC 170, etc.), PROX system 113 senses 197 an environment 198 that is external to the media device 100 (e.g., external to housing 199). PROX system 113 may be used to sense one or more of proximity of the user or other persons to the media device 100 or other media devices 100. PROX system 113 may use a variety of sensor technologies for SEN 195 including but not limited to ultrasound, infrared (IR), passive infrared (PIR), optical, acoustic, vibration, light, ambient light sensor (ALS), IR proximity sensors, LED emitters and detectors, RGB LED's, RF, temperature, capacitive, capacitive touch, inductive, just to name a few. PROX system 113 may be configured to sense location of users or other persons, user devices, and other media devices 100, without limitation. Output signals from PROX system 113 may be used to configure media device 100 or other media devices 100, to re-configure and/or re-purpose media device 100 or other media devices 100 (e.g., change a role the media device 100 plays for the user, based on a user profile or configuration data), just to name a few. A plurality of media devices 100 in an eco-system of media devices 100 may collectively use their respective PROX system 113 and/or other systems (e.g., RF 107, de-tunable antenna 124, AV 109, etc.) to accomplish tasks including but not limited to changing configuration, re-configuring one or more media devices, implement user specified configurations and/or profiles, insertion and/or removal of one or more media devices in an eco-system, just to name a few.

In other examples, PROX 113 may include one or more proximity detection islands PSEN 520 as will be discussed in greater detail in FIGS. 5-6. PSEN 520 may be positioned at one or more locations on chassis 199 and configured to sense an approach of a user or other person towards the media device 100 or to sense motion or gestures of a user or other person by a portion of the body such as a hand for example. PSEN 520 may be used in conjunction with or in place of one or more of SEN 195, OPT 185, SPK 160, MIC 170, RF 107 and/or de-tunable 129 antenna 124 to sense proximity and/or presence in an environment surrounding the media device 100, for example. PSEN 520 may be configured to take or cause an action to occur upon detection of an event (e.g., an approach or gesture by user 201 or other) such as emitting light (e.g., via an LED), generating a sound or announcement (e.g., via SPK 160), causing a vibration (847, 848) (e.g., via SPK 160 or a vibration motor), display information (e.g., via DISP 180), trigger haptic and/or tactile feedback, for example. In some examples, PSEN 520 may be included in I/O 105 instead of PROX 113 or be shared between one or more systems of media device 100. In other examples, components, circuitry, and functionality of PSEN 520 may vary among a plurality of PSEN 520 sensors in media device 100 such that all PSEN 520 are not identical. PSEN 520 and/or PROX 113 may be electrically coupled with one or more signals from VID 190 and may process the signals to determine whether or not the signals are indicative of presence, motion, proximity or other indicia related to proximity sensing. In some examples, VID 190 may be includes in PSEN 520. Signals from VID 190 may be electrically coupled with other systems such as A/V 109, I/O 105, and controller 101, for example. Signals from VID 190 may serve multiple purposes including but not limited to image capture (e.g., for image recognition of TAG 193 or face of a user), and proximity detection or facial recognition and image capture, motion detection and image capture, and proximity detection, for example.

Figure 1B:
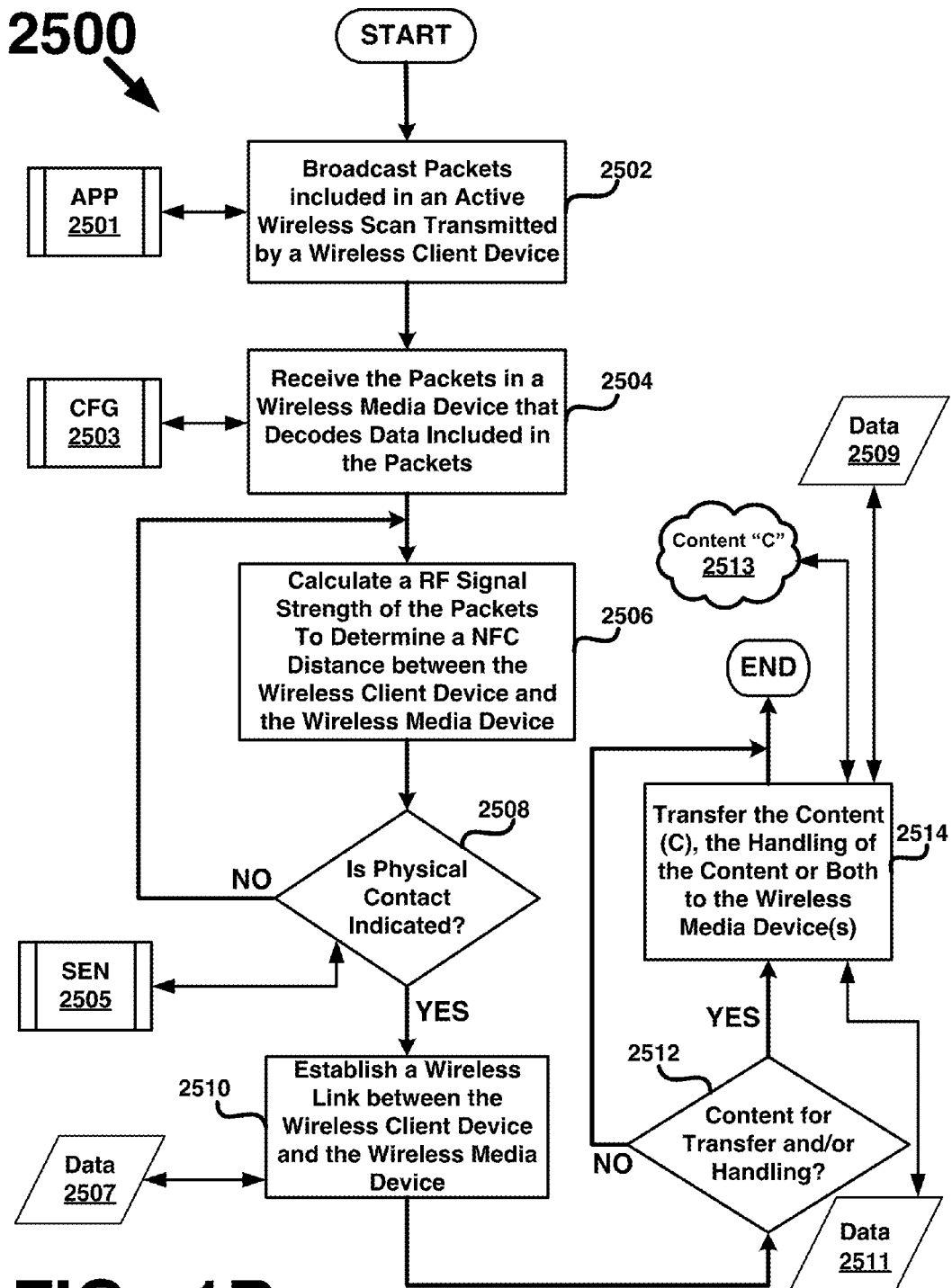
FIG. 1B depicts one example of a flow for a process affecting radio frequency (RF) transmission from a wireless client device according to an embodiment of the present application.
Figure 1C:
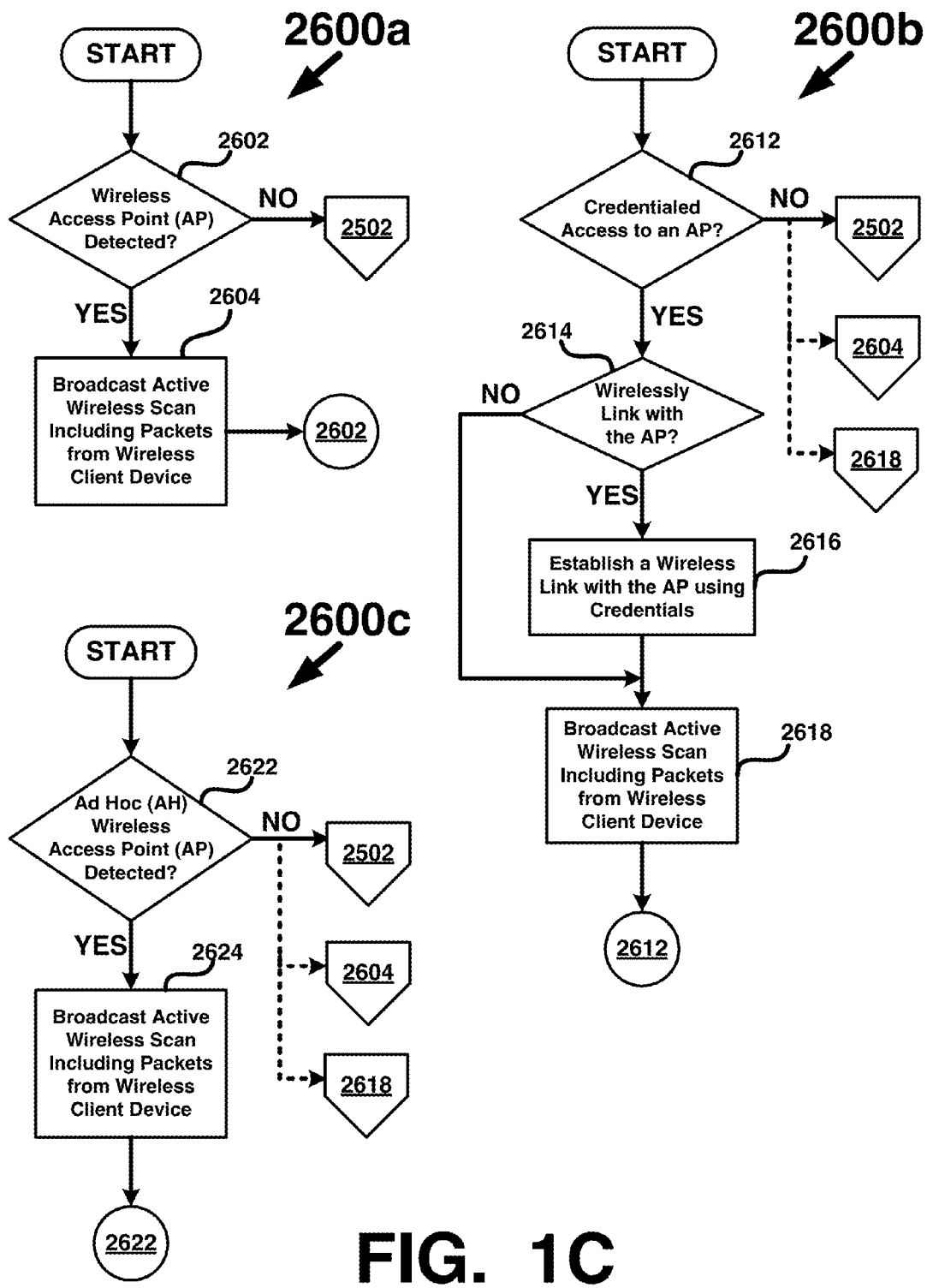
FIG. 1C depicts examples of different flows for affecting RF transmission from a wireless client device according to an embodiment of the present application.
Figure 1D:
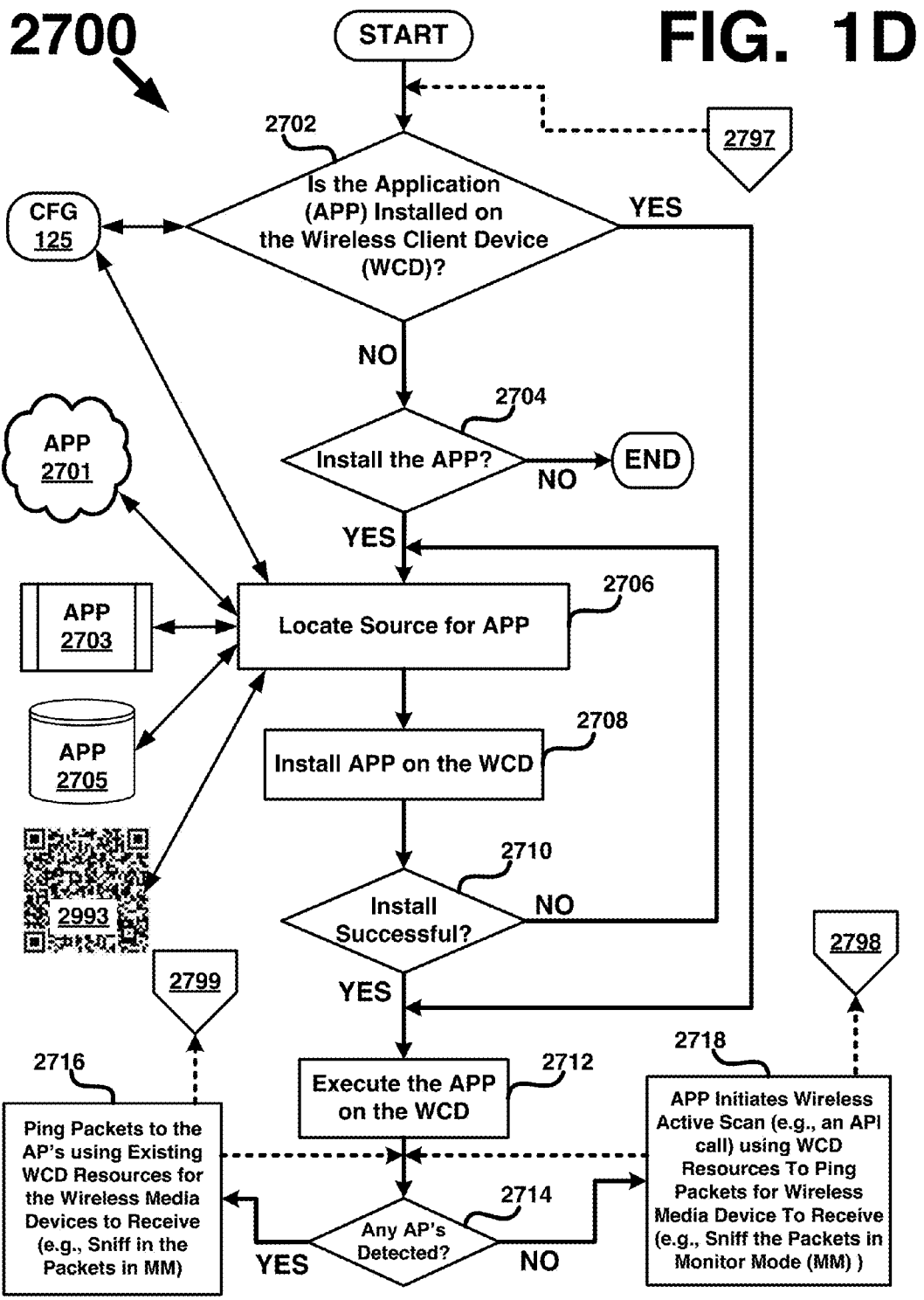
FIG. 1D depicts one example of a flow for installing an application on a wireless client device that affects RF transmission from the wireless client device an embodiment of the present application.
Figure 1E:
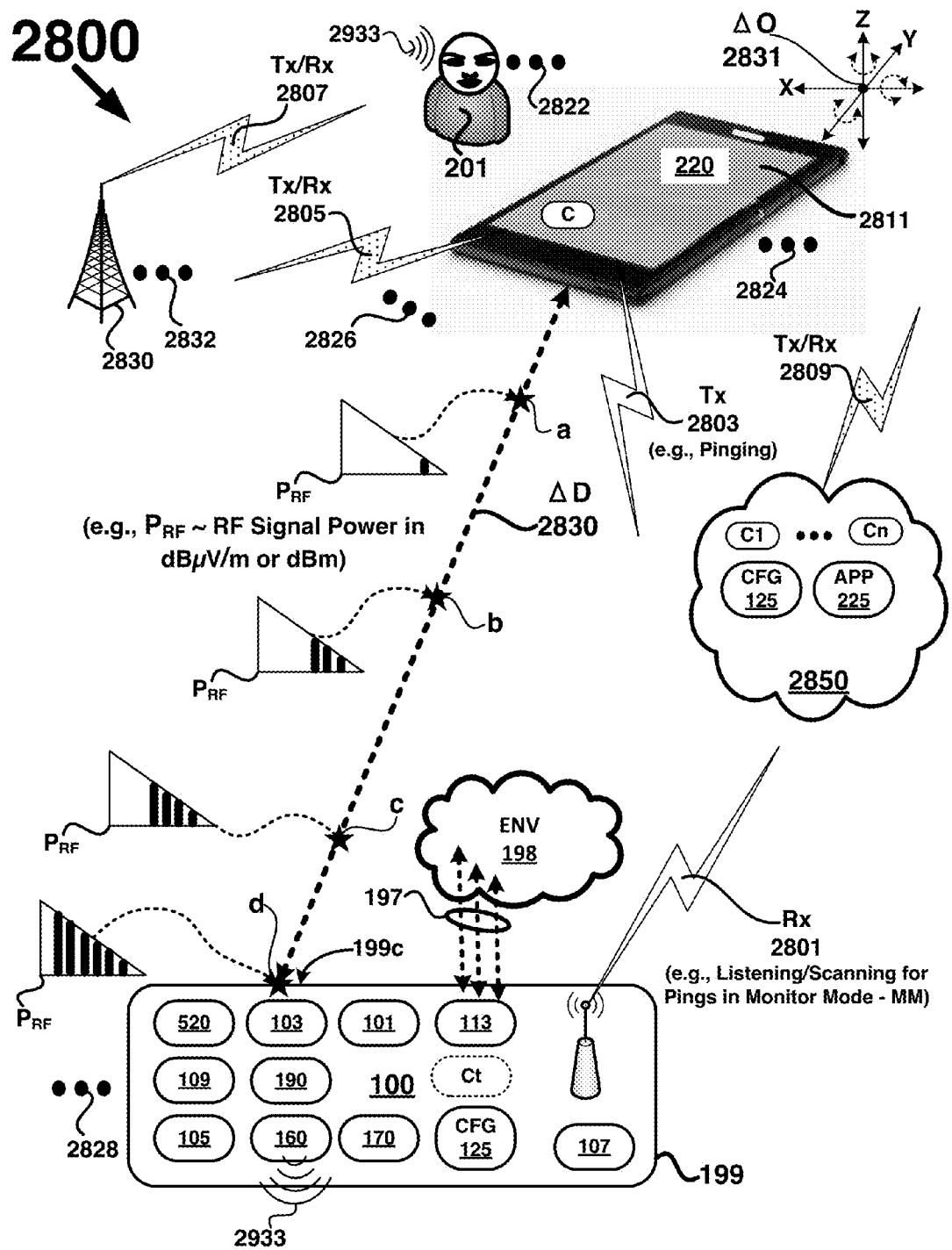
FIG. 1E depicts one example of a wireless client device broadcasting an active wireless scan in an environment including a wireless media device configured to listen for the active wireless scan according to an embodiment of the present application.

FIG. 1B depicts one example of a flow 2500 for a process affecting radio frequency (RF) transmission from a wireless client device (e.g., 220 in FIG. 1E). At a stage 2502 the wireless client device (client device hereinafter) may use any of its relevant systems to broadcast information (e.g., formatted as packets) in a RF signal transmitted by one or more of its radios in an active wireless scan (active scan hereinafter). As will be described in greater detail below, one or more of the stages in flow 2500 may be program code in an application 2501 (APP) resident in a non-transitory computer readable medium disposed in the client device (e.g., in non-volatile memory, Flash memory, etc.) and executed by a hardware processor of the client device, such as a microprocessor (µP), a microcontroller (µP), a digital signal processor (DSP), a baseband processor, a system on chip (SoC), a field programmable gate array (FPGA), an application specific integrated circuit (ASIC), for example. APP 2501 may comprise the APP 225 as described herein. APP 2501 may be client device specific (e.g., data and executable code for APP 2501 may be different for different types/brands/models/manufactures of client devices) and may be installed, downloaded, or otherwise obtained from a variety of sources including but not limited to the Internet, the Cloud, web site, web page, a manufacture of the wireless media device 100, an application store, an SD or micro SD card or other form of data storage, just to name a few.

At the stage 2502, the APP 2501 may determine a format the information is broadcast in, such as a format for the packets (e.g., headers, data payloads, and fields of the packets). As will be described below, the active scan may be initiated by systems, operating systems (OS), API's, hardware, software or the like that are resident on the client device without intervention by APP 2501 under conditions that a client device would generate an active scan, such as in the RF reception presence (e.g., in RF range) of one or more wireless access points (AP) that are broadcasting RF signals and regardless of whether or not the client device has access credentials for the one or more AP's. As one example, regardless of whether or not the client device has access credentials, if a user of the client device walks into a business that has a WiFi AP, the client device may be programmed or otherwise configured to detect the AP using one or more of its radios and to initiate the active scan (e.g., to ping packets to the AP) in an attempt to join the wireless network associated with the AP. If the client device has access credentials (e.g., provided by the business), then it may join the wireless network, otherwise, the client device may still generate the active scan.

For purposes of explanation, unless otherwise described, active scans from the client device are initiated by APP 2501 and APP 2501 may access or otherwise interact with systems of the client device (e.g., hardware and/or software) to effectuate the broadcasting of the active scan, such as making API calls, for example. At a stage 2504 the packets in the active scan transmitted by the client device are received by one or more wireless media devices 100 (e.g., in ENV 198). At least one or more of the wireless media devices 100 may be configured to receive the active scan using one or more of its radios (e.g., receiver, transmitter, or transceiver in RF 107) and to decode the information carried by the RF signal of the active scan (e.g., the packets and one or more of their fields). A configuration 2503 (e.g., CFG 125) may be used by the wireless media device 100 (e.g., processed by controller 101) to decode the information, such as header information or data payload information, for example. Hereinafter, for purposes of explanation the information will be denoted as packet or packets; however, the present application is not limited to a packet format for the active scan and the information carried in the RF signal that comprises the active scan may include without limitation any format, form, data, protocol, or other structure that may be received as a RF signal and decoded using one or more of hardware, software, analog circuitry, digital circuitry, or mixed analog-digital circuitry.

At a stage 2506 the wireless media device 100 may use one or more of its systems to calculate RF signal strength of packets received by the media device 100. The calculated RF signal strength may be used by the media device 100 to determine an approximate distance between the client device broadcasting the active scan and the wireless media device 100 receiving the active scan. The RF signal strength may be calculated using one or more systems of the media device 100 (e.g., controller 101, RF 107, and DS 103) using one or more of hardware, software, analog circuitry, digital circuitry, or mixed analog-digital circuitry of the systems of the media device 100.

In some examples, the approximate distance between the client device broadcasting the active scan and the wireless media device 100 receiving the active scan may comprise a near field communications (NFC) distance (e.g., ΔD 2830 of FIGS. 1E-1J), where a threshold value of the calculate RF signal strength may be indicative of the client device being in contact with the media device 100 (e.g., ΔD 2830≈0) such that a NFC wireless link may be established between the client device and media device 100. In that calculate RF signal strength will vary depending on a distance between the client device and media device 100 while the active scan is being broadcasts, there may be some values for the calculated RF signal strength that will not be indicative of the devices being in close NFC proximity of each other, such as the case may be when the active scan is being broadcast by the client device and received by the media device 100 when the client device is approximately 10 meters (or more) away from the media device (e.g., a far field (FF) RF signal strength), for example. On the other hand, there may be some values for the calculated RF signal strength that are more indicative of the devices being in close to very close NFC proximity of each other, such as the case may be when the active scan is being broadcast by the client device and received by the media device 100 when the client device is approximately 10 centimeters (or less) away from the media device (e.g., a near field (NF) RF signal strength), for example. Where calculated RF signal strength is larger in magnitude (e.g., RF power in dBm, dBuV/m, mW, RSSI, etc.) in the NF than may be the FF. RF signal strength may exponentially as a function of distance between transmitting source (e.g., client device) and receiving destination (e.g., media device 100). The exponent may not be constant with distance, for example, in the FF the RF signal strength may vary exponential with the inverse of the distance R squared (e.g., approximately $1/R^2$); whereas, in the NF the RF signal strength may vary exponential with the inverse of the distance R cubed or more (e.g., approximately in a range from about $1/R^3$ to about $1/R^4$). Accordingly, the media device 100 upon detecting the active scan from a client device may calculate the RF signal strength at the stage 2506 to determine based on calculated values of the RF signal strength whether or not the client device is more distant from the media device 100 (e.g., at a FF distance) or is close to, very close to, or is touching/in contact with the media device 100 (e.g., at a NF distance). Moreover, the calculated RF signal strength may be used to determine if the client device is moving towards the media device 100 (e.g., calculated RF signal strength is increasing) or away from the media device 100 (e.g., calculated RF signal strength is decreasing).

Calculated RF signal strength may be at an approximate maximum value when the client device is in direct contact with the media device 100 (e.g., the client device is positioned in contact with some portion of chassis 199). Media device 100 may have one or more designated portions of chassis 199 configured to be contacted (e.g., actual physical contact) by the client device. Media device 100 may include hardware such as antennas and/or sensors disposed at or near the one or more designated portions for detecting contact and/or detecting RF signals from the active scan (e.g., see FIGS. 1F, 1H and 1I). One or more systems including but not limited to PROX 113 (e.g., using PSEN 520), A/V 109 (e.g., using MIC 170), or a motion sensor (e.g., single or multi-axis accelerometer, gyroscope, pressure switch, piezoelectric device, etc.) may be used to determine proximity between the client device and media device 100, to determine/verify actual physical contact between the client device and media device 100, for example.

At a stage 2508 a determination may be made as to whether or not physical contact between the client device and media device 100 is indicated by the calculated RF signal strength and the determination at the stage 2508 may include using additional information from other systems of the media device 100 as described above (e.g., PROX 113, A/V 109, motion sensors) and denoted as SEN 2505. If physical contact is not indicated, then a NO branch may be taken from stage 2508 to another stage in flow 2500, such as the flow returning to the stage 2506, for example. On the other hand, if physical contact is indicated, then a YES branch may be taken from stage 2508 to a stage 2510.

At the stage 2510 a wireless communications link may be established between the client device and the wireless media device 100. The type of wireless communications link that is established may be determined in part by APP 2501, CFG 2503, or both. The wireless communications link may be a NFC link using NFC protocols, Bluetooth protocols, Bluetooth Low Energy protocols, or some other protocol. The actual type of wireless communications link that is established will be application dependent and is not limited by the examples depicted and/or described herein. The wireless communications link that is established may be between any compatible wireless systems, radios, etc. of the client device and the wireless media device 100. Data 2507 from one or more sources including but not limited to APP 2501, CFG 2503, or both may be used to enable the wireless communications link at the stage 2510. Data 2507 may comprises wireless access credentials, BT pairing information, Ad Hoc wireless information (e.g., to establish a link), or NFC link information, for example. As one example, the wireless communications link may comprise the media device 100 BT paring with the client device, and subsequently using the BT link to wirelessly communicate WiFi access credentials for an AP the media device 100 is linked with to the client device. The client device may use the access credentials to connect with the WiFi network via the AP and subsequent wireless communications between the client device and media device 100 may occur over the WiFi network, the BT link, or both.

At a stage 2512 a determination may be made as to whether or not to transfer content and/or content handling from the client device to the media device 100. Some or all of the content (if any) may reside on the client device, at a location external to the client device or both. The media device 100 may access and/or retrieve the content from the client device a location external to the client device or both. The content (if any) regardless of source or sources is denoted generally as content C 2513 (content C hereinafter). If a NO branch is taken from the stage 2512, then flow 2500 may transition to another stage or may terminate (e.g., END). If a YES branch is taken from the stage 2512, then flow 2500 may transaction to a stage 2514.

At the stage 2514, content C may be transferred to the wireless media device 100, handling of the content C may be transferred to the wireless media device 100 or both. As one example, content C may have a large data size (e.g., in Gigabytes) and media device 100 may not transfer the data associated with the content C in the form of an entire file or the like, but may instead gain access to the content C and handle some aspect of the content C 2511, such as playback of the content C (e.g., using A/V 109, SPK 160, DISP 180) by streaming the content from a location where the content C 2511 resides (e.g., the Internet, the Cloud 2850 or 250, NAS, a media provider, etc.). As another example, the content C may comprise an alarm for a wake-up call at 8:00 am set using a utility on the client device and the data for that alarm is transferred to the media device 100 and may be subsequently handled by the media device 100 (e.g., the media device 100 sounds the alarm at 8:00 am the next day). In this example, the amount of data associated with the alarm may be small compared to the amount of data in content such as a video or other media file (e.g., MP3, FLAG, AIFF, ALAC, WAV, MPEG, QuickTime, AVI, compressed media files, uncompressed media files, and lossless media files, etc.) and therefore it may be more time efficient (e.g., in data transfer time) or practicable (e.g., data storage capacity of DS 103) for some content to be accessed from a remote/external location and other content to be copied or otherwise stored on media device 100. Data 2511 may be used by the media device 100, the client device or both, at the stage 2514, to determine which content C is to be transferred, location of content C, how content C is to be handled by media device 100, access credentials for content C, queuing of content C, when content C is to be transferred back to the client device or other location, and when handling of content C is to be transferred back to the client device or other system, for example. Data 2511 may be separate from or included in one or more of APP 2501, CFG 2503 or both. For example, APP 225 may include data 2511. Flow 2500 may terminate (e.g., END) or transition to some other stage in flow 2500 during or after execution of the stage 2514, for example.

As was described above, some wireless client devices may be configured via hardware, software or both to broadcast active wireless scans upon detecting (e.g., via one or more radios) wireless transmissions from an AP (e.g., a WiFi router) and the client device may broadcast packets (e.g., pinging the AP) to announce its presence to the AP, and this may occur regardless of the client device having access credentials to the AP or regardless of having the APP 2501 installed on the client device. FIG. 1C depicts examples of different flows 2600a-2600c for affecting RF transmission from a wireless client device.

In flow 2600a, at a stage 2602 a determination may be made by the client device as to whether or not a wireless AP is detected by one of its RF systems (e.g., a radio configured to receive and/or transmit using one or more IEEE 802.11 protocols). If a NO branch is taken, then flow 2600a may transition to another stage, such as the stage 2502 in flow 2500 as described above. If a YES branch is taken, then flow 2600a may transition to a stage 2604 where the client device may broadcast the active scan that includes the packets as described above. Here, the client device may utilize its native hardware and/or software to implement the stage 2604 when the YES branch is taken from the stage 2602, and the APP 2501 may not take any action (e.g., calling an API or other) to cause the active scan to be broadcast, because the client device is essentially doing what the APP 2501 would do sans any AP's to trigger the active scan by the client device. However, taking the NO branch may cause activation of the APP 2501 via flow 2500 as there are no AP's detected to cause the client device to initiate the active scan. Flow 2600a may loop back to the stage 2602 to repeatedly determine if the AP's are still being detected so that the broadcasting of pings at the stage 2604 may continue using client device native resources. However, if AP's cease to be detected at the stage 2602, then the NO branch may be taken and flow 2600a may transition to flow 2500 (e.g., the stage 2502) to initiate the broadcasting of active scans under control of APP 2501 as described above.

In Flow 2600b, at a stage 2612 a determination may be made as to whether or not the client device has credentialed access (e.g., WiFi network password or other) to one or more AP's. If a YES branch is taken, then flow 2600b may transition to a stage 2614 where a determination may be made as to whether or not the client device is already wirelessly linked (e.g., from a previous network login with the AP) with the one or more AP's it has credentialed access to. If a YES branch is taken, then the client device may wirelessly link with the AP at a stage 2616 and may broadcast an active scan at a stage 2618. Flow 2600b may then loop back to the stage 2612. On the other hand if the NO branch is taken, then the flow 2600b may transition to any stage in any flow where an active wireless scan may be generated, such as the stage 2502 in flow 2500, the stage 2604 in flow 2600a, or the stage 2618 in flow 2600b, for example. Transition to any of those stages may cause the active scan to be broadcast by either the APP 2501 (e.g., the stage 2502) or by native resources of the client device (e.g., stage 2618 or stage 2604 as depicted by dashed lines in flow 2600b of FIG. 1C).

In Flow 2600c, at a stage 2622 a determination may be made by the client device as to whether or not an Ad Hoc wireless AP is detected by one of its RF systems (e.g., a radio configured to receive and/or transmit using one or more IEEE 802.11 protocols). For example, media device 100 may use its Ad Hoc wireless radio AH 140 to transmit packets or other information that mimic a wireless AP that may be detected by a radio in the client device. If the Ad Hoc AP is detected, then a YES branch may be taken to a stage 2624 where the client device may use its native resources to broadcast the active scan. The flow may loop back to the stage 2622 to continue to monitor for ongoing detection of the Ad Hoc AP, and to execute the NO branch of the Ad Hoc AP ceases to be detected at the stage 2622. If the Ad Hoc AP is not detected, then the NO branch may be taken and flow 2600c may transition to any stage in any flow where an active wireless scan may be generated, such as the stage 2502 in flow 2500, the stage 2604 in flow 2600a, or the stage 2618 in flow 2600b, as was described above in regard to flow 2600b.

Flows 2600a-2600c are non-limiting examples of how a client device may broadcast active scans using its native hardware and/or software resources when an AP is detected by the RF system of the client device, regardless of whether or not the client has credentialed access to the detected AP's and how the client device may use APP 2501 and flow 2500 to broadcast the active scan when no AP's are detected. In some examples, an ENV 198 may include a plurality of wireless media devices 100, and at least one of those devices 100 may be configured to use its AH 140 to broadcast and present itself as an AP to a client device (e.g., 220) and/or its user (e.g. 201) that is detected by one or more of the wireless media devices 100 (e.g., using PROX 113, A/V 109, RF 107, etc.). One or more of the plurality of wireless media devices 100 may execute the flow 2500 and subsequently establish the wireless link with the client device (e.g., the stage 2510) and transfer and/or handle content from the client device (e.g., the stages 2512-2514). The client device may or may not have the APP 2501 installed or otherwise resident on the client device (e.g. 220) when the AP (e.g., WiFi network AP or the Ad Hoc AP) is detected by the client device. Using the Ad Hoc AP may be one way to cause the client device to use its native resources to broadcast the pings that are received by one or more of the plurality of wireless media devices 100 and post wireless linking with the client device at the stage 2510, access information for APP 2501 may be communicated to the client device for subsequent download, install or other on the client device.

Turning now to FIG. 1D, where one example of a flow 2700 for installing an application (APP) on a wireless client device that affects RF transmission from the wireless client device (e.g., broadcasting an active wireless scan) is depicted. One or more of the stages depicted in flow 2700 may occur in a sequence different than that depicted and the APP installed by flow 2700 or by other instrumentality may operate to initiate the active wireless scan in one or more of: in an absence of an AP, in a presence of a AP, or in a presence of an AP but without access credentials for the AP. Presence of an AP may include being a RF detection range of a RF signal transmitted by the AP.

In flow 2700, at a stage 2702 a determination may be made as to whether or not the APP is already installed on the client device. If a YES branch is taken, then flow 2700 may transition to another stage in the flow 2700, such as a stage 2712, where the APP may be executed on the client device (e.g., by a processor or the like of client device 220) or the user may be prompted to "OPEN" the APP to cause it to be executed. Execution may be by a user touching, selecting or otherwise activating an icon or the like displayed on a GUI or other user interface on the client device.

If a NO branch is taken, then flow 2700 may continue to a stage 2704 where a determination may be made as to whether or not to install the APP on the client device. If a NO branch is taken, the flow 2700 may terminate (e.g., END) or transition to another stage in flow 2700. The NO branch may be taken if a user decides they don't want the APP to be installed or the OS or some other program on the client device will not allow the APP to be installed for a variety of reasons, for example.

If a YES branch is taken at the stage 2704, then the flow 2700 may transition to a stage 2706 where a source from which to install the APP may be located. A location of the source may be an address such as a URI, URL, FTP or other form of addressing. Configuration CFG 125 on a media device 100 may provide the information for the location of the source via a wireless link with the client device. The Cloud or the Internet may be the location for APP 2701. A data storage system, such as NAS, RAID, SSD, HDD, Flash Memory, RAM, the Cloud, the Internet, may be the location for APP 2705. A TAG or barcode 2993 displayed on a display, such as DISP 180 of a media device 100 or positioned on a surface of a media device 100 (e.g., as decal, screen printed, engraved, etc.), may be encoded with data for a location or address for the source of the APP. The TAG or barcode 2993 may be imaged by an image capture system of the client device and processed to obtain the location. The APP may be downloaded or otherwise installed from an application store (e.g., Google Play, the App Store, or the like). The foregoing are non-limiting examples of locations for a source of the APP.

At a stage 2708 the APP may be installed on the client device using a communications links such as a wireless link, or wired link, for example. At a stage 2710 a determination may be made as to whether or not the APP was successfully installed. If a NO branch is taken, then the flow 2700 may transition to another stage, such as back to the stage 2706 or other, to re-attempt to locate and/or re-install the APP. If a YES branch is taken, then the flow may transition to the stage 2712 and the APP may be executed on the client device or the user may be promoted to "OPEN" the APP to cause it to execute.

Optionally, in flow 2700, at a stage 2714 a determination may be made as to whether or not any AP's (e.g., one or more wireless access points) are detected by the RF system of the client device (e.g., by its WiFi and/or Cellular radios). If AP's are detected a YES branch may be taken to a stage 2716 where the client device (e.g., via an API call) may Ping packets in an active wireless scan using its native resources (e.g., for the media device(s) 100 to sniff and/or scan for in monitor mode (MM)), as was described above. Flow 2700 may transition from the stage 2716 to some other flow or process denoted as 2799. If a NO branch is taken, then flow 2700 may transition to a stage 2718 where the APP initiates the active scan to Ping packets for the media device(s) to sniff/scan in MM. The APP may cause the active scan using an API call or other action that causes resources of the client device (e.g., its RF system or others) to initiate and/or maintain the active scan. Flow 2700 may transition from the stage 2718 to some other flow or process denoted as 2798.

In some examples, the stage 2702 may take the NO branch even though the APP is installed on the client device because a newer revision and/or update of the APP (e.g., a current version) may be available for installation. Therefore, the stage 2702 may comprise a determination of whether or not the APP or current version of the APP is installed on the client device. If the APP is installed but is not a current version, then the NO branch may be taken to the stage 2704 as described above. Flow 2700 may be entered into from some other flow or process as denoted by 2797.

Attention is now directed to FIG. 1E where one example 2800 of a wireless client device 220 (e.g., a smartphone, tablet, pad, data capable strap band, smart watch, etc.) broadcasting an active wireless scan Tx 2803 in an environment 198 that includes at least one wireless media device 100 configured to listen Rx 2801 (e.g., scan using a radio receiver) for the active wireless scan 2803. Client device 220 may be in wireless communications with other wireless systems such as a cellular system (e.g., 2G, 3G, 4G, etc.) as denoted by Tx/Rx 2807 from source 2830 (e.g., a cellular communications tower) and Tx/Rx 2805 from a radio in the client device 220

(e.g., a cellular radio). For purposes of explanation, assume in example 2800 that one or more of the systems of media device 100 have sensed 197 a presence of the user 201 (e.g., via PROX 113 and/or A/V 109) and/or client device 220 (e.g., by receiving Rx 2801 transmitted Tx 2803 Pings) in ENV 198. User 201 may already know or may be prompted by media device 100 to move or otherwise position the client device 220 in near field proximity of the media device 100, and that near field proximity may include touching or otherwise making physical contact between the client device 220 and media device 100 as will be described below. Media device may prompt/notify user 201 via one of its systems such as display DISP 180 or SPK 170. For example, SPK 170 may emit a sound 2933 that is heard by user 201 and that sound may be a signature sound (e.g., beeps, tones, notes, etc.) that may indicate the media device has detected presence of user 201 and/or client device 220 or the sound 2933 may be an audio recording (e.g., from a stored MP3 file). The sound 2933 may instruct the user 201 to touch the client device 220 to the media device 100 and/or to bring the client device 220 into close or very close near field proximity of the media device 100 (e.g., 10 centimeters or less).

Received signal strength of the RF signal that comprises the active scan may increase or decrease based on a distance between the client device 220 and the media device 100. In FIG. 1E that distance (which may vary) between the client device 220 and media device 100 is denoted as ΔD 2830. At four different values of ΔD 2830 denoted as points a-d, a signal power of the transmitted active scan Tx 2803 as received by the RF system 107 of media device 100 is denoted a $P_{RF}$. A triangle with bars in it is used to illustrate relative signal strength (e.g., $P_{RF}$) as calculated (e.g., by RF 107 and/or controller 101) by the media device 100 at various distances ΔD 2830 at points a-d. At point a where the client device 220 is further away from the media device 100, $P_{RF}$ may be one bar and calculated signal strength may be relatively very low. At point b the client device 220 is somewhat closer to the media device 100 and $P_{RF}$ may be three bars and calculated signal strength may be relatively low. At point C, the client device 220 is closer to the media device 100 and $P_{RF}$ may be four bars and calculated signal strength may be relatively medium. Finally, at point d, the client device 220 may be in close to very close near field proximity distance to the media device 100 and $P_{RF}$ may be seven bars and calculated signal strength may be relatively high. As one example, at point d, the client device 220 and the media device 100 may be in direct physical contact with each other such that the client device is touching and/or resting on a portion 199c of chassis 199 of the media device 100 (see 199cv in FIG. 1I). Motion sensors or other systems or sensors (e.g., PROX 113, PSEN 520, MIC 170) may be used to detect actual physical contact between the client device 220 and the media device 100, such as by sound, vibrations, mechanical energy generated by the actual physical contact. As another example, at point d, the client device 220 may be 10 centimeters or less away from the media device 100 (e.g., point d may be 5 mm away or less). In FIG. 1E, various systems and elements of media device 100 are depicted only for purposes of explanation and actual interconnection between those systems and/or elements are not depicted.

In FIG. 1E, it should be noted that it is desirable for content transfer and/or content handling by media device 100 as described herein be as straight forward, reliable, repeatable, and occur with minimum effort by user 201. To that end, a user knowing that contacting the client device 220 to the media device 100 and/or resting/placing the client device 220 on the media device 100 may be the best way to ensure seamless wireless linking and content transfer/handling may be the use model associated with interacting various client devices with the media device(s) 100 and that use model may be instructed or otherwise communicated to the user using audio (e.g., SPK 160) and/or visual means (e.g., DISP 180 and/or screen 2811 of 220), advertising, mass media, user manual, web page, videos (e.g., YouTube), just to name a few. Moreover, $P_{RF}$ as calculated by media device 100 may vary due not only to variations in distance ΔD 2830 but also may vary due to an orientation of the client device 220 relative to the media device 100 as denoted by ΔO 2831. Antenna radiation patterns of antennas in client device 220, structures in ENV 198, portions of user 201's body, may affect the RF signal Tx 2803 during active scanning. For example, translation and/or rotation motions of the client device 220 along X-Y-Z axes that cause orientation ΔO 2831 of the client device 220 relative to media device 100 to vary. Therefore, contacting/placing/resting the client device 220 on the media device 100 (e.g., at 199c) may provide the most consistent and reliable way to ensure effective wireless linking in the near field (NF) and subsequent content transfer and/or handling.

In FIG. 1E, example 2800 may include more or fewer resources/elements than depicted as denoted by 2822, 2824, 2826, and 2830, for example. Content C on or accessible by client device 220 may reside in whole or in part on the client device 220, in resource 2850 (e.g., the Cloud or the Internet), or other locations (e.g., NAS).

Moving now to FIG. 1F where non-limiting examples 2900-2900c of contact (220s, 199t) between a wireless client device 220 and a wireless media device 100 and subsequent wireless linking Lx 2910) and content transfer/handling (2290) are depicted. In example 2900 user 201 has entered ENV 198 with client device 220 and the user 201 and/or client device 220 have been detected by media device 100 as described herein (e.g., by PROX 113, PSEN 520, by sound 2930, 2931 and/or by RF signal from active scan Tx 2803). In example 2900a, the user 201 has positioned the client device 220 into contact (220s, 199t) with media device 100, while the active scan Tx 2803 is in progress, by reducing distance ΔD 2830 to approximately zero such that client device 220 is resting on a surface 199t of chassis 199. Media device 100 may be listening Rx 2801 for the active scan Tx 2803 and calculated signal strength $P_{RF}$ when client device 220 and media device 100 are in contact with each other may be indicative of physical contact and/or actual physical contact, contact may be verified by one or more other systems (e.g., motion sensors) of media device 100 such as signals generated by vibration 199v created by the contact or 199v created by a vibration engine or motor within client device 220 and activated by the APP, for example.

Post contact, client device 220 and media device 100 may establish a wireless communications link Lx 2910 and may communicate and/or handshake data between each other. For example, content data on client device 220 may be transferred to media device 100 as denoted by 2920 and transferred content Ct. Media device 100 may handle and transferred content Ct or may take some other action with regard to the transferred content Ct including taking no action at all. Post establishing the wireless communications link Lx 2910 (e.g., a BT link), information exchanged between or otherwise resident in the client device 220 (e.g., APP), the media device 100 (e.g., CFG 125) or both may be used to establish another wireless link Wx 2930 (e.g., to a WiFi network or a Cellular network). Wireless link Wx 2930 may be used by media device 100 to access content presented by client device 220 for transfer and/or handling, such wirelessly accessing resource 2850 for content C1 . . . Cn, for example. The APP (e.g., APP 225), an updated version/revision of the APP, or other data may be accessed by the client device 220 using wireless link Wx 2930 (e.g., from resource 2850). Similarly, media device 100 may access CFG 125, a revised/updated version of CFG 125, or other data using wireless link Wx 2930 (e.g., from resource 2850).

Client device 220 may image 2996 a Tag, bar code, or other image 2993 presented on display 180 and/or chassis 199 of media device 100 and use information encoded therein to obtain APP, access credentials, or other data or commands. Similarly, media device 100 may image a Tag, bar code, or other image 193 presented on screen 2911 of client device 220 to access content, obtain access credentials, etc.

In example 2900*b*, the client device 220 may be positioned vertically in contact with a portion 199*s* (e.g., a front panel) of chassis 199. In example 2900*c*, a portion of the client device 220 is positioned on an end portion of an upper surface 199*t* of chassis 199 such that the entire housing of client device 220 need not be positioned in contact with upper surface 199*t*. Actual placement and portions of chassis 199 were the client device 220 ought to be positioned in contact with will vary by application and is not limited to the examples depicted and/or described herein. Post contact and wireless linking between the client device 220 and the media device 100 either device may use one or more of its radios or other wireless systems (e.g., acoustic, optical, etc.) to communicate with each other or with other wireless systems such as resource 2850, cellular tower 2830 of FIG. 1E, an AP, just to name a few.

Figure 1G:
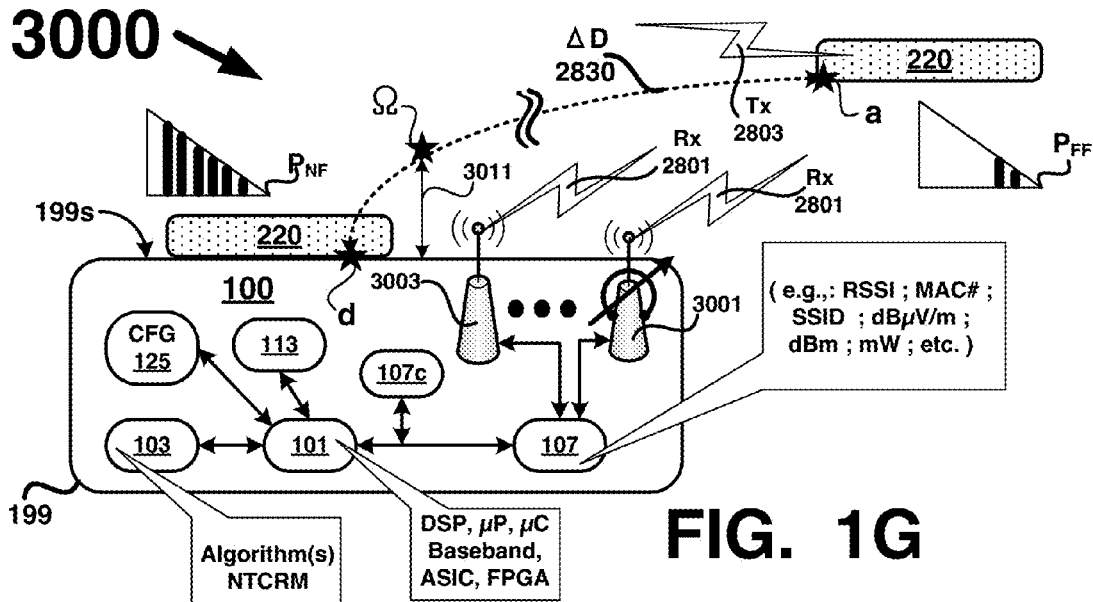
FIG. 1G depicts an example of a wireless media device receiving RF signals from an active wireless scan broadcast by a client device and calculating RF signal strength as an approximate indication of proximity of a wireless client device according to an embodiment of the present application.

Referring now to FIG. 1G where an example 3000 of a wireless media device 100 receiving Rx 2801 RF signals from an active wireless scan Tx 2803 broadcast by client device 220 and the media device 100 calculating RF signal strength $P_{RF}$ as an approximate indication of proximity distance ΔD 2830 of the client device 220 to the media device 100. Here, as the distance ΔD 2830 decreases from FF to NF and client device 220 is positioned into contact (denoted by d) with the media device 100, RF 107 may activate one or more of its radios and/or antennas 3001-3003 to listen for or otherwise scan for RF signals indicative of active scan Tx 2803 being transmitted by client device 220. A plurality of antennas 3001-3003 may be electrically coupled with a single radio in RF 107 or with a plurality of radios in RF 107. One of the antennas couple with circuitry in RF 107 may comprise a detunable antenna 3001 (e.g., see 124, 129 in FIG. 1A) which may be electrically and/or mechanically tuned to alter its RF reception characteristic, its RF transmission characteristic or both. As one example, active scan Tx 2803 may comprise a RF signal conforming to one or more of IEEE 802.11 wireless protocols and associated frequency bands. Antenna 3001 may be detuned to (e.g., from its optimized frequency band or range) to receive and/or transmit in another band (e.g., a cellular band) to detect RF signals transmitted by client device 220 in the another band. As distance ΔD 2830 decreases while the client device 220 is moving towards the media device 100 (e.g., from FF to NF), signals from detuned antenna 3001 may be processed and may be used to confirm proximity, actual contact, to supplement and/or bolster other calculations or analysis such as calculating RF signal strength $P_{RF}$. Antenna 3001 or one or more other antennas may establish a wireless link (e.g., Lx 2910, Wx 2930) with the client device 220 prior to or after contact with media device 100. In some applications, the client device 220 need not contact the media device 100 and positioning the client device 220 at a distance 3011 at a point denoted as Ω may be sufficient (e.g., calculated signal strength at NF point Ω is less than at actual contact NF point d but is greater than FF point a) for proximity detection and wireless linking between the client device 220 and the media device 100.

Circuitry and/or software in RF 107 or other systems of media device 100 may be used to calculate signal strength $P_{RF}$ and may be used to determine which antenna(s) to use, and to detune the detunable antenna 3001. DS 103 or other data storage system may include one or more algorithms and associated data (if any) embodied in a non-transitory computer readable medium (NTCRM) configured to execute on controller 101. Controller 101 may include one or more processor, processing cores, compute engines or the like including but not limited to one or more of DSP, μC, μP, baseband processor, ASIC, FPGA, or other hardware circuitry. RF 107 may operate alone or in conjunction with other systems such as DS 103 and controller 101, for example, to calculate RF signal strength as client device 220 moves in distance ΔD 2830 between FF and NF and RF 107 and/or other systems may determine what calculated value for $P_{RF}$ may be indicative of contact and/or very close NF proximity (e.g., client device positioned at distance 3011).

Figure 1H:
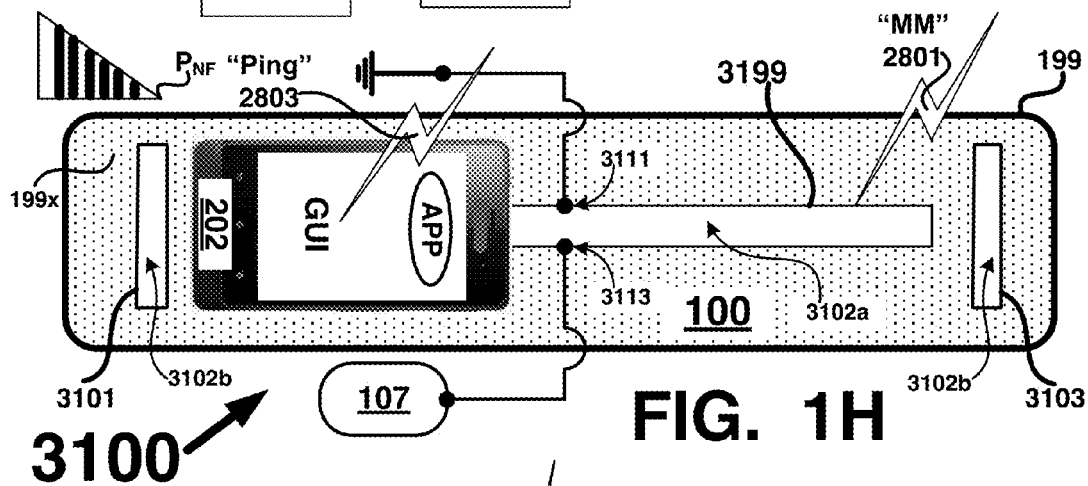
FIG. 1H depicts one example of an antenna structure that may be used in a wireless media device to for receiving RF signals from a wireless client device according to an embodiment of the present application.

Reference is now made to FIG. 1H where one example 3100 of an antenna structure 3199 that may be used in the wireless media device 100 to receiving RF signals (e.g., Rx 2801) from the wireless client device 220. Media device may include an electrically conductive substrate 199*x* that includes at least one aperture 3102*a* (e.g., a through hole) forming antenna 3199 and a plurality of apertures denoted as 3102*a* and 3102*b* that form passive slits 3101 and 3103 in substrate 199*x*. Antenna 3199 and passive slits 3101 and 3103 are described in U.S. patent application Ser. No. 13/952,532, filed on Jul. 26, 2013, and titled "Radio Signal Pickup From An Electrically Conductive Substrate Utilizing Passive Slits" already incorporated herein by reference. Nodes 3113 and 3111 of antenna 3199 may be electrically coupled with RF 107 and a ground potential as depicted; however, actual electrical coupling of the antenna 3199 will be application dependent and is not limited to the example depicted. Antenna 3199 may receive Rx 2801 the transmitted RF signal 2803 from the active scan active in a wireless scanning or listening mode denoted as monitor mode (MM). Here, client device 220 when in the NF may be positioned directly above substrate 199*x* (e.g., a few millimeters or less) or in direct contact with substrate 199*x* such that the pinged 2803 active scan will have a high relative signal strength indicative of contact with (e.g., 199*s* at point d of FIG. 1G) or very close NF proximity (e.g., distance 3011 at point Ω of FIG. 1G) to media device 100.

Figure 1I:
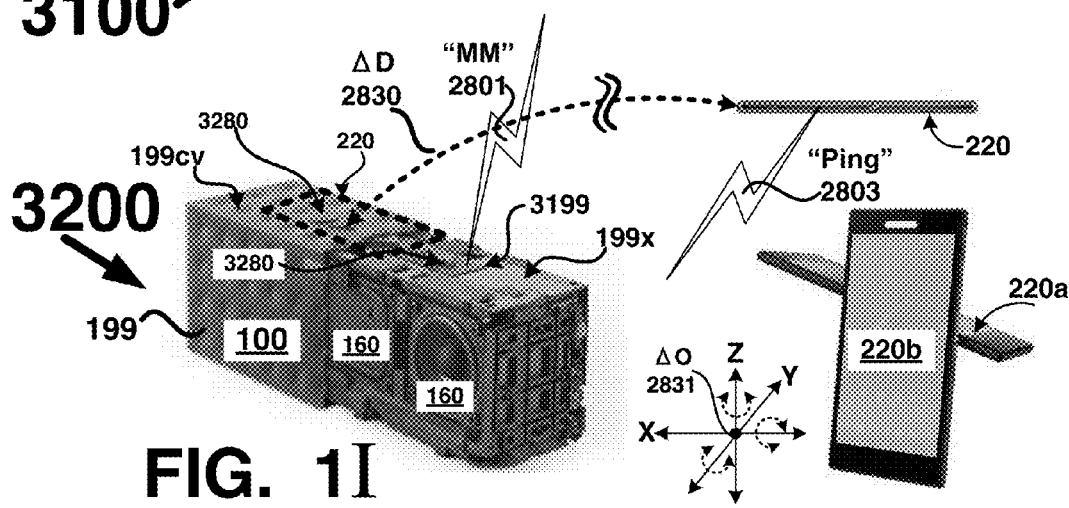
FIG. 1I depicts one example of wireless client device orientation and placement relative to a wireless media device according to an embodiment of the present application.

Moving now to FIG. 1I where one example 3200 of wireless client device 220 orientation and placement relative to a wireless media device 100 is depicted. Here, substrate 199*x* may be positioned below an outer covering 199*cv* of chassis 199 and antenna 3199 may be disposed around functional and/or ornamental elements 3280 (e.g., buttons, switches, Logos, etc.). Client device 220 (depicted in dashed outline) may be positioned in contact with outer cover 199*cv* as denoted by the dashed arrow for ΔD 2830 and as depicted above in FIGS. 1G-1H, for example. Positioning of client device 220 in the orientation as depicted on covering 199*cv* may have the advantages described above, as opposed to alternate orientations of the client device denoted as 220*a* and 220*b* in which translations and/or rotations about axis ΔO 2831 may affect orientation of antenna(s) in the client device 220 relative to antenna(s) in media device 100 and may affect calculated RF signal strength $P_{RF}$. Therefore, a resting position, such as an approximately horizontal position of the client device 220 on the media device 100 may be one non-limiting example of a preferred orientation of the client device when it is in contact with the media device 100. For example, the user 201 knowing that placing the client device 220 in a horizontal position on covering 199cv of media device 100 is the correct and/or most reliable way to effectuate wireless linking and subsequent content transfer/handling may allow for a user experience with interaction between the media device 100 and the users client devices that is easy to follow, consistent, and provides reliable and repeatable results.

Figure 1J:
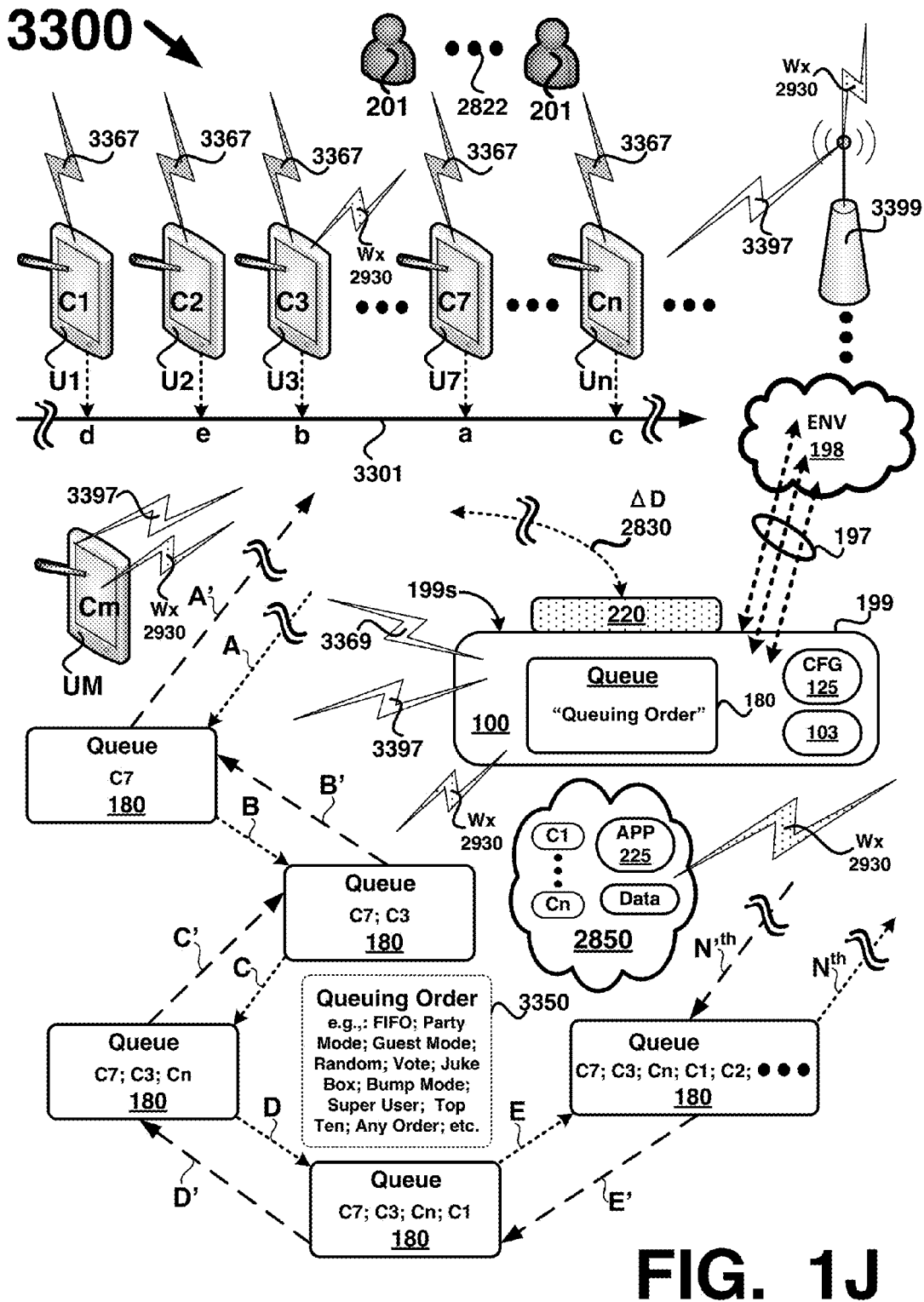
FIG. 1J depicts one example of one or more wireless client devices that touch or otherwise contact a wireless media device for content transfer and queuing of transferred content according to a queuing order according to an embodiment of the present application.

Attention is now directed to FIG. 1J where one example 3300 of one or more wireless client devices U1-Un that touch or otherwise contact a wireless media device 100 for content transfer and/or queuing of transferred content is depicted. Here, one or more client devices denoted as U1-Un may each have content therein or access to content (e.g., from resource 2850 or other), denoted as content C1-Cn. Each client device as it enters ENV 198 is broadcasting active scans 3367 by operation of the aforementioned APP, native client device resources, or both. A sequence 3301 having events a-e, depicts one possible timeline for entry and detection 197 of the client devices in ENV 198 by media device 100. Although one media device 100 is depicted there may be a plurality of media devices 100 in ENV 198 and those devices 100 may be in wired and/or wireless communication with one another. In sequence 3301, the first event is a for entry and detection of client device U7, followed in order by events b, C, d and e for entry and detection of client devices U3, Un, U1, and U2 respectively.

Now, each client device U1-Un broadcasts pings in an active scans 3367 that are received 3369 by the media device 100, and each device is subsequently moved into contact with surface 199s of media device 100 according to the sequence 3301 as denoted by dashed line for ΔD 2830. Therefore, a dashed arrows for upper case letters A-E represent the equivalent lower case letters a-e for client devices in sequence 3301 as they contact the media device 100 and have their content C1-Cn transferred and handled by the media device 100 in an optional Queue in an optional Queuing Order, which may be presented on display 180 of the media device 100 and/or the displays of some or all of the client devices U1-Un.

Now, in sequence 3301 lower case a for client device U7 is the first client device to contact media device 100 and have its content transferred and optionally handled by media device 100 or some other media device 100 (not shown); therefore, dashed arrow for upper case A depicts U7's content C7 being placed in the Queue on media device 100. Being placed in the Queue may not automatically infer that the content C7 will be handled by media device 100; however, for purposes of explanation, it will be assumed that at least some of the content in the Queue will be handled by media device 100.

Similarly, as U3 (lower case b) is contacted, dashed arrow for upper case B depicts content C3 from U3 being added to the Queue such that the Queue now includes (C7; C3). And so it may continue for the remaining client devices Un, U1, and U2 in c-e of sequence 3301 such that after the last client device U2 has contacted media device 100, the Queue now includes (C7; C3; Cn; C1; and C2). If additional client devices are introduced into ENV 198 and contact media device 100, dashed arrow for Nth denotes that content from the additional client devices may be added to the Queue. Dashed arrows for N'th-A' denote that the Queue may have content removed from it as client devices either command retrieval of their content or command the media device 100 to stop handling their content (e.g., via APP 225) or by operation or control of the media device 100 (e.g., via CFG 125 or other algorithm), for example. Content may be removed or otherwise bumped from the Queue as the client device(s) move out of ENV 198 and/or out of wireless communications and/or detection range of media device 100, for example. The order or removal/bumping may not be in the same order in which content was added to the Queue. However, if the sequence of removal from the Queue is the exact opposite of the sequence of addition to the Queue, then C2 would be removed first as denoted by dashed arrow E' followed by C1, Cn, C3, and lastly C7 as denoted by dashed arrows D'-A', for example.

Subsequent to being transferred and optionally added to the Queue, queued content (e.g., C1-Cn) may be optionally handled by media device 100 or one or more other media devices 100 in wired and/or wireless communication with the media device 100 in some Queuing Order that may be determined by one or more commands received by a media device 100 from another media device 100 or one or more client devices, an algorithm or software (e.g., CFG 125 and/or APP 225), for example. The Queuing Order may control how content C is added to and/or remove from the Queue. Handling by the media device 100 or other media devices 100 may comprise actions including but not limited to playback of the content, presentation of the content, wired and/or wireless communication of the content to some other system or device, accessing the content, providing or denying access to the content, storing the content, buffering the content, processing the content, analyzing the content, just to name a few.

Non-limiting examples of Queuing Order may include but are not limited to: first-in-first-out (FIFO) where the first item of content to be added to the Queue is acted on first according to the Queuing Order; last-in-first-out (LIFO) where the last item of content to be added to the Queue is acted on first according to the Queuing Order; random where content in the Queue is acted in in a random Queuing Order (e.g., using an algorithm); shuffle play where content in the Queue is randomly selected for playback or other action according to some algorithm or the like; a guest mode where a guest or guests have their content acted on in preference over other content of another, such as a host of the guests; a party mode where each participant brings their client device into contact with the media device 100 and their content is the next to be played back or bumps (e.g., removes) content already being played back; a juke box mode where one or more items of content from a client device are queued for playback or other action in the order in which they were received by the media device 100 relative to items of content from other client devices; a bump mode where each touch of a client device to the media device bumps content currently being handled and replaces it with the content of the client device that made the touch; a vote mode where client devices or other devices in communication with the media device 100 may vote on which content in the Queue they want handled and in what order and based on the most votes received (e.g., a majority vote) for each item of content in the Queue (e.g., out of ten voters content C7 got five votes; C3 got two votes; and Cn got one vote so the Queuing Order is C7 first, C3 second, and Cn third); a top ten mode where content may be placed in the Queuing Order based on some published list or media authority (e.g., iTunes, Billboard, Rolling Stones, Pandora, Amazon, Yahoo, Google, Spotify, Internet Radio, YouTube top ten, top 100, top hits, now trending, or some other ranking or measure of popularity or acceptance); a play list mode where queued content matching entries in one or more playlists is acted on in the Queuing Order according to the entries in the playlist(s); a super user mode where an owner or user (e.g., client device UM) having control over the media device(s) 100 determines the Queuing Order or has their content (e.g., Cm) preferentially queued in the Queuing Order; and any order which may be commanded, programmed, algorithmically determined, or otherwise using hardware, software or both (e.g., via CFG 125 and/or APP 225); just to name a few.

In FIG. 1J, a super user may use client device UM and/or media device(s) 100 to control access to the media device(s) 100 and the transfer and/or handling of content, including the queuing and queuing order of the content. ENV 198 may include an AP 3399 which may or may not be accessible via access credentials by one or more of the other client devices U1-Un, although active scan pings from a RF signal 3397 from the AP 3399 may be used in place of or in conjunction with active scan pings caused by the APP on one or more of the other client devices U1-Un. Client device UM and/or media device(s) 100 may be wirelessly linked 3397 (e.g., via 802.11 WiFi) with AP 3399. Some or all of the content C1-Cn or Cm may be accessed from the client devices it resides on or from an external location such a resource 2850, NAS (e.g., via AP 3399), a cellular network, or a variety of wired and/or wireless communications networks, for example. Client devices and/or media devices 100 may be wirelessly linked Wx 2930 with resource 2850 (e.g., via cellular link or AP 3399).

Simple Out-of-the-Box User Experience

Figure 2A:
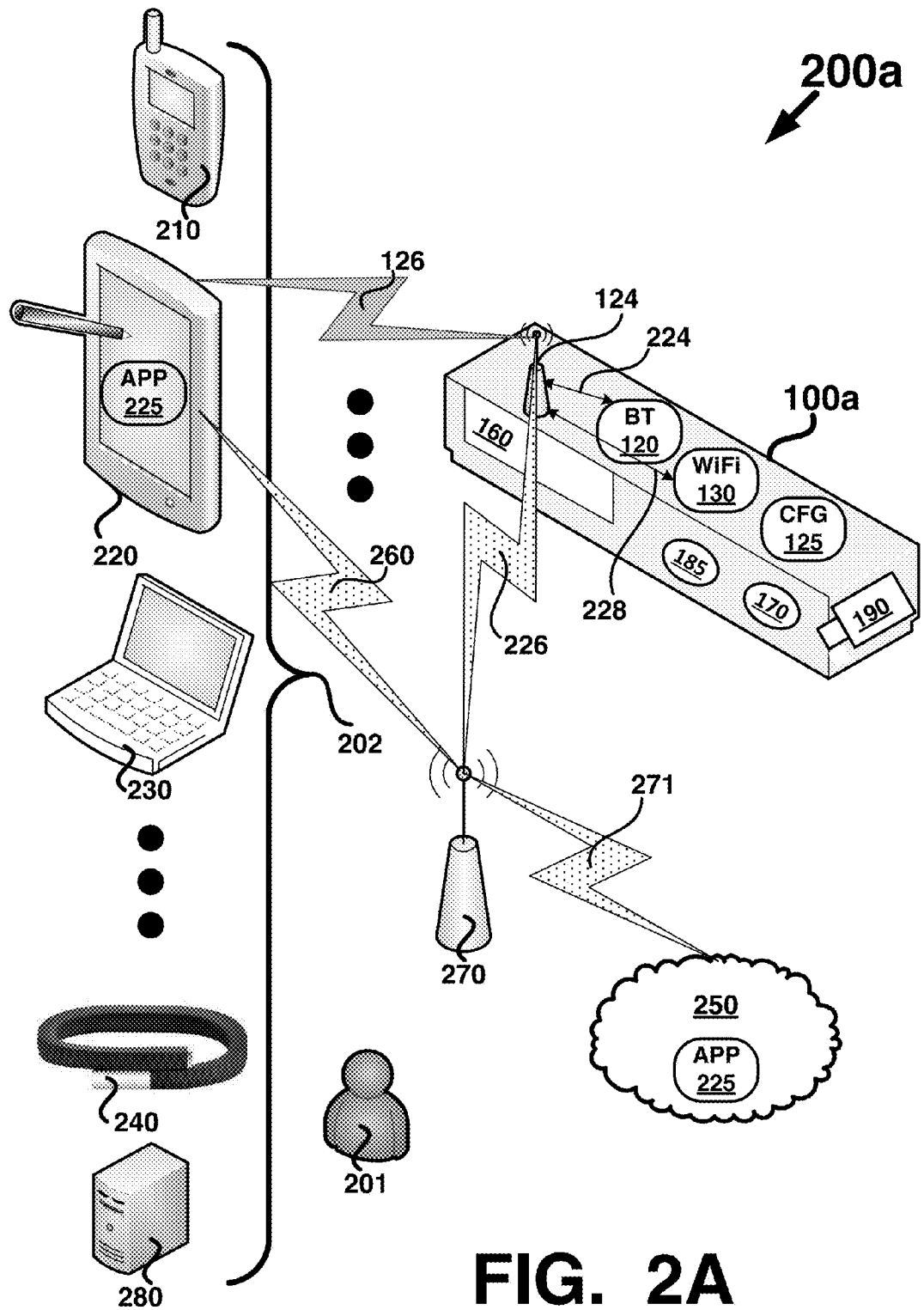
FIG. 2A depicts one example of a configuration scenario for a user device and a media device according to an embodiment of the present application.

Attention is now directed to FIG. 2A, where a scenario 200a depicts one example of a media device (e.g., media device 100 of FIG. 1A or a similarly provisioned media device) being configured for the first time by a user 201. For purposes of explanation, in FIG. 2A media device is denoted as 100a to illustrate that it is the first time the media device 100a is being configured. For example, the first configuration of media device 100a may be after it is purchased, acquired, borrowed, or otherwise by user 201, that is, the first time may be the initial out-of-the-box configuration of media device 100a when it is new. Scenario 200a depicts a desirable user experience for user 201 to achieve the objective of making the configuring of media device 100a as easy, straight forward, and fast as possible.

To that end, in FIG. 2A, scenario 200a may include media device 100a to be configured, for example, initially by user 201 using a variety of devices 202 including but not limited to a smartphone 210, a tablet 220, a laptop computer 230, a data capable wristband or the like 240, a desktop PC or server 280, . . . etc. For purposes of simplifying explanation, the following description will focus on tablet 220, although the description may apply to any of the other devices 202 as well. Upon initial power up of media device 100a, controller 101 may command RF system 107 to electrically couple 224, transceiver BT 120 with antenna 124, and command BT 120 to begin listening 126 for a BT pairing signal from device 220. Here, user 201 as part of the initialization process may have already used a Bluetooth® menu on tablet 220 to activate the BT radio and associated software in tablet 220 to begin searching (e.g., via RF) for a BT device to pair with. Pairing may require a code (e.g., a PIN number or code) be entered by the user 201 for the device being paired with, and the user 201 may enter a specific code or a default code such as "0000", for example.

Subsequently, after tablet 220 and media device 100a have successfully BT paired with one another, the process of configuring media device 100a to service the specific needs of user 201 may begin. In some examples, after successful BT pairing, BT 120 need not be used for wireless communication between media device 100a and the user's device (e.g., tablet 220 or other). Controller 101, after a successful BT pairing, may command RF system 107 to electrically couple 228, WiFi 130 with antenna 124 and wireless communications between tablet 220 and media device 100a (see 260, 226) may occur over a wireless network (e.g., WiFi or WiMAX) or other as denoted by wireless access point 270. Post-pairing, tablet 220 requires a non-transitory computer readable medium that includes data and/or executable code to form a configuration (CFG) 125 for media device 100a. For purposes of explanation, the non-transitory computer readable medium will be denoted as an application (APP) 225. APP 225 resides on or is otherwise accessible by tablet 220 or media device 100a. User 201 uses APP 225 (e.g., through a GUI, menu, drop down boxes, or the like) to make selections that comprise the data and/or executable code in the CFG 125.

APP 225 may be obtained by tablet 220 in a variety of ways. In one example, the media device 100a includes instructions (e.g., on its packaging or in a user manual) for a website on the Internet 250 where the APP 225 may be downloaded. Tablet 220 may use its WiFi or Cellular RF systems to communicate with wireless access point 270 (e.g., a cell tower or wireless router) to connect 271 with the website and download APP 255 which is stored on tablet 220 as APP 225. In another example, tablet 220 may scan or otherwise image a barcode or TAG operative to connect the tablet 220 with a location (e.g., on the Internet 250) where the APP 225 may be found and downloaded. Tablet 220 may have access to an applications store such as Google Play for Android devices, the Apple App Store for iOS devices, or the Windows 8 App Store for Windows 8 devices. The APP 225 may then be downloaded from the app store. In yet another example, after pairing, media device 100a may be preconfigured to either provide (e.g., over the BT 120 or WiFi 130) an address or other location that is communicated to tablet 220 and the tablet 220 uses the information to locate and download the APP 225. In another example, media device 100a may be preloaded with one or more versions of APP 225 for use in different device operating systems (OS), such as one version for Android, another for iOS, and yet another for Windows 8, etc. In that OS versions and/or APP 225 are periodically updated, media device 100a may use its wireless systems (e.g., BT 120 or WiFi 130) to determine if the preloaded versions are out of date and need to be replaced with newer versions, which the media device 100a obtains, downloads, and subsequently makes available for download to tablet 220.

Regardless of how the APP 225 is obtained, once the APP 225 is installed on any of the devices 202, the user 201 may use the APP 225 to select various options, commands, settings, etc. for CFG 125 according to the user's preferences, needs, media device ecosystem, etc., for example. After the user 201 finalizes the configuration process, CFG 125 is downloaded (e.g., using BT 120 or WiFi 130) into DS system 103 in media device 100a. Controller 101 may use the CFG 125 and/or other executable code to control operation of media device 100a. In FIG. 2A, the source for APP 225 may be obtained from a variety of locations including but not limited to: the Internet 250; a file or the like stored in the Cloud; a web site; a server farm; a FTP site; a drop box; an app store; a manufactures web site; or the like, just to name a few. APP 225 may be installed using other processes including but not limited to: dragging and dropping the appropriate file into a directory, folder, desktop or the like on tablet 220; emailing the APP 225 as an attachment, a compressed or ZIP file; cutting and pasting the App 225, just to name a few.

CFG 125 may include data such as the name and password for a wireless network (e.g., 270) so that WiFi 130 may connect with (see 226) and use the wireless network for future wireless communications, data for configuring subsequently purchased devices 100, data to access media for playback, just to name a few. By using the APP 225, user 201 may update CFG 125 as the needs of the user 201 change over time, that is, APP 225 may be used to re-configure an existing CFG 125. Furthermore, APP 225 may be configured to check for updates and to query the user 201 to accept the updates such that if an update is accepted an updated version of the APP 225 may be installed on tablet 220 or on any of the other devices 202. Although the previous discussion has focused on installing the APP 225 and CFG 125, one skilled in the art will appreciate that other data may be installed on devices 202 and/or media device 100a using the process described above. As one example, APP 225 or some other program may be used to perform software, firmware, or data updates on device 100a. DS system 103 on device 100a may include storage set aside for executable code (e.g., an operating system) and data used by controller 101 and/or the other systems depicted in FIG. 1.

Figure 2B:
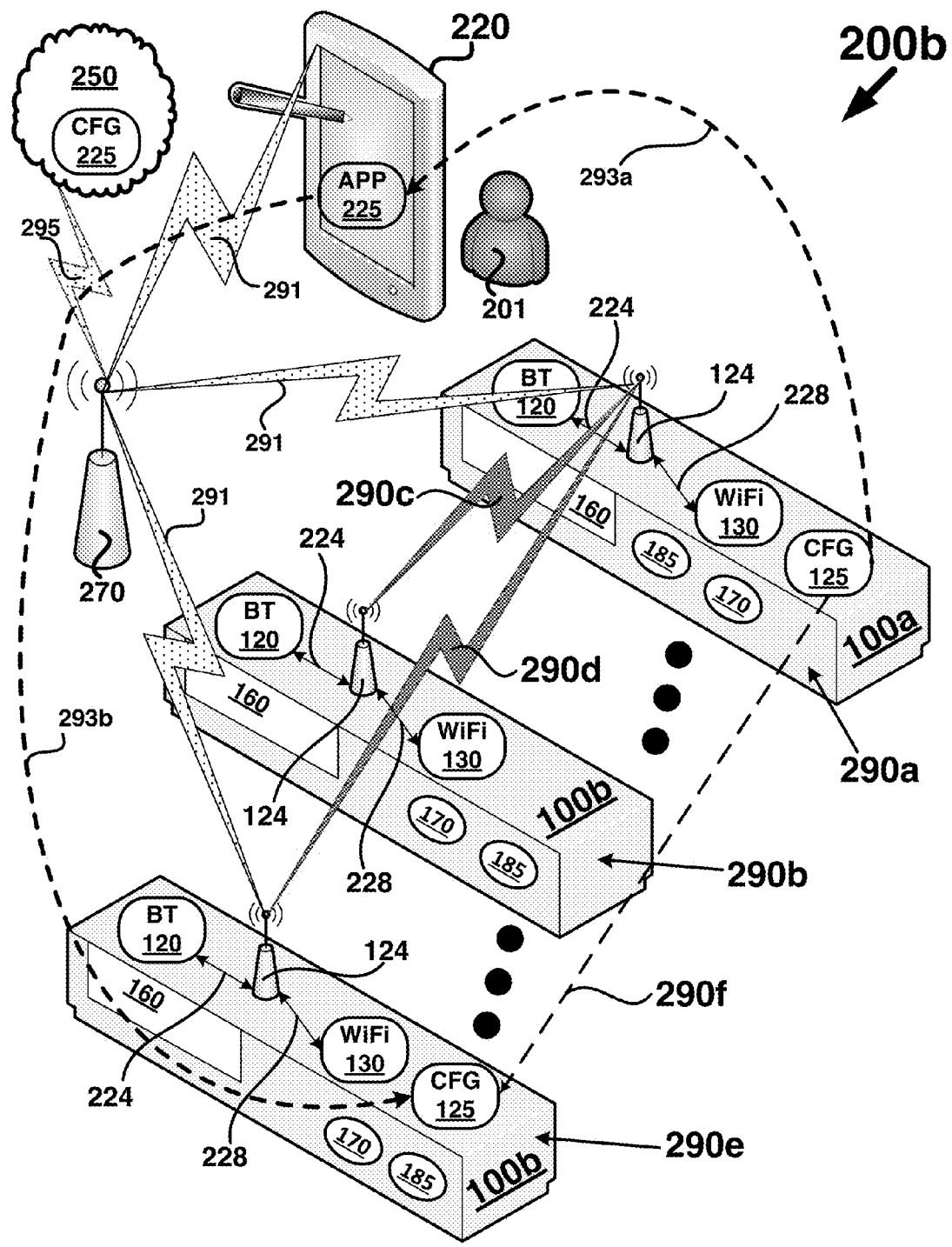
FIG. 2B depicts example scenarios for another media device being configured using a configuration from a previously configured media device according to an embodiment of the present application.

Moving on to FIG. 2B, where a several example scenarios of how a previously configured media device 100a that includes CFG 125 may be used to configure another media device 100b that is initially un-configured. In scenario 200b, media device 100a is already powered up or is turned on (e.g., by user 201) or is otherwise activated such that its RF system 107 is operational. Accordingly, at stage 290a, media device 100a is powered up and configured to detect RF signatures from other powered up media devices using its RF system 107. At stage 290b another media device denoted as 100b is introduced into RF proximity of media device 100a and is powered up so that its RF system 107 is operational and configured to detect RF signatures from other powered up media devices (e.g., signature of media device 100a). Here RF proximity broadly means within adequate signal strength range of the BT transceivers 120, WiFi transceivers 130, or any other transceivers in RF system 107, RF systems in the users devices (e.g., 202, 220), and other wireless devices such as wireless routers, WiFi networks (e.g., 270), WiMAX networks, and cellular networks, for example. Adequate signal strength range is any range that allows for reliable RF communications between wireless devices. For BT enabled devices, adequate signal strength range may be determined by the BT specification, but is subject to change as the BT specification and technology evolve. For example, adequate signal strength range for BT 120 may be approximately 10 meters (e.g., ~30 feet). For WiFi 130, adequate signal strength range may vary based on parameters such as distance from and signal strength of the wireless network, and structures that interfere with the WiFi signal. However, in most typical wireless systems adequate signal strength range is usually greater than 10 meters.

At stage 290b, media device 100b is powered up and at stage 290c its BT 120 and the BT 120 of media device 100a recognize each other. For example, each media device (100a, 100b) may be pre-configured (e.g., at the factory) to broadcast a unique RF signature or other wireless signature (e.g., acoustic) at power up and/or when it detects the unique signature of another device. The unique RF signature may include status information including but not limited to the configuration state of a media device. Each BT 120 may be configured to allow communications with and control by another media device based on the information in the unique RF signature. Accordingly, at the stage 290c, media device 100b transmits RF information that includes data that informs other listening BT 120's (e.g., BT 120 in 100a) that media device 100b is un-configured (e.g., has no CFG 125).

At stage 290d, media devices 100a and 100b negotiate the necessary protocols and/or handshakes that allow media device 100a to gain access to DS 103 of media device 100b. At stage 290e, media device 100b is ready to receive CFG 125 from media device 100a, and at stage 290f the CFG 125 from media device 100a is transmitted to media device 100b and is replicated (e.g., copied, written, etc.) in the DS 103 of media device 100b, such that media device 100b becomes a configured media device.

Data in CFG 125 may include information on wireless network 270, including but not limited to wireless network name, wireless password, MAC addresses of other media devices, media specific configuration such as speaker type (e.g., left, right, center channel), audio mute, microphone mute, etc. Some configuration data may be subservient to other data or dominant to other data. After the stage 290f, media device 100a, media device 100b, and user device 220 may wirelessly communicate 291 with one another over wireless network 270 using the WiFi systems of user device 220 and WiFi 130 of media devices 100a and 100b.

APP 225 may be used to input the above data into CFG 125, for example using a GUI included with the APP 225. User 201 enters data and makes menu selections (e.g., on a touch screen display) that will become part of the data for the CFG 125. APP 225 may also be used to update and/or re-configure an existing CFG 125 on a configured media device. Subsequent to the update and/or re-configuring, other configured or un-configured media devices in the user's ecosystem may be updated and/or re-configured by a previously updated and/or re-configured media device as described herein, thereby relieving the user 201 from having to perform the update and/or re-configure on several media devices. The APP 225 or a location provided by the APP 225 may be used to specify playlists, media sources, file locations, and the like. APP 225 may be installed on more than one user device 202 and changes to APP 225 on one user device may later by replicated on the APP 225 on other user devices by a synching or update process, for example. APP 225 may be stored on the internet or in the Cloud and any changes to APP 225 may be implemented in versions of the APP 225 on various user devices 202 by merely activating the APP 225 on that device and the APP 225 initiates a query process to see if any updates to the APP are available, and if so, then the APP 225 updates itself to make the version on the user device current with the latest version.

Media devices 100a and 100b having their respective WiFi 130 enabled to communicate with wireless network 270, tablet 220, or other wireless devices of user 201. FIG. 2B includes an alternate scenario 200b that may be used to configure a newly added media device, that is, an un-configured media device (e.g., 100b). For example, at stage 290d, media device 100a, which is assumed to already have its WiFi 130 configured for communications with wireless network 270, transmits over its BT 120 the necessary information for media device 100b to join wireless network 270. After stage 290d, media device 100b, media device 100a, and tablet 220 are connected 291 to wireless network 270 and may communicate wirelessly with one another via network 270. Furthermore, at stage 290d, media device 100b is still in an un-configured state. Next, at stage 290e, APP 225 is active on tablet 220 and wirelessly accesses the status of media devices 100a and 100b. APP 225 determines that media device 100b is un-configured and APP 225 acts to configure 100b by harvesting CFG 125 (e.g., getting a copy of) from configured media device 100a by wirelessly 293a obtaining CFG 125 from media device 100a and wirelessly 293b transmitting the harvested CFG 125 to media device 100b. Media device 100b uses its copy of CFG 125 to configure itself thereby placing it in a configured state.

After all the devices 220, 100a, 100b, are enabled for wireless communications with one another, FIG. 2B depicts yet another example scenario where after stage 290d, the APP 225 or any one of the media devices 100a, 100b, may access 295 the CFG 125 for media device 100b from an external location, such as the Internet, the cloud, etc. as denoted by 250 where a copy of CFG 125 may be located and accessed for download into media device 100b. APP, media device 100b, or media device 100a, may access the copy of CFG 125 from 250 and wirelessly install it on media device 100b.

In the example scenarios depicted in FIG. 2B, it should be noted that after the pairing of media device 100a and tablet 220 in FIG. 2A, the configuration of media device 100b in FIG. 2B did not require tablet 220 to use its BT features to pair with media device 100b to effectuate the configuration of media device 100b. Moreover, there was no need for the BT pairing between tablet 220 and media device 100a to be broken in order to effectuate the configuration of media device 100b. Furthermore, there is no need for table 220 and media devices 100a and/or 100b to be BT paired at all with tablet 220 in order to configure media device 100b. Accordingly, from the standpoint of user 201, adding a new media device to his/her ecosystem of similarly provisioned media devices does not require un-pairing with one or more already configured devices and then pairing with the new device to be added to the ecosystem. Instead, one of the already configured devices (e.g., media device 100a having CFG 125 installed) may negotiate with the APP 225 and/or the new device to be added to handle the configuration of the new device (e.g., device 100b). Similarly provisioned media devices broadly means devices including some, all, or more of the systems depicted in FIG. 1A and designed (e.g., by the same manufacture or to the same specifications and/or standards) to operate with one another in a seamless manner as media devices are added to or removed from an ecosystem.

Reference is now made to FIG. 3 where a flow diagram 300 depicts one example of configuring a first media device using an application installed on a user device as was described above in regards to FIG. 2A. At a stage 302 a Bluetooth® (BT) discovery mode is activated on a user device such as the examples 202 of user devices depicted in FIG. 2A. Typically, a GUI on the user device includes a menu for activating BT discovery mode, after which, the user device waits to pick up a BT signal of a device seeking to pair with the user's device. At a stage 304 a first media device (e.g., 100a) is powered up (if not already powered up). At stage 306 a BT pairing mode is activated on the first media device. Examples of activating BT pairing mode include but are not limited to pushing a button or activating a switch on the first media device that places the first media device in BT pairing mode such that its BT 120 is activated to generate a RF signal that the user's device may discover while in discovery mode. I/O system 105 of media device 100 may receive 118 as a signal the activation of BT pairing mode by actuation of the switch or button and that signal is processed by controller 101 to command RF system 107 to activate BT 120 in pairing mode. In other examples, after powering up the first media device, a display (e.g., DISP 180) may include a touch screen interface and/or GUI that guides a user to activate the BT pairing mode on the first media device.

At a stage 308 the user's device and the first media device negotiate the BT pairing process, and if BT pairing is successful, then the flow continues at stage 310. If BT pairing is not successful, then the flow repeats at the stage 206 until successful BT pairing is achieved. At stage 310 the user device is connected to a wireless network (if not already connected) such as a WiFi, WiMAX, or cellular (e.g., 3G or 4G) network. At a stage 312, the wireless network may be used to install an application (e.g., APP 225) on the user's device. The location of the APP (e.g., on the Internet or in the Cloud) may be provided with the media device or after successful BT pairing, the media device may use its BT 120 to transmit data to the user's device and that data includes a location (e.g., a URI or URL) for downloading or otherwise accessing the APP. At a stage 314, the user uses the APP to select settings for a configuration (e.g., CFG 125) for the first media device. After the user completes the configuration, at a stage 316 the user's device installs the APP on the first media device. The installation may occur in a variety of ways (see FIG. 2A) including but not limited to: using the BT capabilities of each device (e.g., 220 and 100a) to install the CFG; using the WiFi capabilities of each device to install the CFG; and having the first media device (e.g., 100a) fetch the CFG from an external source such as the Internet or Cloud using its WiFi 130; just to name a few. Optionally, at stages 318-324 a determination of whether or not the first media device is connected with a wireless network may be made at a stage 318. If the first media device is already connected with a wireless network the "YES" branch may be taken and the flow may terminate at stage 320. On the other hand, if the first media device is not connected with a wireless network the "NO" branch may be taken and the flow continues at a stage 322 where data in the CFG is used to connect WiFi 130 with a wireless network and the flow may terminate at a stage 324. The CFG may contain the information necessary for a successful connection between WiFi 130 and the wireless network, such as wireless network name and wireless network password, etc.

Now reference is made to FIG. 4A, where a flow diagram 400a depicts one example of a process for configuring an un-configured media device "B" (e.g., un-configured media device 100b at stage 290b of FIG. 2B) using a configured media device "A" (e.g., media device 100a having CFG 125 of FIG. 2B). At a stage 402 an already configured media device "A" is powered up. At a stage 404 the RF system (e.g., RF system 107 of FIG. 1) of configured media device "A" is activated. The RF system is configured to detect RF signals from other "powered up" media devices. At a stage 406, an un-configured media device "B" (e.g., un-configured media device 100b at stage 290b of FIG. 2B) is powered up. At a stage 408 the RF system of un-configured media device "B" is activated. At stage 408, the respective RF systems of the configured "A" and un-configured "B" media devices are configured to recognize each other (e.g., via their respective BT 120 transceivers or another transceiver in the RF system). At a stage 410, if the configured "A" and un-configured "B" media devices recognize each other, then a "YES" branch is taken to a stage 412 where the configured media device "A" transmits its configuration (e.g., CFG 125) to the un-configured media device "B" (e.g., see stages 290e and 290f in FIG. 2B). If the configured "A" and un-configured "B" media devices do not recognize each other, then a "NO" branch is taken and the flow may return to an earlier stage (e.g., stage 404 to retry the recognition process. Optionally, after being configured, media device "B" may be connected with a wireless network (e.g., via WiFi 130). At a stage 414 a determination is made as to whether or not media device "B" is connected to a wireless network. If already connected, then a "YES" branch is taken and the process may terminate at a stage 416. However, if not connected with a wireless network, then a "NO" branch is taken and media device "B" is connected to the wireless network at a stage 418. For example, the CFG 125 that was copied to media device "B" may include information such as wireless network name and password and WiFi 130 is configured to effectuate the connection with the wireless network based on that information. Alternatively, media device "A" may transmit the necessary information to media device "B" (e.g., using BT 120) at any stage of flow 400a, such as at the stage 408, for example. After the wireless network connection is made, the flow may terminate at a stage 420.

Figure 4B:
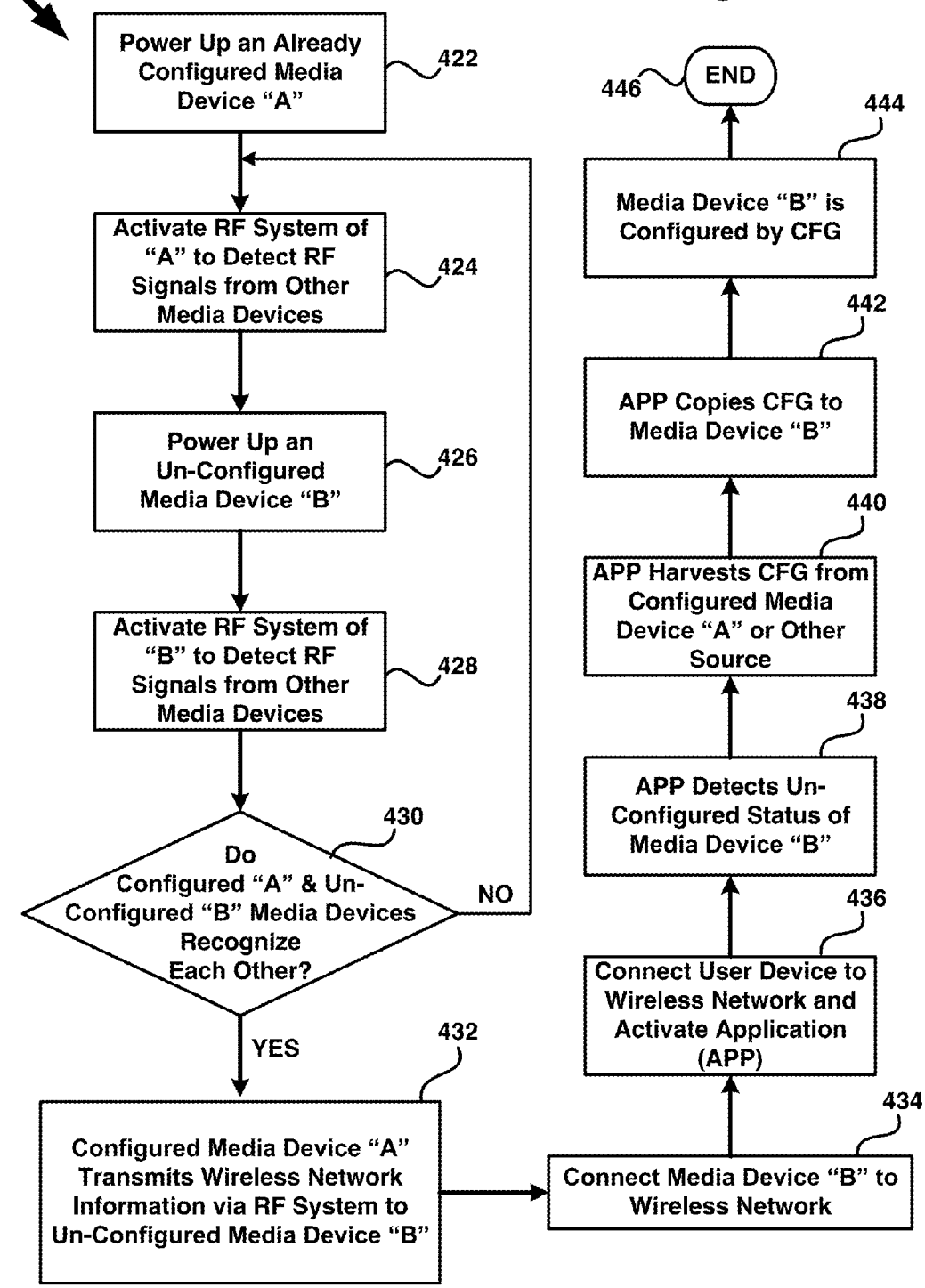

Attention is now directed to FIG. 4B, where a flow diagram 400b depicts another example of a process for configuring an un-configured media device "B" (e.g., un-configured media device 100b at stage 290b of FIG. 2B) using a configured media device "A" (e.g., media device 100a having CFG 125 of FIG. 2B). At a stage 422 an already configured media device "A" is powered up. At a stage 424 the RF system of configured media device "A" is activated (e.g., RF system 107 of FIG. 1). The RF system is configured to detect RF signals from other "powered up" media devices. At a stage 426, an un-configured media device "B" (e.g., un-configured media device 100b at stage 290b of FIG. 2B) is powered up. At a stage 428 the RF system of un-configured media device "b" is activated (e.g., RF system 107 of FIG. 1). At the stage 428, the respective RF systems of the configured "A" and un-configured "B" media devices are configured to recognize each other (e.g., via their respective BT 120 transceivers or another transceiver in the RF system). At a stage 430, if the configured "A" and un-configured "B" media devices recognize each other, then a "YES" branch is taken to a stage 432 where the configured media device "A" transmits information for a wireless network to the un-configured media device "B" (e.g., see stage 290b in FIG. 2B) and that information is used by the un-configured media device "B" to connect with a wireless network as was described above in regards to FIGS. 2B and 4A. If the configured "A" and un-configured "B" media devices do not recognize each other, then a "NO" branch is taken and the flow may return to an earlier stage (e.g., stage 424 to retry the recognition process. At a stage 434, the information for the wireless network is used by the un-configured media device "B" to effectuate a connection to the wireless network. At a stage 436, a user device is connected with the wireless network and an application (APP) running on the user device (e.g., APP 225 in FIG. 2B) is activated. Stage 436 may be skipped if the user device is already connected to the wireless network. The APP is aware of un-configured media device "B" presence on the wireless network and at a stage 438 detects that media device "B" is presently in an un-configured state and therefore has a status of "un-configured." Un-configured media device "B" may include registers, circuitry, data, program code, memory addresses, or the like that may be used to determine that the media device is un-configured. The un-configured status of media device "B" may be wirelessly broadcast using any of its wireless resources or other systems, such as RF 107 and/or AV 109. At a stage 440, the APP is aware of configured media device "A" presence on the wireless network and detects that media device "A" is presently in a configured state and therefore has a status of "configured." The APP harvests the configuration (CFG) (e.g., CFG 125 of FIG. 2B) from configured media device "A", and at a stage 442 copies (e.g., via a wireless transmission over the wireless network) the CFG to the un-configured media device "B." At a stage 444, previously un-configured media device "B" becomes a configured media device "B" by virtue of having CFG resident in its system (e.g., CFG 125 in DS system 103 in FIG. 1). After media device "B" has been configured, the flow may terminate at a stage 446. In other examples, the APP may obtain the CFG from a location other than the configured media device "A", such as the Internet or the Cloud as depicted in FIG. 2B. Therefore, at the stage 440, the APP may download the CFG from a web site, from Cloud storage, or other locations on the Internet or an intranet for example.

In the examples depicted in FIGS. 2A-4B, after one of the media devices is configured, additional media devices that are added by the user or are encountered by the user may be configured without the user (e.g., user 201) having to break a BT pairing with one media device and then establishing another BT pairing with a media device the user is adding to his/her media device ecosystem. Existing media devices that are configured (e.g., have CFG 125) may be used to configure a new media device using the wireless systems (e.g., acoustic, optical, RF) of the media devices in the ecosystem. If multiple configured media devices are present in the ecosystem when the user adds a new un-configured media device, configured media devices may be configured to arbitrate among themselves as to which of the configured devices will act to configured the newly added un-configured media device. For example, the existing media device that was configured last in time (e.g., by a date stamp on its CFG 125) may be the one selected to configure the newly added un-configured media device. Alternatively, the existing media device that was configured first in time (e.g., by a date stamp on its CFG 125) may be the one selected to configure the newly added un-configured media device. The APP 225 on the user device 220 or other, may be configured to make the configuration process as seamless as possible and may only prompt the user 201 that the APP 225 has detected an un-configured media device and query the user 201 as to whether or not the user 201 wants the APP 225 to configure the un-configured media device (e.g., media device 100b). If the user replies "YES", then the APP 225 may handle the configuration process working wirelessly with the configured and un-configured media devices. If the user 201 replies "NO", then the APP 225 may postpone the configuration for a later time when the user 201 is prepared to consummate the configuration of the un-configured media device. In other examples, the user 201 may want configuration of un-configured media devices to be automatic upon detection of the un-configured media device(s). Here the APP and/or configured media devices would automatically act to configure the un-configured media device(s).

APP 225 may be configured (e.g., by the user 201) to automatically configure any newly detected un-configured media devices that are added to the user's 201 ecosystem and the APP 225 may merely inform the user 201 that it is configuring the un-configured media devices and inform the user 201 when configuration is completed, for example. Moreover, in other examples, once a user 201 configures a media device using the APP 225, subsequently added un-configured media devices may be automatically configured by an existing configured media device by each media device recognizing other media devices (e.g., via wireless systems), determining the status (e.g., configured or un-configured) of each media device, and then using the wireless systems (e.g., RF 107, AV 109, I/O 105, OPT 185, PROX 113) of a configured media device to configure the un-configured media device without having to resort to the APP 225 on the user's device 220 to intervene in the configuration process. That is, the configured media devices and the un-configured media devices arbitrate and effectuate the configuring of un-configured media devices without the aid of APP 225 or user device 220. In this scenario, the controller 101 and/or CFG 125 may include instructions for configuring media devices in an ecosystem using one or more systems in the media devices themselves.

In at least some examples, the structures and/or functions of any of the above-described features may be implemented in software, hardware, firmware, circuitry, or in any combination thereof. Note that the structures and constituent elements above, as well as their functionality, may be aggregated with one or more other structures or elements. Alternatively, the elements and their functionality may be subdivided into constituent sub-elements, if any. As software, the above-described techniques may be implemented using various types of programming or formatting languages, frameworks, scripts, syntax, applications, protocols, objects, or techniques. As hardware and/or firmware, the above-described techniques may be implemented using various types of programming or integrated circuit design languages, including hardware description languages, such as any register transfer language ("RTL") configured to design field-programmable gate arrays ("FPGAs"), application-specific integrated circuits ("ASICs"), or any other type of integrated circuit. According to some embodiments, the term "module" may refer, for example, to an algorithm or a portion thereof, and/or logic implemented in either hardware circuitry or software, or a combination thereof. These may be varied and are not limited to the examples or descriptions provided. Software, firmware, algorithms, executable computer readable code, program instructions for execution on a computer, or the like may be embodied in a non-transitory computer readable medium.

Media Device with Proximity Detection

Figure 5:
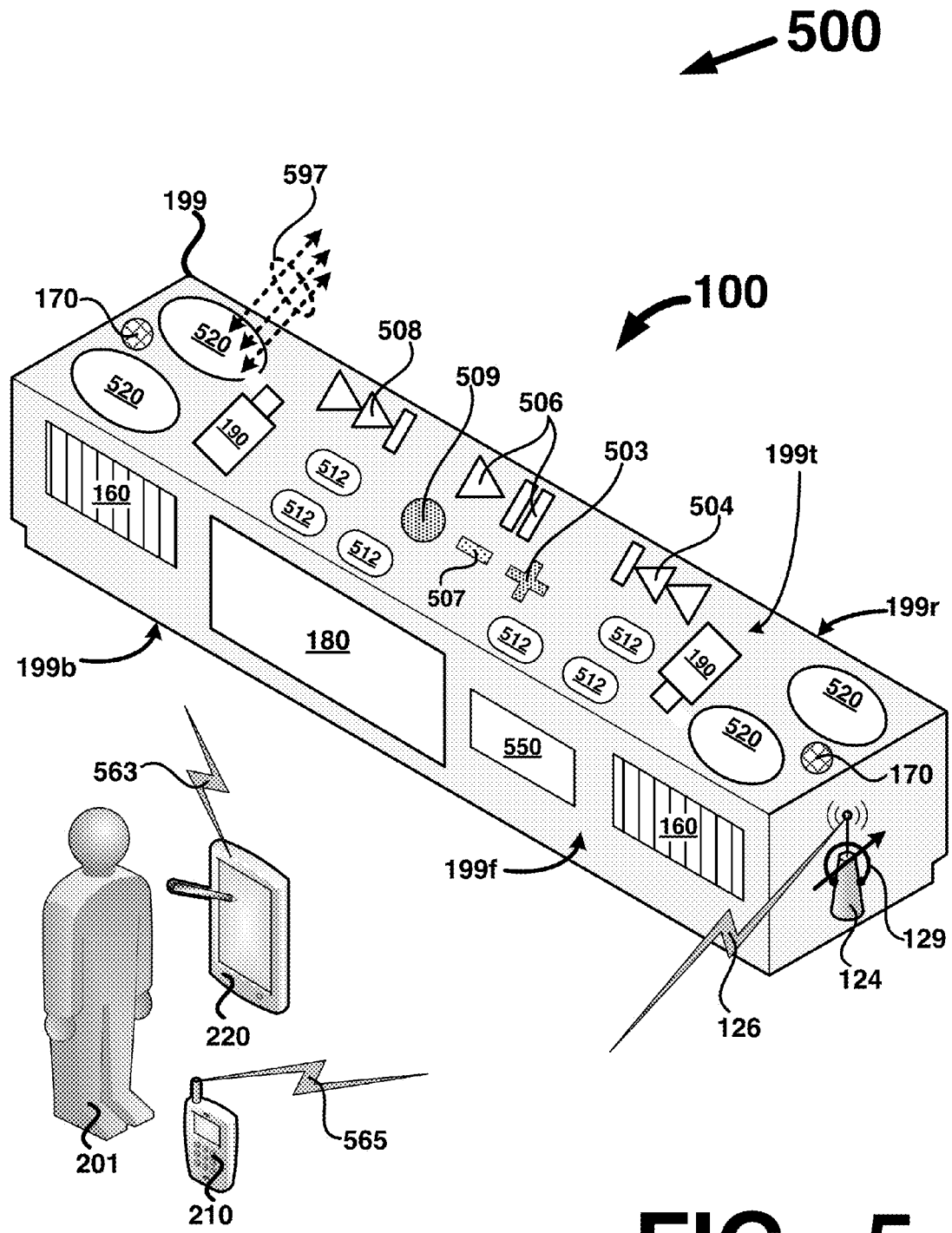
FIG. 5 depicts a profile view of one example of a media device including control elements and proximity detection islands according to embodiments of the present application.

Attention is now directed to FIG. 5 where a profile view depicts one example 500 of media device 100 that may include on a top surface 199s of chassis 199, a plurality of control elements 503-512 and one or more proximity detection islands (four are depicted) denoted as 520. Media device 100 may include one or more speakers 160, one or more microphones 170, a display 180, one or more image capture devices VID 190 (e.g., a still and/or video camera), a section 550 for other functions such as SEN 195, or other, and antenna 124 which may be tunable 129. Each proximity detection island 520 may be configured to detect 597 proximity of one or more persons, such as user 201 as will be described in greater detail below. The layout and position of the elements on chassis 199 of media device 100 are examples only and actual layout and position of any elements will be application specific and/or a matter of design choice, including ergonomic and esthetic considerations. As will be described in greater detail below, detection of presence of user 201 may occur with or without the presence of one or more user devices 202, such as user devices 210 and 220 depicted in FIG. 5. Circuitry and/or software associated with operation of proximity detection islands 520 may work in conjunction with other systems in media device 100 to detect presence of one or more user devices 202, such as RF system 107 detecting RF signals 563 and/or 565 (e.g., via antenna 124) from user devices 210 and 220 or MIC 170 detecting sound, for example. Detection of presence may be signaled by media device 100 in a variety of ways including but not limited to light (e.g., from 520 and/or 503-512), sound (e.g., from SPK 160), vibration (e.g., from SPK 160 or other), haptic feedback, tactile feedback, display of information (e.g., DISP 180), RF transmission (e.g., 126), just to name a few. SPK 160 and DISP 180 may be positioned on a front surface 199f of chassis 199. A bottom surface 199b of chassis 199 may be configured to rest on a surface such as a table, desk, cabinet, or the like. Other elements of media device 100 may be positioned on a rear surface 199r of chassis 199.

Non-limiting examples of control elements 503-512 include a plurality of controls 512 (e.g., buttons, switches and/or touch surfaces) that may have functions that are fixed or change based on different scenarios as will be described below, controls 503 and 507 for volume up and volume down, control 509 for muting volume or BT paring, control 506 for initiating or pausing playback of content, control 504 for fast reversing playback or skipping backward one track, and control 508 for fast forwarding playback or skipping forward one track. Some are all of the control elements 504-512 may serve multiple rolls based on changing scenarios. For example, for playback of video content or for information displayed on display 180 (e.g., a touch screen), controls 503 and 507 may be used to increase "+" and decrease "−" brightness of display 180. Control 509 may be used to transfer or pick up a phone call or other content on a user device 202, for example. Proximity detection islands 520 and/or control elements 503-512 may be backlit (e.g., using LED's or the like) for night or low-light visibility.

Display 180 may display image data captured by VID 190, such as live or still imagery captured by a camera or other types of image capture devices (e.g., CCD or CMOS image capture sensors). Media device 100 may include a one or image capture devices, where a plurality of the image capture devices (e.g., VID 109) may be employed to increase coverage over a larger space around the media device 100. Signals from VID 190 may be processed by A/V 109, controller 101 or both to perform functions including but not limited to functions associated with proximity detection (e.g., a signal indicative of a moving image in proximity of media device 100), interfacing media device 100 with user 201 or other users (e.g., an awareness user interface AUI), facial and/or feature recognition, gesture recognition, or other functions, just to name a few. One or more of facial recognition and/or image recognition (e.g., of features on a Barcode, a TAG or the like denoted as 193 from an image displayed on a screen of a user device, chassis, package, etc.), feature recognition, or gesture recognition may be accomplished using algorithms and/or data executing on controller 101 and/or on an external compute engine such as one or more other media devices 100 (e.g., controllers 101 of other media devices 100), server 280 or external resource 250 (e.g., the Cloud or the Internet). The algorithms and/or data (e.g., embodied in a non-transitory computer readable medium) may reside in DS 103, may reside in another media device 100, may reside in a user device, may reside external to media device 100 or may reside in some combination of the foregoing. One or more of the facial, feature, or gesture recognitions may be used to determine whether or not user 201 is responding to an acoustic environment (e.g., acoustic subliminal cues, noise cancellation, etc.) being generated by one or more media devices 100. Responding may comprise the user 201 being consciously unaware of the acoustic environment, consciously aware of the acoustic environment, and/or being consciously aware or unaware of an action(s) taken by an awareness user interface (AUI) implemented by one or more media devices 100. Body motion (e.g., detected by PROX 113, VID 190, wireless motion signals from a user device or another media device 100) may be processed and analyzed to determine if actions by user 201 are responsive or un-responsive to an acoustic environment, a change in the acoustic environment, a prompt or cue from the AUI, or other. Similarly, facial expression, body gestures, body posture, body features, etc., may be processed and analyzed to determine if actions by user 201 may be responsive or un-responsive to an acoustic environment, a change in the acoustic environment, a prompt or cue from the AUI, changes in noise cancellation (NC), acoustic subliminal cues (SC), or others, for example.

Figure 6:
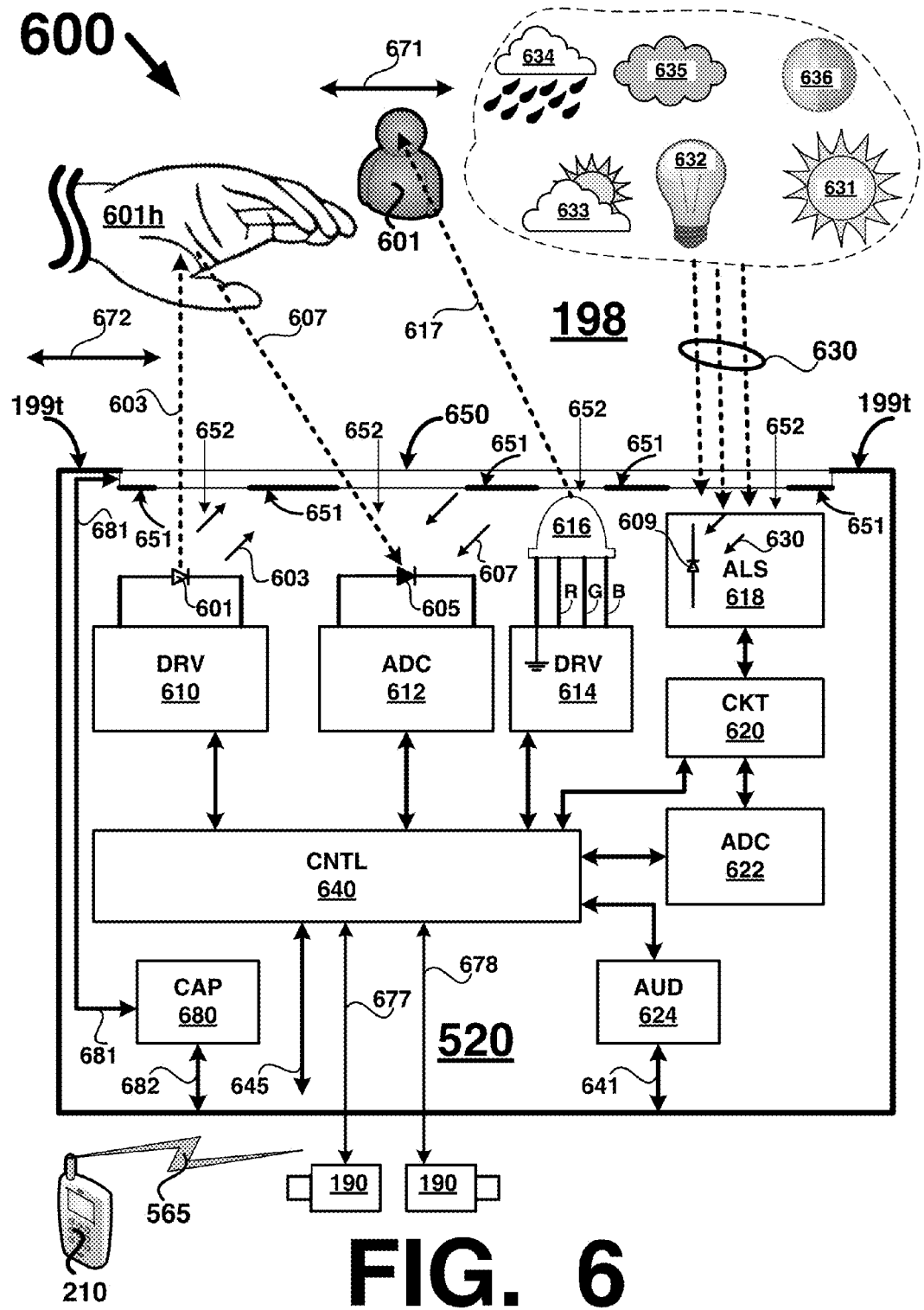
FIG. 6 depicts a block diagram of one example of a proximity detection island according to embodiments of the present application.

Moving on to FIG. 6, a block diagram 600 depicts one example of a proximity detection island 520. Proximity detection island 520 may be implemented using a variety of technologies and circuit topologies and the example depicted in FIG. 6 is just one such non-limiting example and the present application is not limited to the arrangement of elements depicted in FIG. 6. One or more proximity detection islands 520 may be positioned on, connected with, carried by or otherwise mounted on media device 100. For example, proximity detection island 520 may be mounted on a top surface 199t of chassis 199. A structure 650 made from an optically transmissive material such as glass, plastic, a film, an optically transparent or translucent material, or the like. Structure 650 may be made from a material that allows light 603, 607, 617, and 630 to pass through it in both directions, that is, bi-directionally. Structure 650 may include apertures 652 defined by regions 651 (e.g., an opaque or optically reflective/absorptive material) used for providing optical access (e.g., via apertures 652) to an environment ENV 198 external to the media device 100 for components of the proximity detection island 520. Structure 650 may be configured to mount flush with top surface 199t, for example. In some examples, structure 650 may not include regions 651.

Proximity detection island 520 may include at least one LED 601 (e.g., an infrared LED—IR LED) electrically coupled with driver circuitry 610 and configured to emit IR radiation 603, at least one IR optical detector 605 (e.g., a PIN diode) electrically coupled with an analog-to-digital converter ADC 612 and configured to generate a signal in response to IR radiation 607 incident on detector 605, and at least one indicator light 616 electrically coupled with driver circuitry 614 and configured to generate colored light 617. As depicted, indicator light 616 comprises a RGB LED configured to emit light 617 in a gambit of colors indicative of status as will be described below. Here, RGB LED 616 may include four terminals, one of which coupled with circuit ground, a red "R" terminal, a green "G" terminal, and a blue "B" terminal, all of which are electrically connected with appropriate circuitry in driver 614 and with die within RGB LED 616 to effectuate generation of various colors of light in response to signals from driver 614. For example, RGB LED 616 may include semiconductor die for LED's that generate red, green, and blue light that are electrically coupled with ground and the R, G, and B terminals, respectively. One skilled in the art will appreciate that element 616 may be replaced by discrete LED's (e.g., separate red, green, white, and blue LED's) or a single non-RGB LED or other light emitting device may be used for 616. The various colors may be associated with different users who approach and are detected in proximity of the media device and/or different user devices that are detected by the media device. Therefore, if there are four users/and our user devices detected, then: the color blue may be associated with user #1; yellow with user #2; green with user #3; and red with user #4. Some users and or user devices may be indicated using alternating colors of light such as switching/flashing between red and green, blue and yellow, blue and green, etc. In other examples other types of LED's may be combined with RGB LED 616, such as a white LED, for example, to increase the number of color combinations possible.

Optionally, proximity detection island 520 may include at least one light sensor for sensing ambient light conditions in the ENV 198, such as ambient light sensor ALS 618. ALS 618 may be electrically coupled with circuitry CKT 620 configured to process signals from ALS 618, such as optical sensor 609 (e.g., a PIN diode) in response to ambient light 630 incident on optical sensor 609. Signals from CKT 620 may be further processed by ADC 622. The various drivers, circuitry, and ADC's of proximity detection island 520 may be electrically coupled with a controller (e.g., a µC, a µP, an ASIC, or controller 101 of FIG. 1) that is electrically coupled with a bus 645 (e.g., bus 110 of FIG. 1) that communicates signals between proximity detection island 520 and other systems of media device 100. Proximity detection island 520 may include an auditory system AUD 624 configured to generate sound or produce vibrations (e.g., mechanically coupled with chassis 199, see 847 and 848 in FIG. 8C) in response to presence detection or other signals. AUD 624 may be mechanically coupled 641 with chassis 199 to cause chassis 199 to vibrate or make sound in response to presence detection or other signals. In some examples AUD 624 may use SPK 160 to generate sound or vibration. In other examples AUD 624 may use a vibration motor, such as the type used in smartphones to cause vibration when a phone call or notification is received. In yet another example, AUD 624 may use a piezoelectric film that deforms in response to an AC or DC signal applied to the film, the deformation generating sound and/or vibration. In yet other examples, AUD 624 may be connected with or mechanically coupled with one or more of the control elements and/or one or more of the proximity detection islands 520 depicted in FIG. 5 to provide haptic and/or tactile feedback. Upon detecting and acknowledging an approach by a user and/or user device, media may generate sound (e.g., from SPK 160) in a rich variety of tones and volume levels to convey information and/or media device status to the user. For example, a tone and volume level may be used to indicate the power status of the media device 100, such as available charge in BAT 135 of power system 111. The volume of the tone may be louder when BAT 135 is fully charged and lower for reduced levels of charge in BAT 135. Other tones and volume levels may be used to indicate the media device 100 is ready to receive input from the user or user device, the media device 100 is in wireless communications with a WiFi router or network, cellular service, broadband service, ad hoc WiFi network, other BT enabled devices, for example.

Proximity detection island 520 may be configured to detect presence of a user 201 (or other person) that enters 671 an environment 198 the media device 100 is positioned in. Here, entry 671 by user 201 may include a hand 601h or other portion of the user 201 body passing within optical detection range of proximity detection island 520, such as hand 601h passing over 672 the proximity detection island 520, for example. IR radiation 603 from IRLED 603 exiting through portal 652 reflects off hand 601h and the reflected IR radiation 607 enters portal 652 and is incident on IR detector 605 causing a signal to be generated by ADC 612, the signal being indicative of presence being detected. RGB LED 616 may be used to generate one or more colors of light that indicate to user 201 that the user's presence has been detected and the media device is ready to take some action based on that detection. The action taken will be application specific and may depend on actions the user 201 programmed into CFG 125 using APP 225, for example. The action taken and/or the colors emitted by RGB LED 616 may depend on the presence and/or detection of a user device 210 in conjunction with or instead of detection of presence of user 201 (e.g., RF 565 from device 210 by RF 107).

As described above, proximity detection island 520 may optionally include ambient light sensor ALS 618 configured to detect ambient light 630 present in ENV 198 such as a variety of ambient light sources including but not limited to natural light sources such as sunny ambient 631, partially cloudy ambient 633, inclement weather ambient 634, cloudy ambient 635, and night ambient 636, and artificial light ambient 632 (e.g., electronic light sources). ALS 618 may work in conjunction with IRLED 610 and/or IR detector 605 to compensate for or reduce errors in presence detection that are impacted by ambient light 630, such as IR background noise caused by IR radiation from 632 or 631, for example. IR background noise may reduce a signal-to-noise ratio of IR detector 605 and cause false presence detection signals to be generated by ADC 612.

ALS 618 may be used to detect low ambient light 630 condition such as moonlight from 636 or a darkened room (e.g., light 632 is off), and generate a signal consistent with the low ambient light 630 condition that is used to control operation of proximity detection island 520 and/or other systems in media device 100. As one example, if user approaches 671 proximity detection island 520 in low light or no light conditions as signaled by ALS 618, RGB LED 616 may emit light 617 at a reduced intensity to prevent the user 201 from being startled or blinded by the light 617. Further, under low light or no light conditions AUD 624 may be reduced in volume or vibration magnitude or may be muted. Additionally, audible notifications (e.g., speech or music from SPK 160) from media device 100 may be reduced in volume or muted under low light or no light conditions (see FIG. 9).

Structure 650 may be electrically coupled 681 with capacitive touch circuitry 680 such that structure 650 is operative as a capacitive touch switch that generates a signal when a user (e.g., hand 601*h*) touches a portion of structure 650. Capacitive touch circuitry 680 may communicate 682 a signal to other systems in media device 100 (e.g., I/O 105) that process the signal to determine that the structure 650 has been touched and initiate an action based on the signal. A user's touch of structure 650 may trigger driver 614 to activate RGB LED 616 to emit light 617 to acknowledge the touch has been received and processed by media device 100. In other examples, I/O 105 may include one or more indicator lights IND 186 (e.g., LED's or LCD) that may visually indicate or otherwise acknowledge presence being detected or serve other functions.

Proximity detection island 520 may optionally couple (677, 678) with one or more image capture devices, such as VID 190 as described above. Although two of VID 190's are depicted there may be more or fewer than depicted. Here signals on 677 and/or 678 may be electrically coupled with controller CNTL 640 and CNTL 640 may process those signals (e.g., individually or in conjunction with other signals) to determine if they are consistent with presence (e.g., of a user or object), motion or the like in ENV 198. The one or more image capture devices need not have the same coverage patterns of the proximity detection islands 520 as described below in reference to FIGS. 8A-8C. Multiple VID 190's (e.g., front facing and rear facing) may have the same or different coverage patterns (e.g., optics for wide angle, narrow angle, fisheye, etc.). Although VID 190 is depicted external to 520, in some examples, one or more of the proximity detection islands 520 may include VID 190 and the examples depicted herein are non-limiting. Signals from VID 190 may be coupled with one or more systems including but not limited to PROX 113, proximity detection islands 520, controller 101, and A/V 109. As one example, signals on 677 and/or 678 may also be coupled with circuitry in A/V 109 and with one or more proximity detection islands 520.

Figure 7:
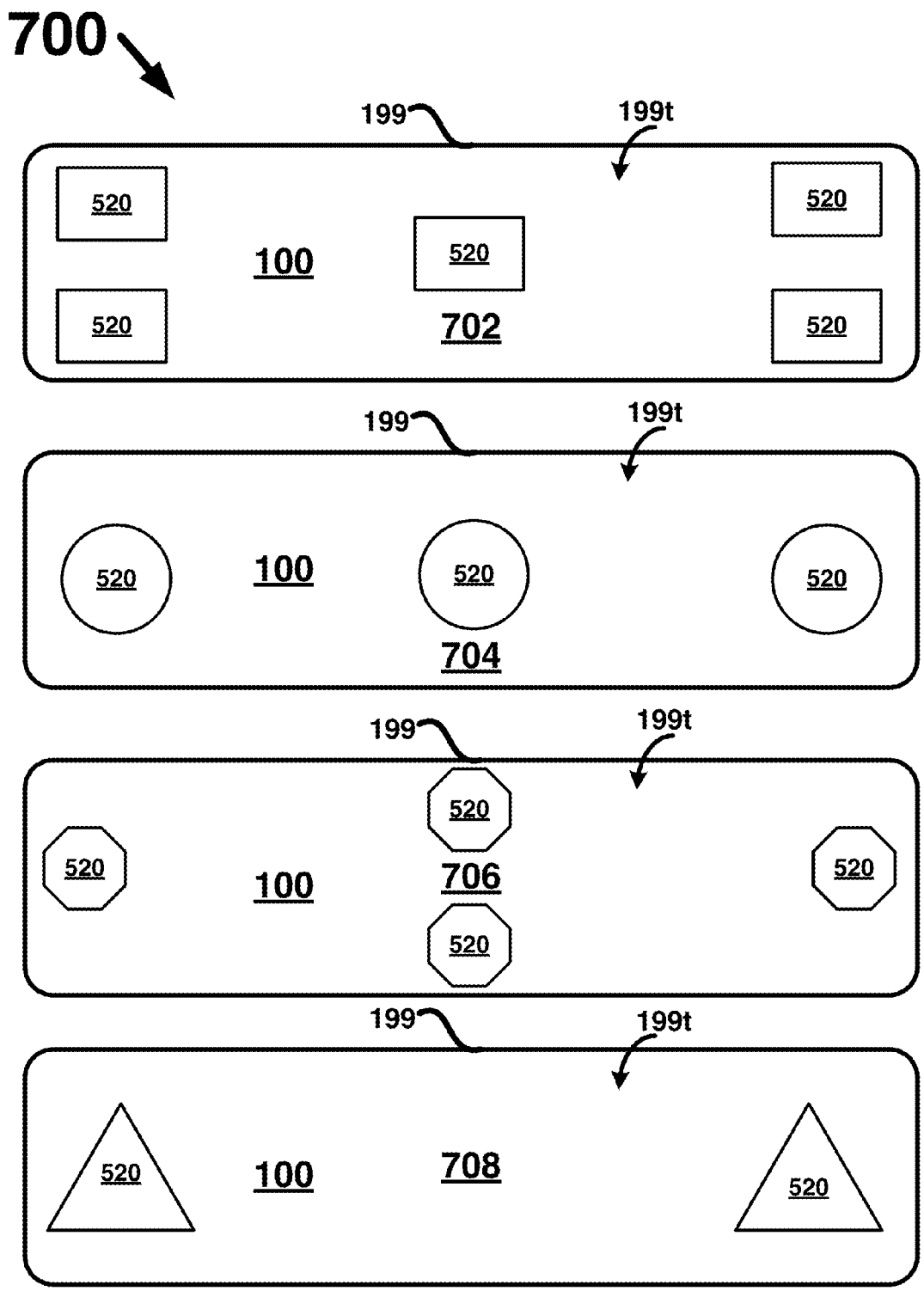
FIG. 7 depicts a top plan view of different examples of proximity detection island configurations according to embodiments of the present application.

Reference is now made to FIG. 7, where top plan views of different examples of proximity detection island 520 configurations are depicted. Although the various example configurations and shapes are depicted as positioned on top surface 199*t* of chassis 199, the present application is not so limited and proximity detection islands 520 may be positioned on other surfaces/portions of media device 100 and may have shapes different than that depicted. Furthermore, media device 100 may include more or fewer proximity detection islands 520 than depicted in FIG. 7 and the proximity detection islands 520 need not be symmetrically positioned relative to one another. Actual shapes of the proximity detection islands 520 may be application specific and may be based on esthetic considerations. Configuration 702 depicts five rectangular shaped proximity detection islands 520 positioned on top surface 199*t* with four positioned proximate to four corners of the top surface 199*t* and one proximately centered on top surface 199*t*. Configuration 704 depicts three circle shaped proximity detection islands 520 proximately positioned at the left, right, and center of top surface 199*t*. Configuration 706 depicts four hexagon shaped proximity detection islands 520 proximately positioned at the left, right, and two at the center of top surface 199*t*. Finally, configuration 708 depicts two triangle shaped proximity detection islands 520 proximately positioned at the left, right of top surface 199*t*. In some examples there may be a single proximity detection island 520. Proximity detection islands 520 may be configured to operate independently of one another, or in cooperation with one another.

Figure 8A:
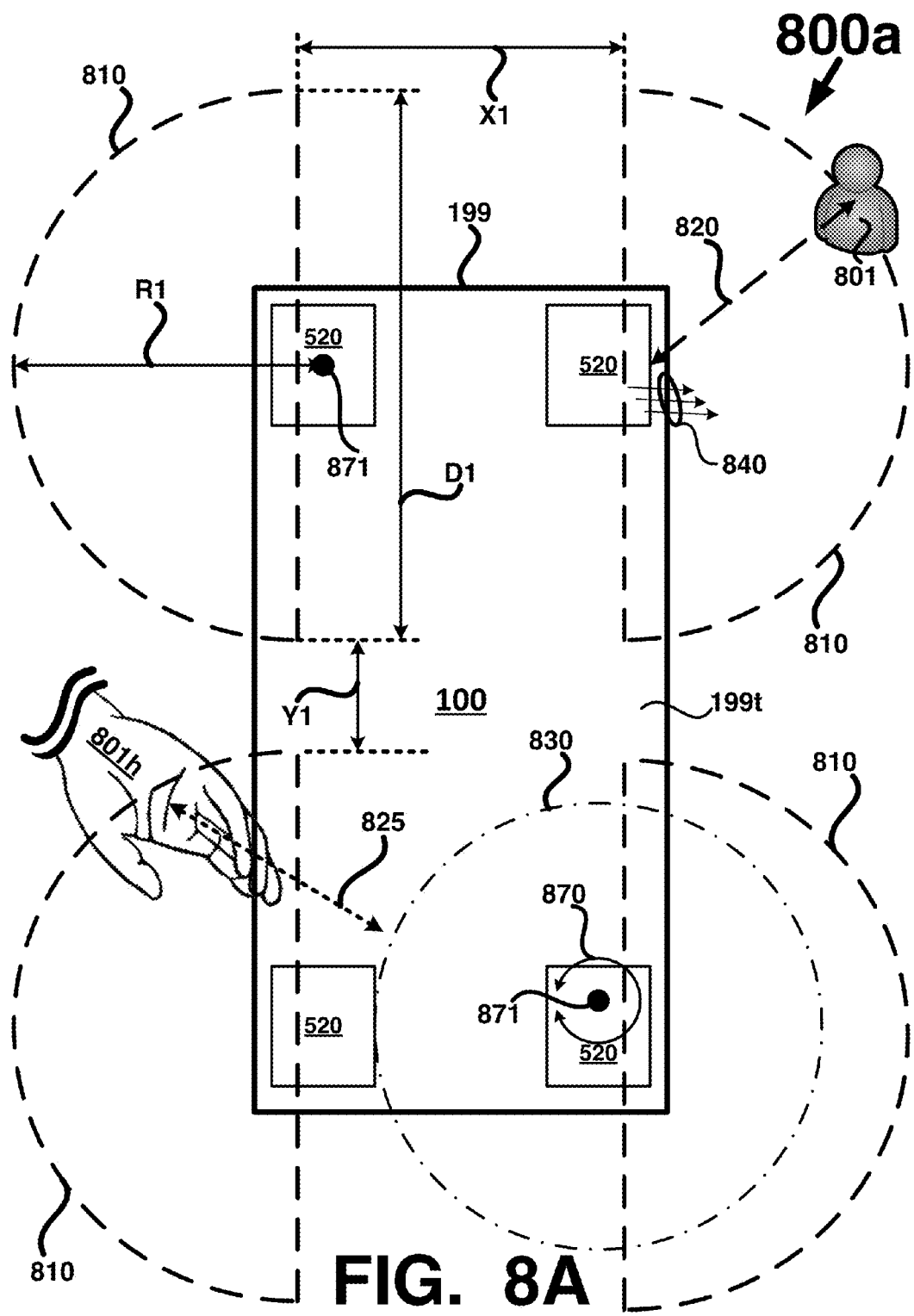
FIG. 8A is a top plan view depicting an example of proximity detection island coverage according to embodiments of the present application.

Moving to FIG. 8A, a top plan view of proximity detection island 520 coverage is depicted. Each proximity detection island 520 may be designed to have a coverage pattern configured to detect presence of user 201 when the user 201 or portion of the user body (e.g., hand 801*h*) enters the coverage pattern. Here, the coverage pattern may be semicircular 810 or circular 830, for example. Semicircular 810 coverage pattern may extend outward a distance R1 (e.g., approximately 1.5 meters) from proximity detection island 520 and may span a distance D1 about a center 871 of proximity detection island 520. Semicircular 810 coverage patterns of the four proximity detection islands 520 may not overlap one another such that there may be a coverage gap X1 and Y1 between the adjacent coverage patterns 810. Entry 825 of hand 801*h* or entry 820 of user 201 may cause one or more of the proximity detection islands 520 to indicate 840 that a presence has been detected, by emitting a color of light from RGB LED 616, for example. In other examples, the coverage pattern may be circular 830 and cover a 360 degree radius 870 about a center point 871 of proximity detection island 520. Circular 830 coverage pattern 830 may or may not overlap the circular 830 pattern of the other proximity detection islands 520.

Figure 8B:
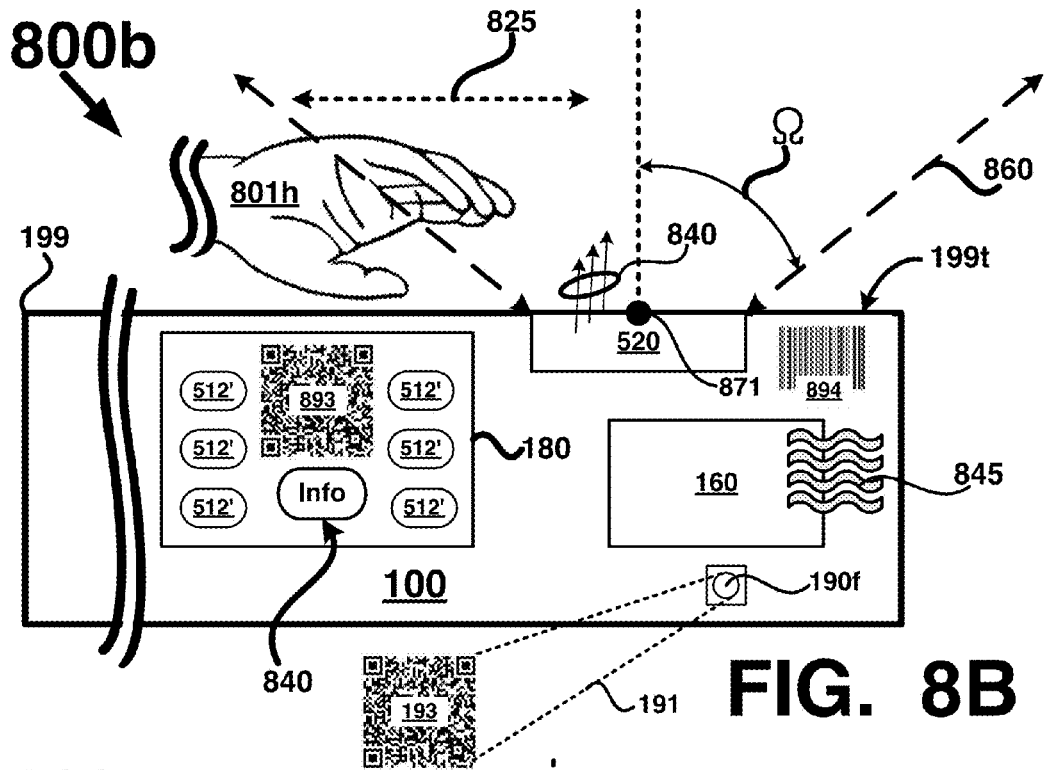
FIG. 8B is a front side view depicting an example of proximity detection island coverage according to embodiments of the present application.

FIG. 8B depicts a front view 800*b* of media device 100 and a coverage pattern 860 that has an angular profile Ω about center point 871. Hand 801*h* entering 825 into the coverage pattern 860 is detected by proximity detection island 520 and detection of hand 810 triggers light 840 being generate by RGB LED 616 of proximity detection island 520. Detection of hand 810 may also cause information "Info" to be displayed on DISP 180 and/or sound 845 to be generated by SPK 160. An image capture device VID 190 such as a front-facing image capture device 190*f* may be positioned or otherwise oriented to capture 191 images within a detection range and angular profile (see FIG. 8C) that may be determined in part by optics and image sensors in 190*f*. Other image capture devices (not depicted in this view), such as a rear-facing image capture device 190*r* (see FIG. 8C) may also be used. Image capture device VID 190 or others such as 190*f* and/or 190*r* may be configured to capture images 191 that are encoded with information including but not limited to barcodes and TAGS, for example.

As one example, image 191 of TAG 193 captured by 190*f* may comprise an image from a user device (e.g., a wireless client) that includes information such as locations (e.g., an address, URI, URL, etc.) where content C associated with the user device may be accessed from by the media device 100 (e.g., the Cloud, the Internet, NAS, wireless network, cellular network, data storage unit, etc.). The TAG 193 may be presented on a display of the user device (e.g., a touch screen, LCD, OLED, etc.) and the display may be positioned in appropriate proximity of media device 100 for the image 191 of the TAG 193 to be captured by 190f and subsequently decoded and the information/data contained therein may be acted on by media device 100 (e.g., harvesting content C from a location encoded in TAG 193).

As another example, TAG 193 may include encoded data for one or more access credentials (e.g., user name, password, email address, PIN number, etc.) for secure access to any number of systems, devices, or instrumentalities that require some form(s) of credentials for secure access including but not limited to wireless access points (AP's), cellular networks, wireless networks, web sites, web pages, Internet site, FTP site, financial account (e.g., bank account, PayPal, Debit/Credit card, iTunes card, gift card, etc.), download sites, data storage systems, NAS, the Cloud (e.g., content C, Cloud storage/backup), social media sites (e.g., Facebook, Twitter, etc.), professional media sites (e.g., LinkedIn, etc.), email accounts, access to licensed content C (e.g., to copyrighted content C), Applications (e.g., Google Play, App Store), the Internet, https://www.xyz sites, ISP's, media and/or service provider sites (e.g., iTunes, Amazon, Skype, Netflix, Hulu, HBO, DirecTV, Xfinity, etc.), media sites (e.g., Pandora, Spotify, iTunes Radio, iHeartRadio, Rdio, Internet Radio, News, Information, On-Line versions of print media, etc.), a media device (e.g., a DVR, HD-DVR, Slingbox, Streaming Player, Roku, Apple TV, etc.), just to name a few.

In some examples a TAG, barcode, or some other form of coded image data may be displayed or otherwise positioned on chassis 199 of media device 100 and/or presented as an image on display 180. For example, a TAG 893 or other form of encoded image may be displayed on display 180. As another example, a barcode 894 or other form of encoded image may be disposed on chassis 199. Those images may be captured by another device, such as a camera or other form of image capture device in a user device (e.g., in a smartphone, tablet, or pad) and/or another media device 100. The TAG 893 and/or barcode 894 may be used for purposes including but not limited to the same or similar purposes describe above for TAG 193. Other uses and/or functions of TAG 893 and/or barcode 894 may include but are not limited to providing information for access to the APP 225 as described herein, the configuration file CFG 125, access credentials for Ad Hoc WiFi 140 of one or more media devices 100, access credentials for a wireless access point (AP) the media device(s) 100 are linked with, access credentials for a cellular network (e.g., 2G, 3G, 4G, etc.) the media device(s) 100 are linked with access credentials for NAS or other form of data storage (e.g., RAID, the Cloud, the Internet) that the media device(s) 100 may access when needed, access credentials for content C the media device(s) 100 have access to and/or is stored in media devices 100 (e.g., in DS 103), BT paring data, NFC link data, data to establish a wireless link between one or more user devices (e.g., 220) and one or more media devices 100, etc., just to name a few.

Figure 8C:
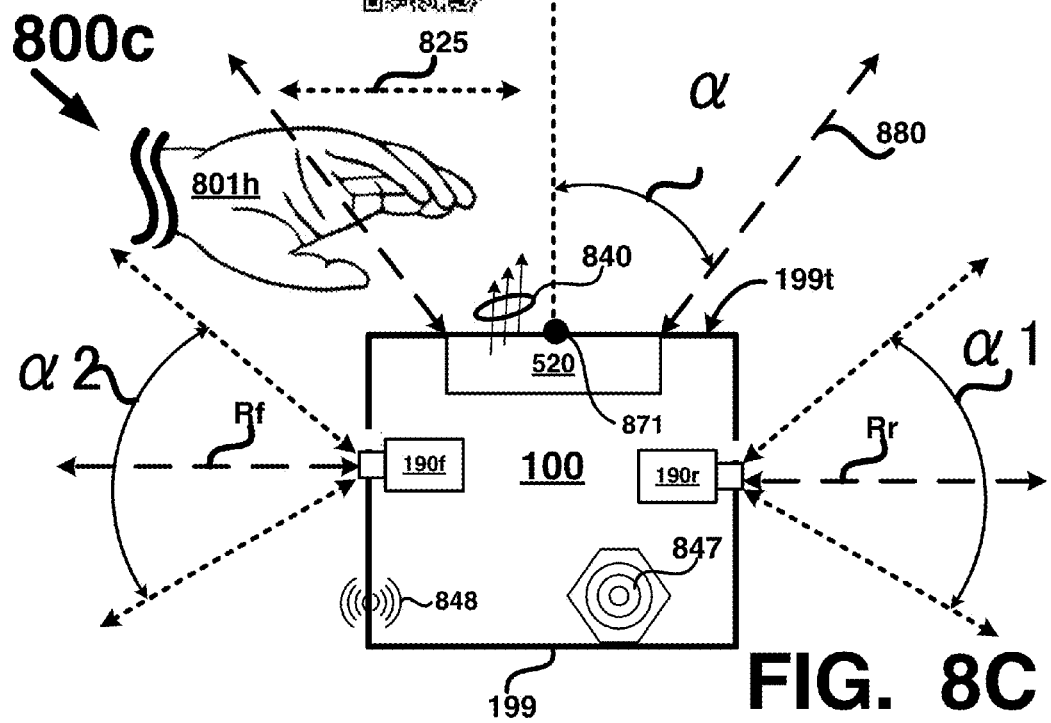
FIG. 8C is a side view depicting an example of proximity detection island coverage according to embodiments of the present application.

In FIG. 8C, a side view 800c of media device 100 is depicted with proximity detection island 520 having angular profile α about center point 871 for a coverage pattern 880. Hand 801h entering 825 into the coverage pattern 880 is detected by proximity detection island 520 and detection of hand 810 triggers light 840 being generate by RGB LED 616 of proximity detection island 520 and AUD 624 generating vibration 847 which may be heard and/or felt as sound and/or vibrations 848 external to chassis 199. Here two image capture devices VID 190 are positioned to capture images from the front 190f and from the rear 190r. Angular profiles α1 and α2 may be the same or different and may represent the field of view covered by the optics and/or image sensors of VID 190f and 190r (e.g., wide angle, zoom, telephoto, fisheye, etc.). Angular profiles α1 and α2 and/or front/rear detection ranges Rf and Rr respectively, may be the same or different than those for the proximity detection islands 520. Other image capture device positions and orientations may be used and the configurations depicted herein are non-limiting examples.

Figure 9:
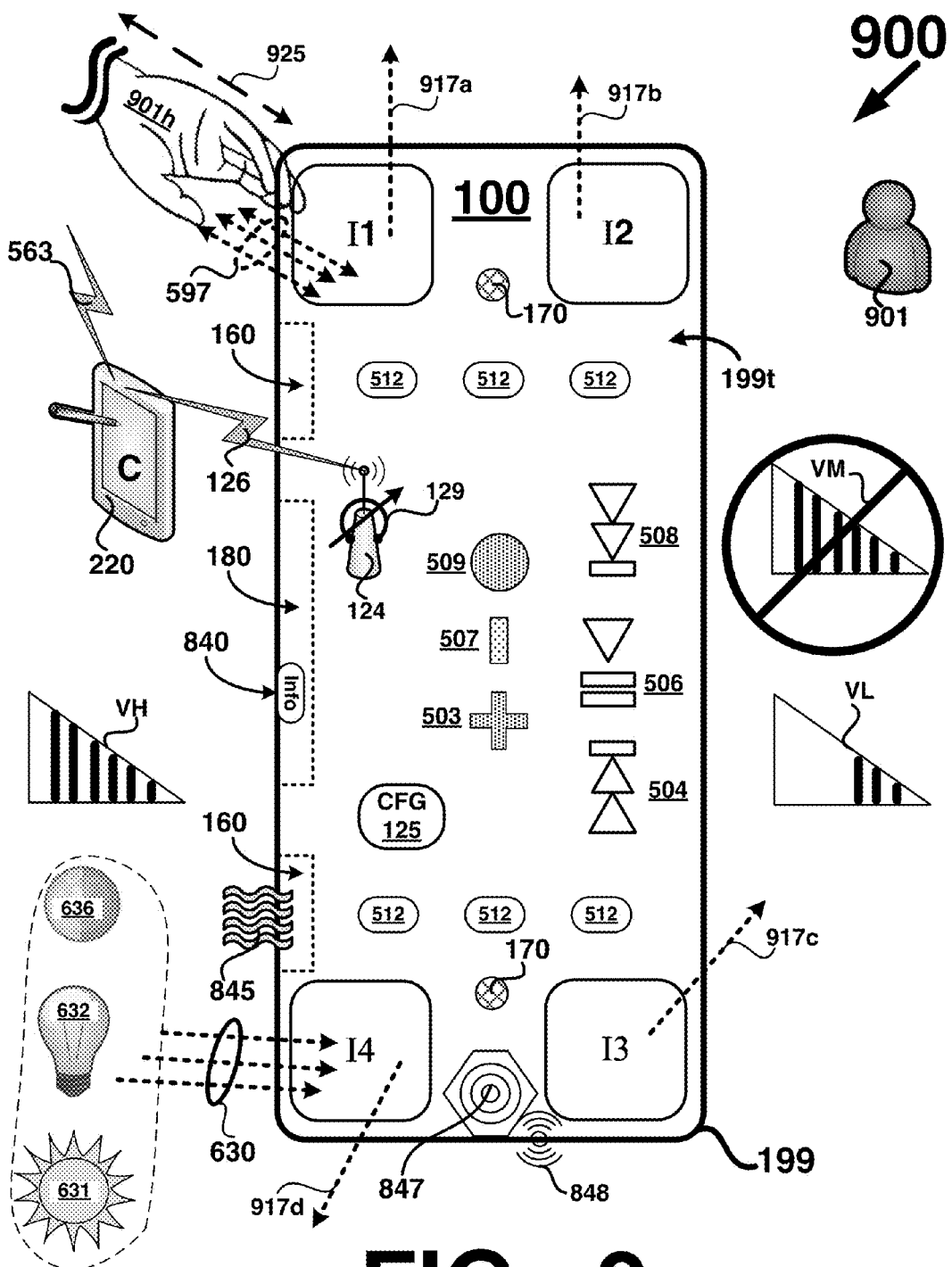
FIG. 9 is a top plan view of a media device including proximity detection islands configured to detect presence according to embodiments of the present application.

Attention is now directed to FIG. 9, where a top plan view 900 of media device 100 depicts four proximity detection islands 520 denoted as I1, I2, I3, and I4. Furthermore, control elements 503-512 are depicted on top surface 199t. In the example depicted, hand 901h enters into proximity detection range of at least proximity detection island I1 and triggers generation of light (917 a-d) from one or more of the islands (I1, I2, I3, I4) such as light 617 from RGB LED 616 of FIG. 6, for example. Presence detection by proximity detection island I1 may cause a variety of response from media device 100 including but not limited to signaling that presence has been detected using light (917 a-d), generating sound 845 from SPK 160, vibration 847, displaying info 840 on DISP 180, capturing and acting on content C from user device 220, establishing wireless communications 126 with user device 220 or other wireless device (e.g., a wireless router), just to name a few. Presence detection by proximity detection island I1 may cause media device 100 to notify user 901 that his/her presence has been detected and the media device is ready to receive input or some other action from user 901. Input and/or action from user 901 may comprise user 901 actuating one of the control elements 503-512, touching or selecting an icon displayed on DISP 180, issuing a verbal command or speech detected by MIC 170.

As one example, upon detecting presence of user 901, media device 100 may emit light 917c from proximity detection island I3. If the user device 220 is present and also detected by media device 100 (e.g., via RF signals 126 and/or 563), then the media device 100 may indicate that presence of the user device 220 is detected and may take one or more actions based on detecting presence of the user device 220. If user device 220 is one that is recognized by media device 100, then light 917c from proximity detection island I3 may be emitted with a specific color assigned to the user device 220, such as green for example. Recognition of user device 220 may occur due to the user device 220 having been previously BT paired with media device 100, user device 220 having a wireless identifier such as a MAC address or SSID stored in or pre-registered in media device 100 or in a wireless network (e.g., a wireless router) the media device 100 and user device 220 are in wireless communications with, for example. DISP 180 may display info 840 consistent with recognition of user device 220 and may display via a GUI or the like, icons or menu selections for the user 201 to choose from, such as an icon to offer the user 201 a choice to transfer content C from user device 220 to the media device 100, to switch from BT wireless communication to WiFi wireless communication, for example. As one example, if content C comprises a telephone conversation, the media device 100 through instructions or the like in CFG 125 may automatically transfer the phone conversation from user device 220 to the media device 100 such that MIC 170 and SPK 160 are enabled so that media device 100 serves as a speaker phone or conference call phone and media device 100 handles the content C of the phone call. If the transfer of content C is not automatic, CFG 125 or other programming of media device 100 may operate to offer the user 201 the option of transferring the content C by displaying the offer on DISP 180 or via one of the control elements 503-512. For example, control element 509 may blink (e.g., via backlight) to indicate to user 201 that actuating control element 509 will cause content C to be transferred from user device 220 to media device 100.

In some examples, control elements 503-512 may correspond to menu selections displayed on DISP 180 and/or a display on the user device 220. For example, control elements 512 may correspond to six icons on DISP 180 (see 512' in FIG. 8) and user 201 may actuate one of the control elements 512 to initiate whatever action is associated with the corresponding icon on DISP 180, such as selecting a playlist for media to be played back on media device 100. Or the user 201 may select one of the icons 512' on DISP 180 to effectuate the action.

As one example, if content C comprises an alarm, task, or calendar event the user 201 has set in the user device 220, that content C may be automatically transferred or transferred by user action using DISP 180 or control elements 503-512, to media device 100. Therefore, a wake up alarm set on user device 220 may actually be implemented on the media device 100 after the transfer, even if the user device 220 is powered down at the time the alarm is set to go off. When the user device is powered up, any alarm, task, or calendar event that has not been processed by the media device 100 may be transferred back to the user device 220 or updated on the user device so that still pending alarm, task, or calendar events may be processed by the user device when it is not in proximity of the media device 100 (e.g., when user 201 leaves for a business trip). CFG 125 and APP 225 as described above may be used to implement and control content C handling between media device 100 and user devices.

Some or all of the control elements 503-512 may be implemented as capacitive touch switches. Furthermore, some or all of the control elements 503-512 may be backlit (e.g., using LED's, light pipes, etc.). For example, control elements 512 may be implemented as capacitive touch switches and they may optionally be backlit. In some examples, after presence is detected by one or more of the proximity detection islands (I1, I2, I3, I4), one or more of the control elements 503-512 may be backlit or have its back light blink or otherwise indicate to user 201 that some action is to be taken by the user 201, such as actuating (e.g., touching) one or more of the backlit and/or blinking control elements 512. In some examples, proximity detection islands (I1, I2, I3, I4) may be configured to serve as capacitive touch switches or another type of switch, such that pressing, touching, or otherwise actuating one or more of the proximity detection islands (I1, I2, I3, I4) results in some action being taken by media device 100.

In FIG. 9, actions taken by media device 100 subsequent to detecting presence via proximity detection islands (I1, I2, I3, I4) and/or other systems such as RF 107, SEN 195, MIC 170, may be determined in part on ambient light conditions as sensed by ALS 618 in proximity detection islands (I1, I2, I3, I4). As one example, if ambient light 630 is bright (e.g., 631 or 632), then brightness of DISP 180 may be increased, light 917a-d from islands may be increased, and volume from SPK 160 may be nominal or increased because the ambient light 630 conditions are consistent with waking hours were light intensity and volume may not be a distraction to user 201. On the other hand, if ambient light 630 is dim or dark (e.g., 636), then brightness of DISP 180 may be decreased, light 917a-d from islands may be decreased, and volume from SPK 160 may be reduced or muted because the ambient light 630 conditions are consistent with non-waking hours were light intensity and volume may be a distraction to or startle user 201. Other media device 100 functions such as volume level, for example, may be determined based on ambient light 630 conditions (e.g., as detected by ALS 618 of island I4). As one example, under bright ambient light 630 conditions, volume VH of SPK 160 may be higher (e.g., more bars); whereas, under low ambient light 630 conditions, volume VL of SPK 160 may be lower (e.g., fewer bars) or may be muted entirely VM. Conditions other than ambient light 630 may cause media device 100 to control volume as depicted in FIG. 9.

Figure 10:
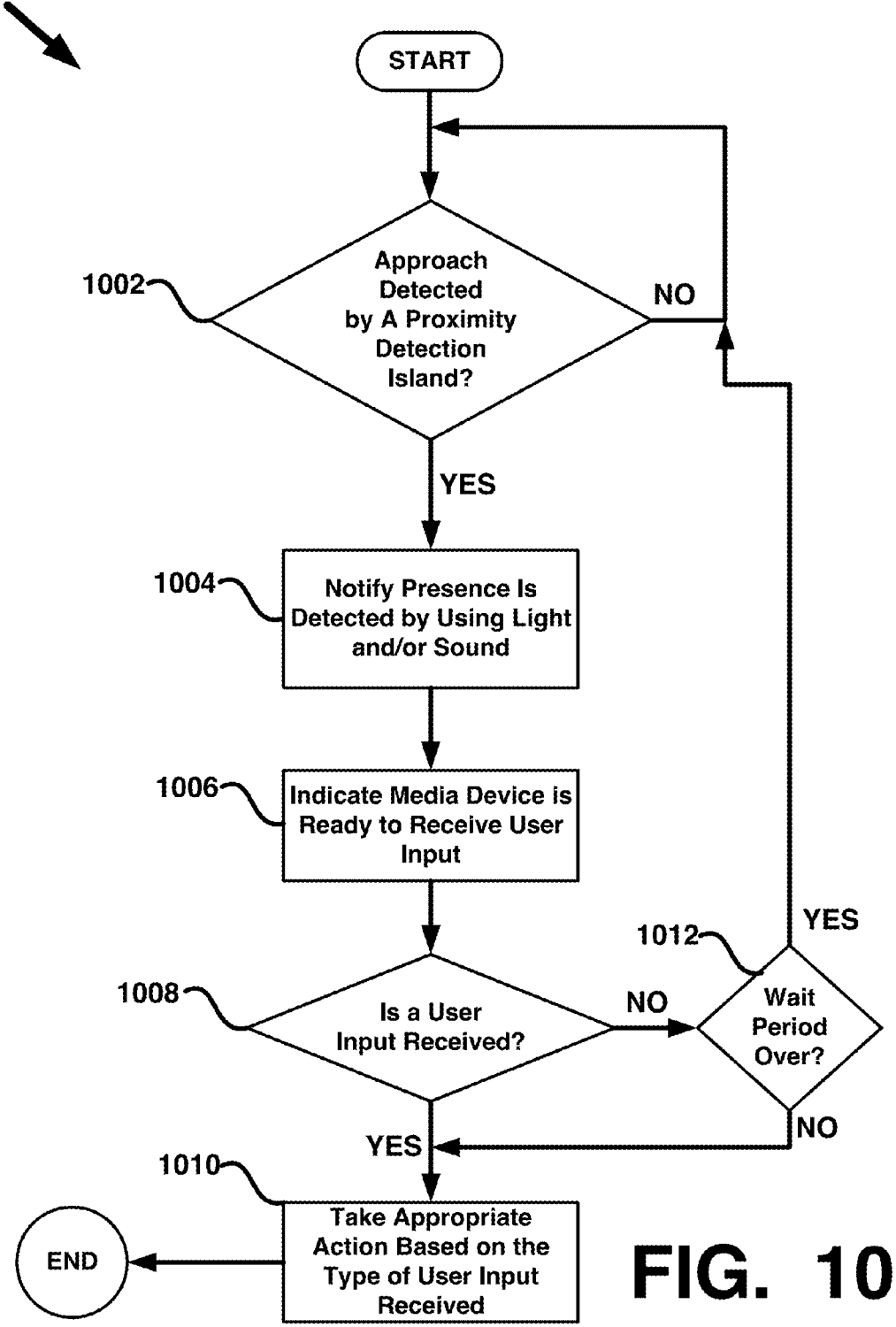
FIG. 10 depicts one example of a flow for presence detection, notification, and media device readiness according to embodiments of the present application.

FIG. 10 depicts one example of a flow 1000 for presence detection, notification, and media device readiness. At a stage 1002 a query as to whether or not an approach is detected by one or more of the proximity detection islands (e.g., I1, I2, I3, I4) may be made. Here, the query may be by controller CNTL 640 or controller 101, for example. If one or more of the proximity detection islands have detected presence, then a YES branch is taken. If no presence is detected by one or more of the proximity detection islands, then a NO branch is taken and the flow 1000 may return to the stage 1002 to wait for one or more of the proximity detection islands to detect a presence. The YES branch takes flow 1000 to a stage 1004 where a notification is executed by the media device 100 using light, sound, or vibration to notify a user that presence has been detected, for example, using one or more colors of light (e.g., from RGB LED's 616) and/or an auditory cue (e.g., from SPK 160, vibration from 847, or from a passive radiator used as one of the SPK 160). At as stage 1006, the media device 100 indicates that it is ready to receive input from a user and/or user device (e.g., user 201 or a user device 220 via RF 107). At a stage 1008 a query is made as to whether or not an input is received from a user. If an input is received from the user and/or user device, then a YES branch is taken to a stage 1010 where the media device 100 takes an appropriate action based on the type of user input received and the flow may terminate after the stage 1010. Appropriate actions taken by media device 100 will be application dependent and may be determined in whole or in part by APP 225, CFG 125, executable program code, hardware, etc. Inputs from the user includes but is not limited to actuation of one or more of the control elements 503-512, touching an icon or other area of DISP 180, issuing a spoken command or speech detected by MIC 170, taking an action on user device 220 that is wirelessly communicated to media device 100, just to name a few. If no input is received from the user and/or user device, then a NO branch is taken and the flow 1000 may continue at a stage 1012 where flow 1000 may enter into a wait period of predetermined time (e.g., of approximately 15 seconds or one minute, etc.). If a user input is received before the wait period is over, then a NO branch may be taken to the stage 1010. If the wait period is over, then a YES branch may be taken and flow 1000 may resume at the stage 1002.

Figure 11:
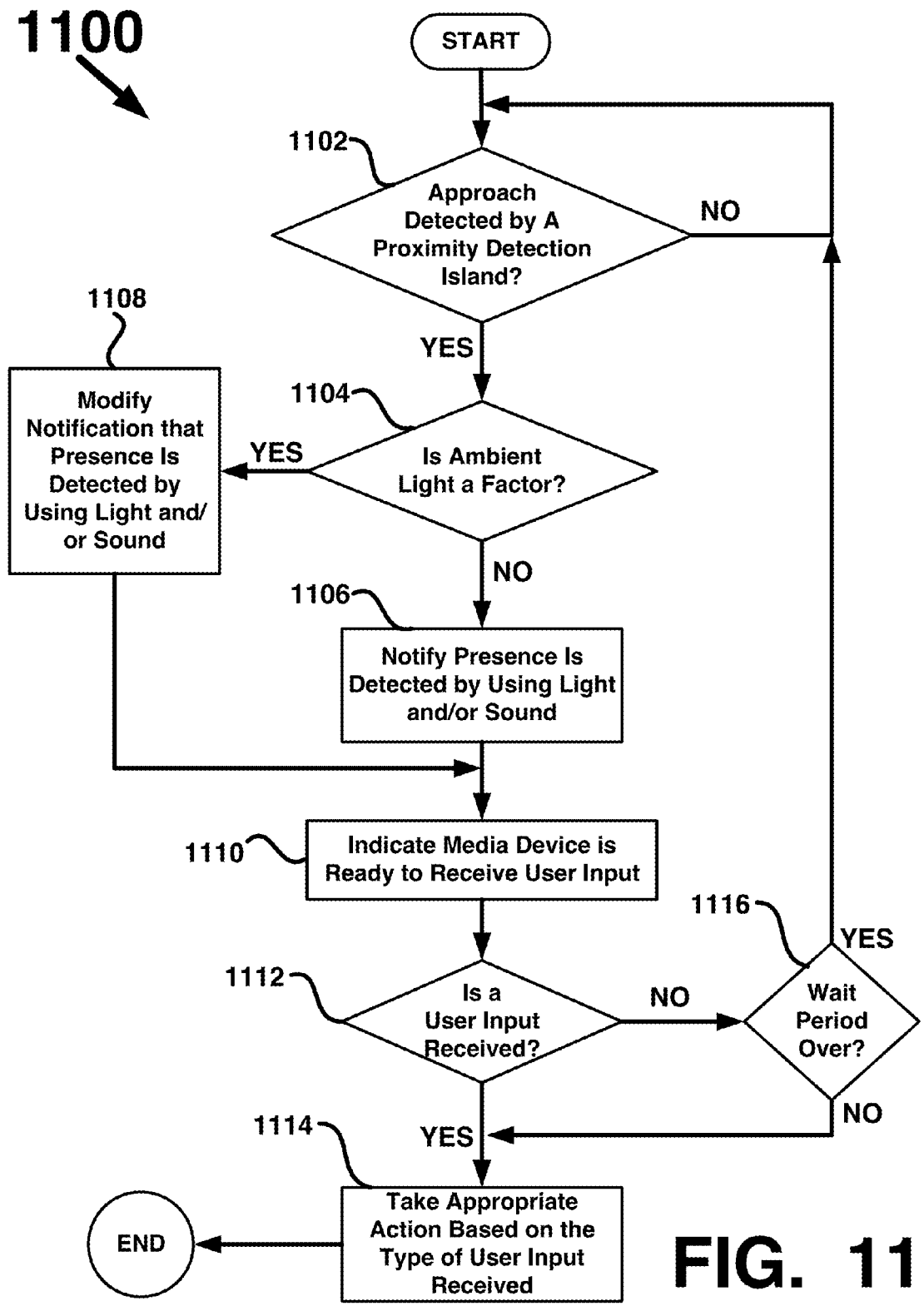
FIG. 11 depicts another example of a flow for presence detection, notification, and media device readiness according to embodiments of the present application.

FIG. 11 depicts another example of a flow 1100 for presence detection, notification, and media device readiness. At a stage 1102 a query as to whether an approach is detected by one or more of the proximity detection islands (e.g., I1, I2, I3, I4) is made. If one or more of the proximity detection islands have detected presence, then a YES branch is taken. If no presence is detected by one or more of the proximity detection islands, then a NO branch is taken and the flow 1100 may return to the stage 1102 to wait for one or more of the proximity detection islands to detect a presence. The YES branch takes flow 1100 to a stage 1104 where a query is made as to whether or not ambient light (e.g., ambient light 630 as detected by ALS 618 of FIG. 6) is a factor to be taken into consideration in the media devices response to having detected a presence at the stage 1102. If ambient light is not a factor, then a NO branch is taken and the flow 1100 continues to a stage 1106. If ambient light is a factor, then a YES branch is taken and flow 1100 continues at a stage 1108 where any notification by media device 100 in response to detecting presence at the stage 1102 is modified. One or more of light, sound, or vibration may be used by media device 100 to indicate to a user that its presence has been detected. The light, sound, or vibration are altered to comport with the ambient light conditions, such as described above in regard to ambient light 630 in FIG. 9, for example. At the stage 1106, notification of presence being detected occurs using one or more of light, sound, or vibration without modification. At a stage 1110, the media device 100 indicates that it is ready to receive input from a user and/or user device (e.g., user 201 or a user device 220 via RF 107). At a stage 1112 a query is made as to whether or not an input is received from a user. If an input is received from the user and/or user device, then a YES branch is taken to a stage 1114 where the media device 100 takes an appropriate action based on the type of user input received and the flow may terminate after the stage 1114. If no input is received from the user and/or user device, then a NO branch is taken and the flow 1110 may continue at a stage 1116 where flow 1100 may enter into a wait period of predetermined time (e.g., of approximately 15 seconds or one minute, etc.). If a user input is received before the wait period is over, then a NO branch may be taken to the stage 1114. If the wait period is over, then a YES branch may be taken and flow 1100 may resume at the stage 1102. Actions taken at the stage 1114 may include those described above in reference to FIG. 10.

Figure 12:
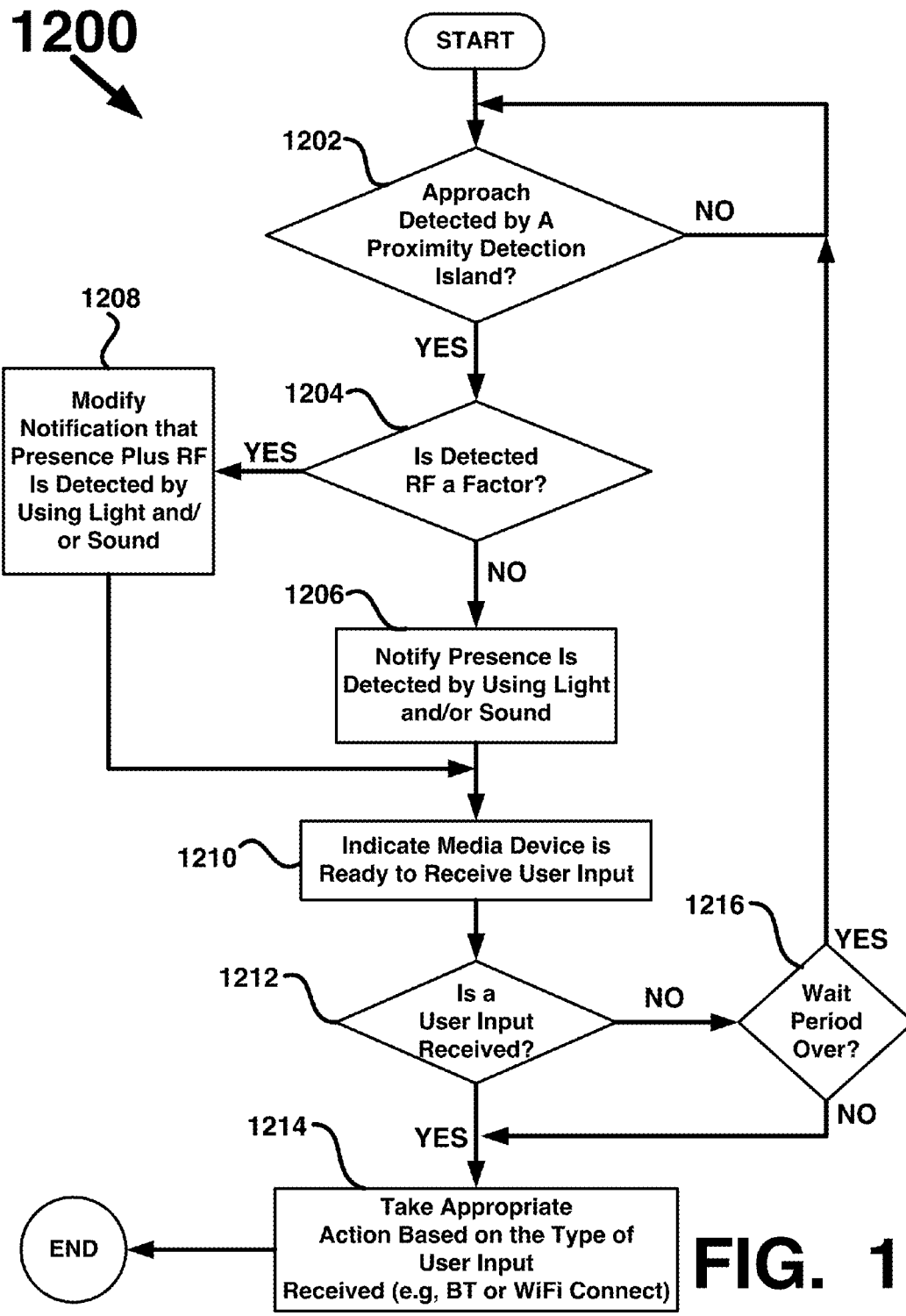
FIG. 12 depicts yet another example of a flow for presence detection, notification, and media device readiness according to embodiments of the present application.

FIG. 12 depicts yet another example of a flow 1200 for presence detection, notification, and media device readiness. At a stage 1202 a query as to whether an approach is detected by one or more of the proximity detection islands (e.g., I1, I2, I3, I4) is made. If one or more of the proximity detection islands have detected presence, then a YES branch is taken. If no presence is detected by one or more of the proximity detection islands, then a NO branch is taken and the flow 1200 may return to the stage 1202 to wait for one or more of the proximity detection islands to detect a presence. The YES branch takes flow 1200 to a stage 1204 where a query is made as to whether or not detection of RF (e.g., by RF 107 using antenna 124) is a factor to be taken into consideration in the media devices response to having detected a presence at the stage 1202. If RF detection is not a factor, then a NO branch is taken and the flow 1200 continues to a stage 1206. If RF detection is a factor, then a YES branch is taken and flow 1200 continues at a stage 1208 where any notification by media device 100 in response to detecting presence at the stage 1202 is modified. One or more of light, sound, or vibration may be used by media device 100 to indicate to a user that its presence has been detected. The light, sound, or vibration are altered to comport with the detection of RF (e.g., from a user device 220), such as described above in regards to user device 220 in FIG. 9, for example. At the stage 1206, notification of presence being detected occurs using one or more of light, sound, or vibration without modification. At a stage 1210, the media device 100 indicates that it is ready to receive input from a user and/or user device (e.g., user 201 or a user device 220 via RF 107). At a stage 1212 a query is made as to whether or not an input is received from a user. If an input is received from the user and/or user device, then a YES branch is taken to a stage 1214 where the media device 100 takes an appropriate action based on the type of user input received and the flow may terminate after the stage 1214. If no input is received from the user and/or user device, then a NO branch is taken and the flow 1200 may continue at a stage 1216 where flow 1200 may enter into a wait period of predetermined time (e.g., of approximately 15 seconds or one minute, etc.). If a user input is received before the wait period is over, then a NO branch may be taken to the stage 1214. If the wait period is over, then a YES branch may be taken and flow 1200 may resume at the stage 1202. Actions taken at the stage 1214 may include those described above in reference to FIGS. 9 and 10.

Figure 13:
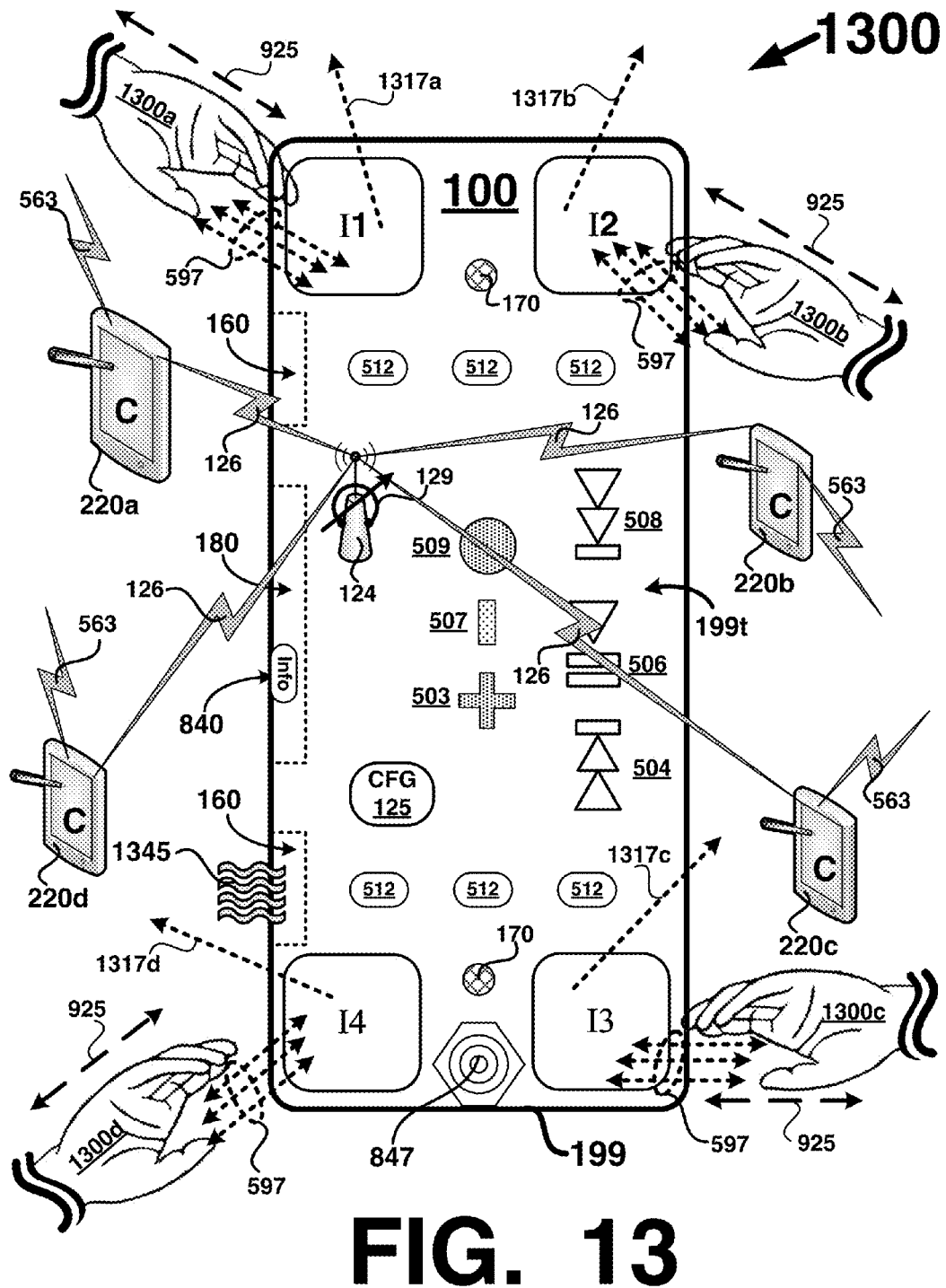
FIG. 13 depicts one example of presence detection using proximity detection islands and/or other systems responsive to wireless detection of different users and/or different user devices according to embodiments of the present application.

FIG. 13 depicts one example 1300 of presence detection using proximity detection islands and/or other systems responsive to wireless detection of different users (e.g., hands 1300*a-d*) and/or different user devices (e.g., 220*a*-220*d*). In FIG. 13 four users denoted by hands 1300*a-d* and their respective user devices 220*a*-220*b* enter 925 proximity detection range of one or more of the proximity detection islands (I1, I2, I3, I4). Although four users and four user devices are depicted, there may be more or fewer than depicted in FIG. 13. Detection of user devices 220*a*-220*b* may be through a wireless communication system, such as RF 107 (e.g., via antenna 124/129) and its various transceivers wirelessly communicating 126 or wirelessly detecting RF 563 from those user devices. For example, considering just one of the users and one of the user devices, hand 1300*b* enters 925 detection range of proximity detection island I2 and is detected 597 by island I2. Island I2 notifies user via light 1317*b* that his/her presence has been detected. User device 220*b* may be carried by the user at the same time or at approximately the same time as the user's presence is detected by island I2. Therefore, RF 107 may detect RF 563, may attempt to wirelessly connect 126, or be in wireless 126 communications with user device 220*b*. Accordingly, notifications and actions described above in regards to flow 1200 of FIG. 12 may occur in media device 100 in response to detecting presence 597 at or near the same time as detecting RF from a user device. Media device 100 may emit sound 1345, vibrate 847, display information info on DISP 180, generate light 1317*a*-1317*d*, await actuation of one or more of the control elements 503-512, or other action(s), for example. At the same time or at different times, other users denoted by hands 1300*a*, 1300*c*, and 1300*d* may be detected 597 by one or more of the proximity detection islands (I1, I2, I3, I4) along with RF 563 from user devices 220*a*, 220*c*, and 220*d* being detected by RF 107. Media device 100 may take appropriate action(s) and make appropriate notification(s) as described herein in response to proximity detection and RF detection occurring in close time proximity to one another, simultaneously, nearly simultaneously, or in some sequence. In that a range for RF transmissions may typically be greater than a detection range for the proximity detection islands (I1, I2, I3, I4), in some examples the RF signatures or signals of user device 220*a-d* may be detected by RF 107 before the proximity detection islands (I1, I2, I3, I4) detect presence of the users 1300*a-d*. For example, RF 107 may detect RF 563 before the user device emitting RF 563 is approximately 10 meters or more away from media device 100 (e.g., for BT transmissions) or much more than 10 meters away for other wireless technologies (e.g., for WiFi transmissions). Therefore, in some examples, RF 107 will detect RF signals prior to proximity detection islands (I1, I2, I3, I4) detecting presence 597.

Users devices 220*a*-220*d* may be pre-registered or otherwise associated or known by media device 100 (e.g., via CFG 125 or other) and the actions taken and notifications given by the media device 100 may depended on and may be different for each of the user devices 220*a*-220*d*. For example, after detection and notification based on detecting proximity 597 and RF 563 for user device 220*a*, media device 100 may establish or re-establish BT pairing (e.g., via BT 120 in RF 107) with 220*a* and content C on 220*a* (e.g., a phone conversation) may be transferred to media device 100 for handling via SPK 160 and MIC 170. CFG 125 and/or APP 225 on 220*a* may affect how media device and user device 220*a* operate post detection.

As another example, post detection 597 & 563 and notification for user device 220*d* may result in content C (e.g., music from MP3 files) on 220*d* being played back 1345 on media device 100. Control elements 503-512 may be activated (if not already activated) to play/pause (506), fast forward (508), fast reverse (504), increase volume (503), decrease volume (507), or mute volume (509). Control elements 512 may be used to select among various play lists or other media on user device 220*d*.

In another example, content C on user device 220*c* may, post detection and notification, be displayed on DISP 180. For example, a web page that was currently being browsed on 220*c* may be transferred to media device 100 for viewing and browsing, and a data payload associated with the browsing may also be transferred to media device 100. If content C comprises a video, the display and playback functions of the video may be transferred to media device 100 for playback and control, as well as the data payload for the video.

Content C this is transferred to media device 100 may be transferred back in part or whole to the user devices depicted, when the user is no longer detectable via islands to proximity detection islands (I1, I2, I3, I4) or other systems of media device 100, by user command, or by user actuating one of the control elements 503-512 or an icon or the like on DISP 180, for example.

Figure 14:
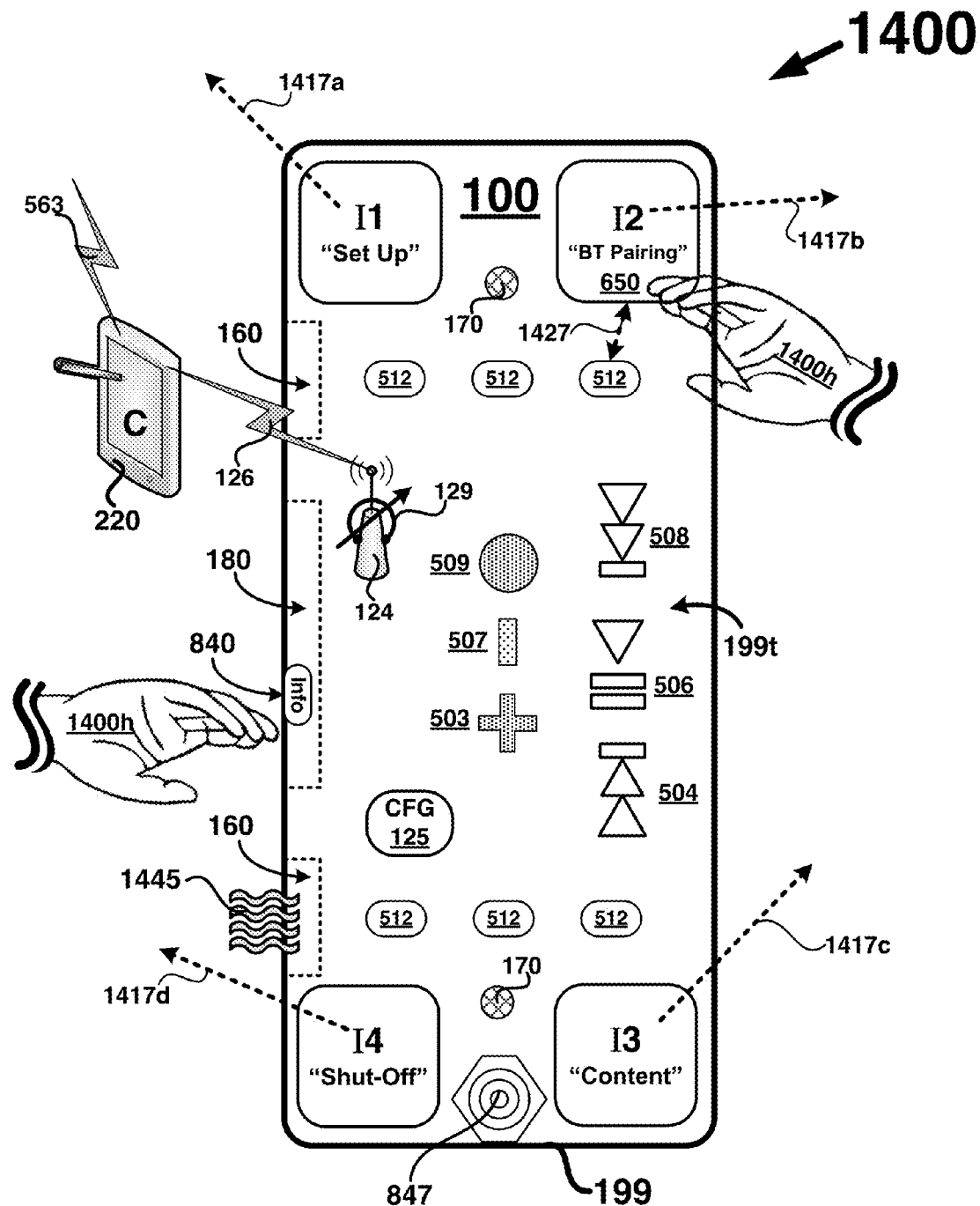
FIG. 14 depicts one example of proximity detection islands associated with specific device functions according to embodiments of the present application.

FIG. 14 depicts one example 1400 of proximity detection islands associated with specific device functions. Examples of functions that may be assigned to or fixed to a proximity detection island (I1, I2, I3, I4) include but are not limited to "Set Up" of media device 100, "BT Paring" between media device 100 and one or more BT equipped devices, "Shut-Off" of media device 100 (e.g., power off or placing media device 100 in a standby mode, a low power consumption mode, or a sleep mode), and "Content" being handled by media device 100, such as the last media filed that was played on, the last buffered channel, the last playlist that was being accessed by, or the last Internet site or stream being handled by media device 100. One or more of proximity detection islands (I1, I2, I3, I4) may serve as indicators for the functions associated with them or may serve to actuate those functions by pressing or touching a surface of the island (e.g., as a switch or capacitive touch switch or button, see FIG. 6). For example, a finger of hand 1400*h* may touch structure 650 of island I2 to activate the "BT Pairing" between the media device 100 and user device 220, the touch activating the capacitive touch function of island I2 (e.g., causing island 12 to serve as a switch). Island I2 may emit light 1417*b* to acknowledge the touch by hand 1400*h*. CFG 125 and/or APP 225 may be used to assign and re-assign functions to one or more of the proximity detection islands (I1, I2, I3, I4) and the functions assigned and the proximity islands they are assigned to may be user dependent and/or user device dependent. As another example, pressing or touching island I4 may turn power off to the media device 100, or may place media device 100 in a low power, standby, or sleep mode.

In other examples, one or more of the control elements 503-512 or an icon or the like on DISP 180 may be actuated or selected by a user in connection with one of the functions assigned to proximity detection islands (I1, I2, I3, I4). For example, to activate the "BT Pairing" function of island I2, control element 512 that is nearest 1427 to island I2 may be actuated by the user. In another example, proximity detection islands (I1, I2, I3, I4) may be associated with different users whose presence has been detected by one or more of the islands. For example, if proximity of four users (U1, U2, U3, U4) has been detected by any of the islands, then U1 may be associated with I4, U2 with I1, U3 with I2, and U4 with I3. Association with an island may be used to provide notifications to the user, such as using light from RGB LED 616 to notify the user of status (e.g., BT pairing status) or other information.

Figure 15:
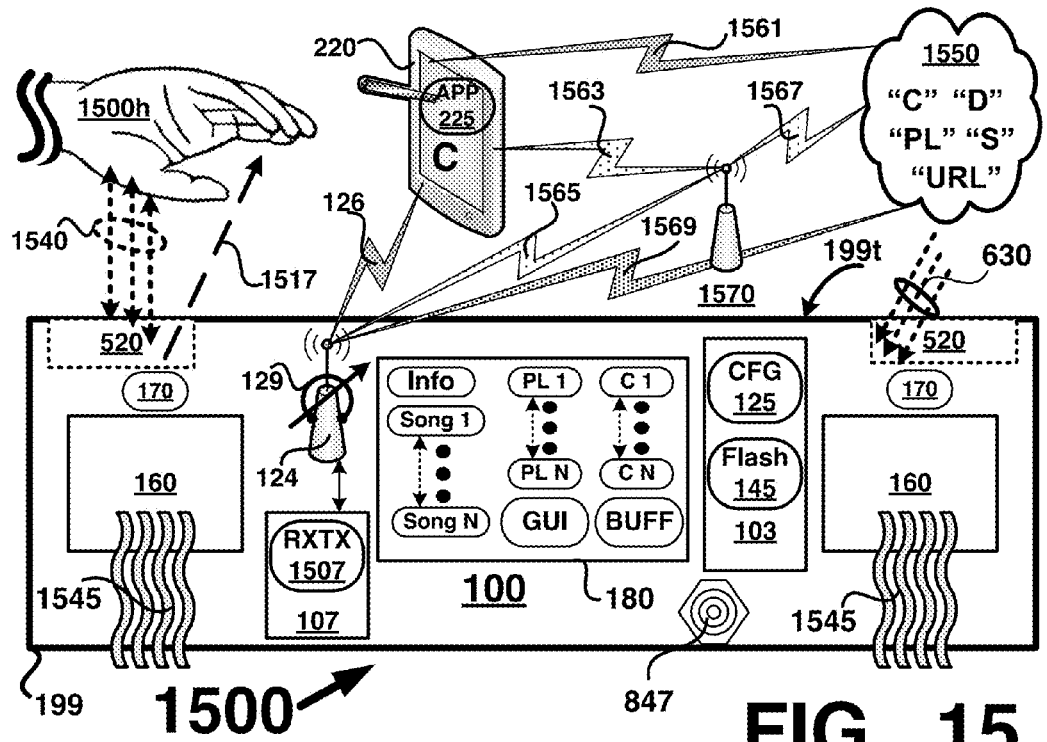
FIG. 15 depicts one example of content handling from a user device subsequent to proximity detection according to embodiments of the present application.

FIG. 15 depicts one example 1500 of content handling from a user device subsequent to proximity detection by islands 520 and/or wireless systems of media device 100. User 1500*h* is detected 1540 by proximity detection island 520 which emits light 1517, sound 1545, vibration 847, and display of information info on DISP 180 to indicate that media device 100 has detected presence and is ready to receive user input. User device 220 may also have been detected by a transceiver RXTX 1507 in RF 107. RXTX 1507 may represent any transceiver in RF 107 such as BT 120, WiFi 130, AH 140, or other 150. Media device 100, post detection, may be wirelessly connected with user device 220 using a variety of wireless paths such as a direct wireless connection 126 between media device 100 and user device 220, and wireless connections 1565 and 1563 via wireless router 1570, for example. Content C on user device 220 may be handled or otherwise stored or routed to media device from the user device 220 or from Cloud 1550 using a variety of wireless paths. Cloud 1550 may represent the Internet, an intranet, a server farm, a download site, a music store, and application store, Cloud storage, a web site, just to name a few. Information including but not limited to content C, data D, a playlist PL, a stream or streaming service S, and a URL, just to name a few. Although content C is depicted as being presently on user device 220, one or more of the information in Cloud 1550 may also be presently on user device or wirelessly accessible to user device 220 via wireless connections 1561, 1563, 1567, 126, 1569, and 1565. Some of the wireless connections may be made through wireless router 1570 or media device 100 (e.g., via WiFi 130).

In some examples, content C or other information resident or accessible to user device 220 may be handled by media device 100. For example, if C comprises media files such as MP3 files, those files may be wirelessly accessed by media device 100 by copying the files to DS 103 (e.g., in Flash memory 145) thereby taking the data payload and wireless bandwidth from the user device 220 to the media device 100. Media device 100 may use it wireless systems to access 1569 or 1565 and 1567 the information from Cloud 1550 and either store the information locally in DA 103 or wirelessly access the information as it is played back or otherwise consumed or used by media device 100. APP 225 and CFG 125 may include information and executable instructions that orchestrate the handling of content between media device 100, user device 220, and Cloud 1550. For example, a playlist PL on user device 220 may be located in Cloud 1550 and media files associated with music/videos in the PL may be found at URL in Cloud 1550. Media device 100 may access the media files from the location specified by the URL and wirelessly stream the media files, or media device may copy a portion of those media files to DS 103 and then playback those files from its own memory (e.g., Flash 145).

In other examples, user 1500*h* may be one of many users who have content to be accessed and/or handled by media device 100. Post detection, songs, play lists, content, of other information on user device 220 or from Cloud 1550 may be placed in a queue with other information of similar type. The queue for songs may comprise Song 1 through Song N and songs on user device 220 that were active at the time of proximity detection may be placed in some order within the queue, such as Song 4 for being fourth in line in queue for playback on media device 100. Other information such as play lists PL 1-PL N or other content such as C 1-C N may be placed in a queue for subsequent action to be taken on the information once it has moved to the top of the queue. In some examples, the information on user device 220 or from Cloud 1550 may be buffered in media device 100 by storing buffered data in DS 103.

Figure 16:
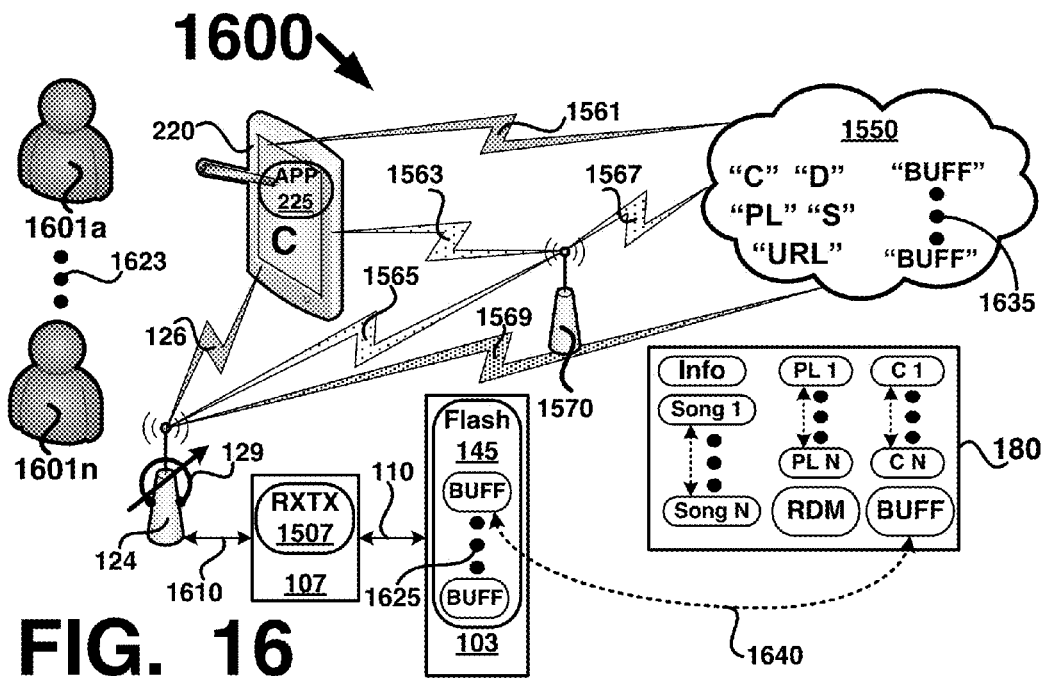
FIG. 16 depicts another example of content handling from user devices subsequent to proximity detection according to embodiments of the present application.

FIG. 16 depicts another example of content handling from user devices subsequent to proximity detection. In FIG. 16, a plurality of users 1601a-1601n and their associated user device 220 are detected by media device 100 are queued into DS 103 on media device 100 for handling or are buffered BUFF into DS 103 in some order. Detection of each user and or user device may be indicated with one or more different colors of light 1517, different sounds 1545, different vibration 847 patterns, or different info on DISP 180. In some examples, buffering BUFF occurs in storage 1635 provided in Cloud 1550.

In FIG. 16, users 1601a-1601n have information on their respective user devices 220 that may be handled by media device 100 such as Song 1-Song N, PL 1-PL N, C 1-C N. The information from the plurality of users 1601a-1601n is queue and/or buffered BUFF on media device 100 and/or in Cloud 1550, that is, media device may handle all of the information internally, in Cloud 1550, or some combination of media device 100 and Cloud 1550. For example, if a data storage capacity of the information exceeds a storage capacity of DS 103, then some or all of the data storage may be off loaded to Cloud 1550 (e.g., using Cloud storage or a server farm). Information from users 1601a-1601n may be played back or otherwise handled by media device 100 in the order in which proximity of the user was detected or in some other order such as a random order or a shuffle play order. For example, DISP 180 may have an icon RDM which may be selected for random playback.

Figure 17:
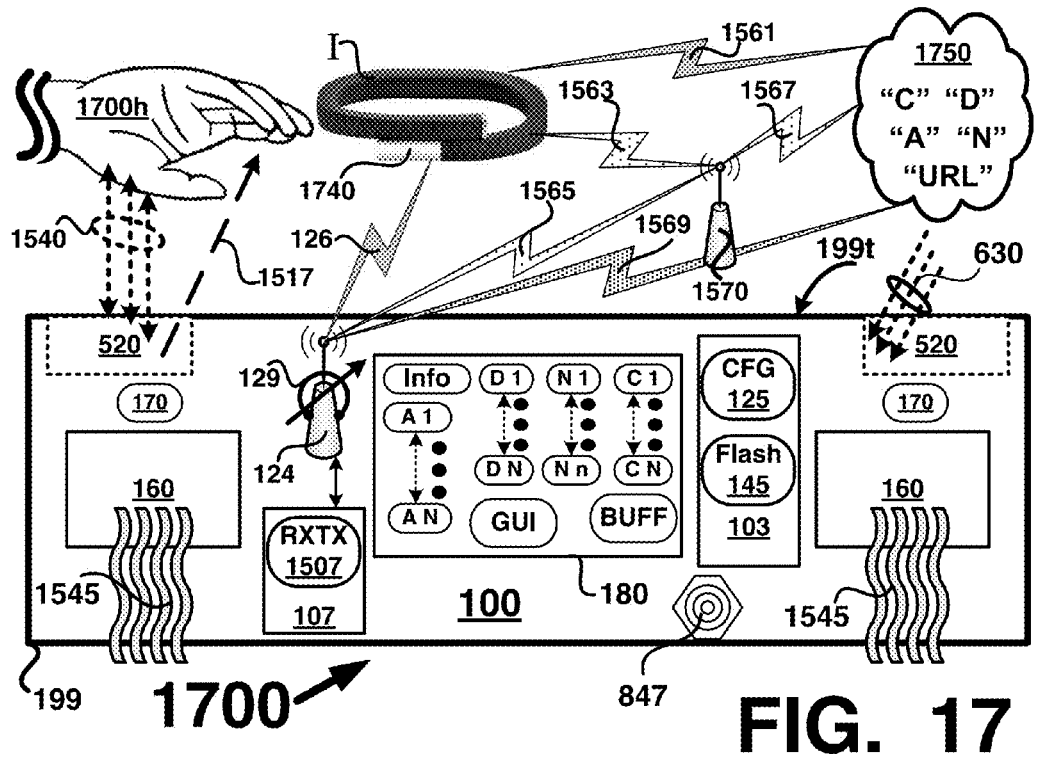
FIG. 17 depicts one example of content handling from a data capable wristband or wristwatch subsequent to proximity detection according to embodiments of the present application.

FIG. 17 depicts one example of content handling from a data capable wristband or wristwatch subsequent to proximity detection by a media device. A hand 1700h of a user may comprise a user device in the form of a data capable wristband or wristwatch denoted as 1740. Wristband 1740 may include information "I" that is stored in the wristband 1740 and is wirelessly accessible using a variety of wireless connections between media device 100, wireless router 1570, and Cloud 1750. Media device 100 may serve as a wireless hub for wristband 1740 allowing wristband 1740 to send and retrieve information from Cloud 1750 via wireless connections between media device 100 and wireless router 1570 and/or Cloud 1750. For example, wristband 1740 may use BT to wirelessly communicate with media device 100 and media device 100 uses its WiFi 130 to wirelessly communicate with other resources such as Cloud 1750 and router 1570. Detection 1540 of hand 1700h and/or device 1740 may trigger the emission of light 1517, generation of sound 1545, vibration 847, and display of information info on DISP 180.

Information "I" included in wristband 1740 may include but is not limited to alarms A, notifications N, content C, data D, and a URL. Upon detection of proximity, any of the information "I" may be wirelessly communicated from wristband 1740 to media device 100 where the information "I" may be queued (A 1-A N; D 1-D N, N1-N n; and C 1-C N) and/or buffered BUFF as described above. In some examples, post detection, wristband 1740 may wirelessly retrieve and/or store the information "I" from the media device 100, the Cloud 1750, or both. As one example, if wristband 1740 includes one or more alarms A, post detection those alarms A may be handled by media device 100. Therefore, if one of the alarms A is set to go off at 6:00 pm and detection occurs at 5:50 pm, then that alarm may be handled by media device 100 using one or more of DISP 180, SPK 160, and vibration 847, for example. If another alarm is set for 5:30 am and the wristband 1740 and media device 100 are still in proximity of each another at 5:30 am, then the media device 100 may handle the 5:30 am alarm as well. The 6:00 pm and 5:30 am alarms may be queued in the alarms list as one of A 1-AN. When wristband 1740 and media device 100 are no longer in proximity of each other, any alarms not processed by media device 100 may be processed by wristband 1740.

Figure 18:
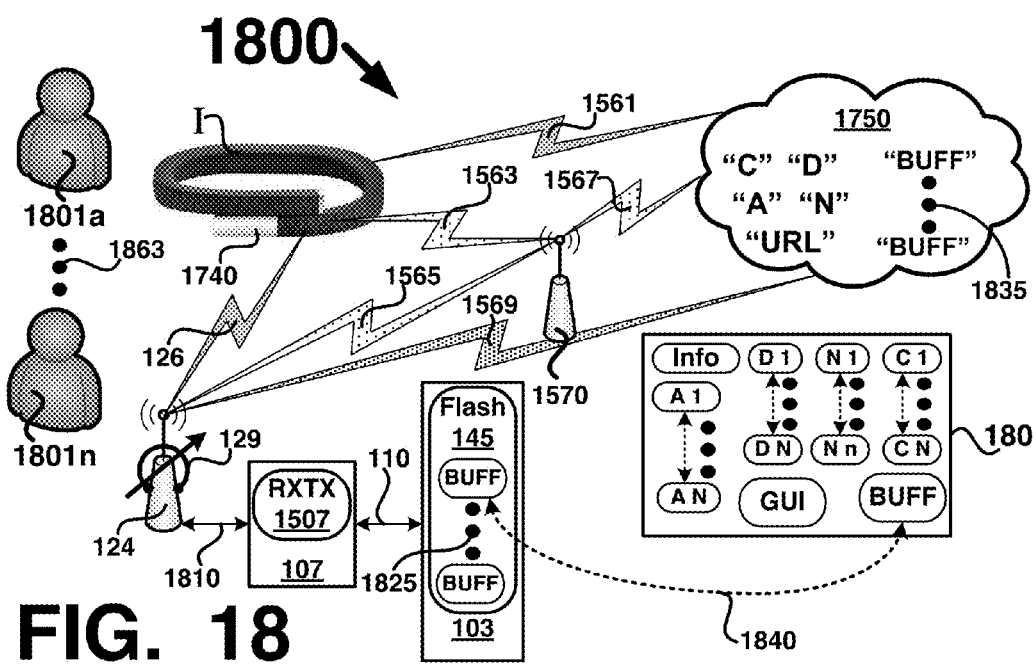
FIG. 18 depicts another example of content handling from a data capable wristband or wristwatch subsequent to proximity detection according to embodiments of the present application.

In FIG. 18, a plurality of users 1801 a-1801n and their respective wristwatches 1740 are detected by one or more proximity detection islands 520 of media device 100 and/or or other systems such as RF 107. Detection of each user and or device 1740 may be indicated with one or more different colors of light 1517, different sounds 1545, different vibration 847 patterns, or different info on DISP 180. Here, each wristwatch 1740 includes information "I" specific to its user and as each of these users and wristwatches come into proximity and are detected, information "I" may be queued, buffered BUFF, or otherwise stored or handled by media device 100 or in Cloud 1750. For example, data D may include exercise, nutrition, dietary data, and biometric information collected from or sensed via sensors carried by the wristwatch 1740. Data D may be transferred to media device 100 or Cloud 1750 and accessed via a URL to a web page of a user. The data D may be shared among other users via their web pages. For example, some or all of users 1801a-1801n may be consent to sharing their information "I" through media device 100, Cloud 1750, or both. Users 1801a-1801n may view each other's information "I" on DISP 180 or go to a URL in Cloud 1750 or the like to view each other's information "I". Information "I" that is displayer on DISP 180 may be buffered BUFF, queued (A 1-A N; D 1-D N, N1-N n; and C 1-C N), or otherwise stored on media device 100 (e.g., in DS 103) for each user to query as desired. A non-transitory computer readable medium such as CFG 125 and/or APP 225 may be used to determine actions taken by wristwatch 1740 (e.g., via APP 225) and media device (e.g., via CFG 125).

Figure 19:
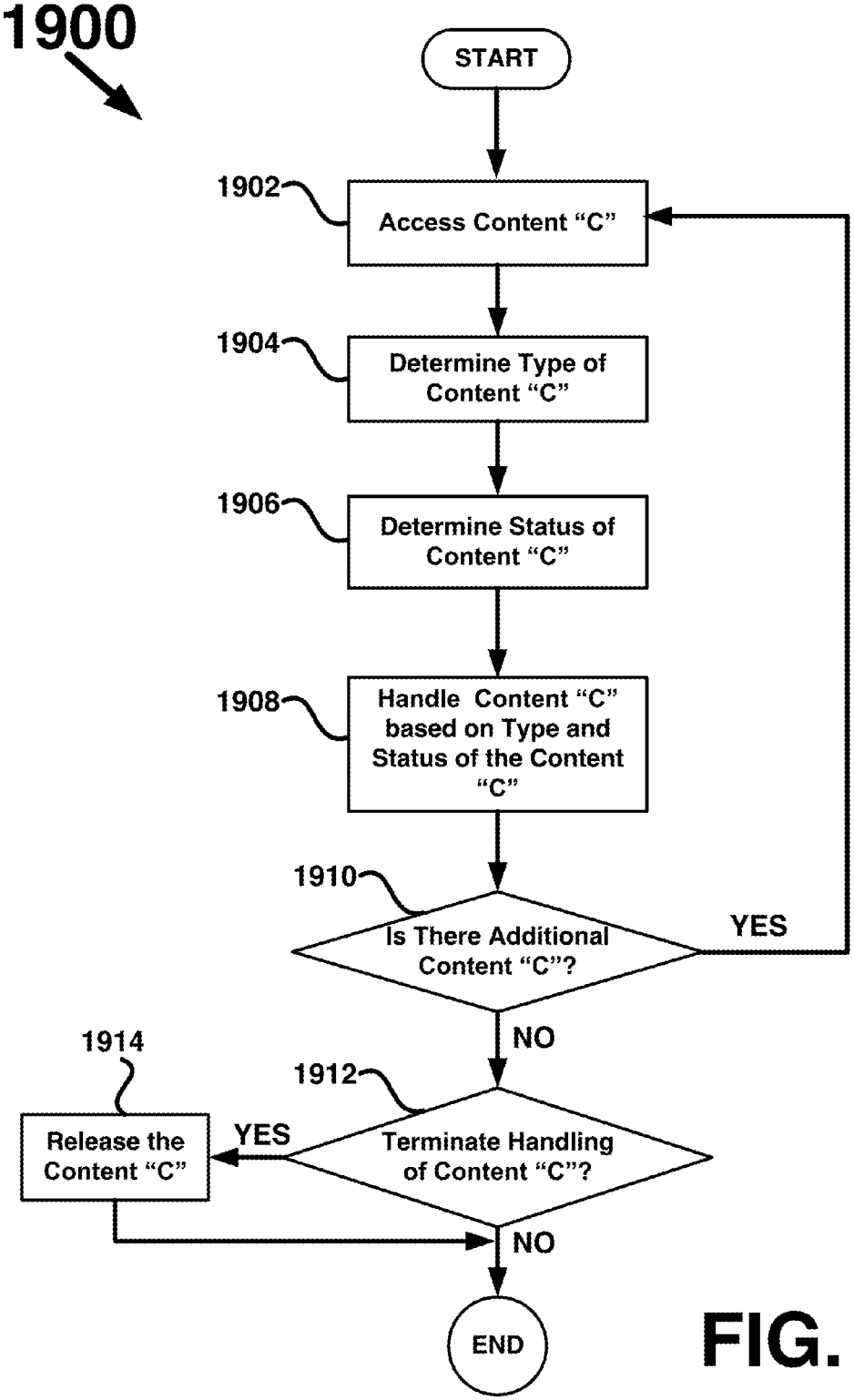
FIG. 19 depicts one example of a flow for content handling on a media device post proximity detection according to embodiments of the present application.

In FIG. 19, one example of a flow 1900 for content C handling on a media device 100 or other location, post proximity detection includes the media device 100 accessing the content C at a stage 1902. Here, accessing may include negotiating the necessary permissions, user names and passwords, or other tasks necessary to gain access to the content C on a user device or located elsewhere (e.g., in the Cloud, on a website, or on the Internet). Accessing the content C may include wirelessly connecting with the user device or other source of the content C. At a stage 1904 the media device 100 makes a determination is made as to the type of the content C, such as a media file (e.g., music, video, pictures), a web page (e.g., a URL), a file, a document (e.g., a PDF file), for example. At a stage 1906 the media device 100 makes a determination as to a status of the content C. Examples of status include but are not limited to static content C (e.g., a file) and dynamic content C (e.g., a stream or a file currently being accessed or played back). At a stage 1908 the media device 100 handles the content C based on its type and status from stages 1904 and 1906.

In that there may be many user devices to service post proximity detection or more than one item of content C to be handled from one or more user devices, at a stage 1910 media device 100 queries the user devices to see if there is additional content C to be handled by the media device 100. If additional content exists, then a YES branch may be taken and flow 1900 may return to stage 1902. If no additional content C is to be handled, then a NO branch may be taken and at a stage 1912 a decision to terminate previously handled content C may be made. Here, a user device may have handed over content C handling to media device 100 post proximity detection, but when the user device moves out of RF and/or proximity detection range (e.g., the user leaves with his/her user device in tow), then media device 100 may release or otherwise divorce handling of the content C. If previously handled content C does not require termination, then a NO branch may be taken and flow 1900 may end. On the other hand, if previously handled content C requires termination, then a YES branch may be taken to a stage 1914 were the previously handled content C is released by the media device 100. Release by media device 100 includes but is not limited to wirelessly transferring the content C back to the user device or other location, deleting the content C from memory in the media device 100 or other location, saving, writing or redirecting the content C to a location such as /dev/null or a waste basket/trash can, halting streaming or playback of the content C, storing the content C to a temporary location, just to name a few.

Figure 20:
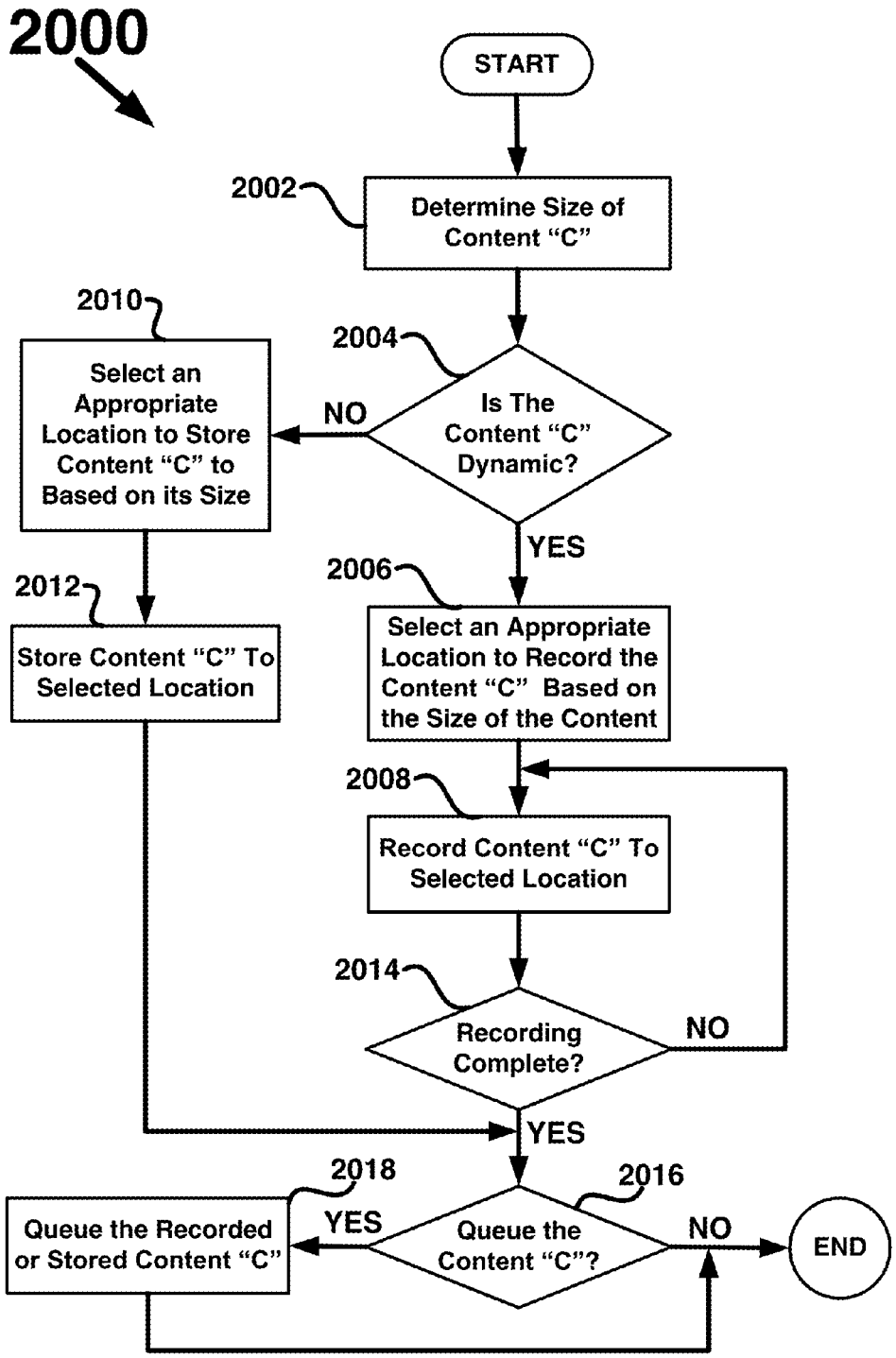
FIG. 20 depicts one example of a flow for storing, recording, and queuing content post proximity detection according to embodiments of the present application.

FIG. 20 depicts one example of a flow 2000 for storing, recording, and queuing content C on a media device 100 or other location post proximity detection. After content C has been handled by media device 100 (e.g., stage 1908 of FIG. 19), media device 100 may determine a size (e.g., file size) of the content C at a stage 2002. The size determination may be made in order for the media device 100 to determine if the media device 100 has the memory resources to handle and/or store the content C. If the media device 100 cannot accommodate content C due to size, then media device 100 may select another source for the content C or access the content from the user device or other location where it is stored. At a stage 2004 the media device 100 determines whether or not the content C is dynamic. Examples of dynamic content C include but are not limited to content C on a user device that is currently being accessed or played back on the user device. The dynamic content C may reside on the user device or may be accessed from another location (e.g., the Cloud or Internet). If the content C is not dynamic (e.g., is static such as file), then a NO branch may be taken to a stage 2010 where the media device 100 selects an appropriate location to store content C based on its size from the stage 2002. Examples of appropriate locations include but are not limited to a user device, the Cloud, the Internet, an intranet, network attached storage (NAS), a server, and DS 103 of media device 100 (e.g., in Flash memory 145). In some examples, media device 100 may include a memory card slot for a SD card, microSD card, Memory Stick, SSD, CF card, or the like, or a USB connector that will accommodate a USB thumb drive or USB hard drive, and those memory devices may comprise an appropriate location to store content C. At a stage 2012 the content C is stored to the selected location. If the content C is dynamic, then a YES branch may be taken to a stage 2006 where memory device 100 selects an appropriate location to record the dynamic content C to based on the size of the content C. Appropriate locations include but are not limited to those described above for the stage 2010. At a stage 2008 the media device 100 records the dynamic content to the selected location. The selected location may be a buffer such as BUFF described above. At a stage 2014 a determination may be made as to whether or not the recording is complete. If the recording is not complete, then a NO branch may be taken and flow 2000 may return to the stage 2008. If the recording is complete, then a YES branch may be taken to a stage 2016 where a decision to queue the content C is made. If the content C is not to be queued, then a NO branch may be taken and the flow 2000 may end. If the content C is to be queued then a YES branch may be taken and at a stage 2018 the recorded content C or stored content C (e.g., from stage 2012) is queued. Queuing may occur as described above in reference to FIGS. 15-18. Media device 100 may maintain the queue in memory, but the actual content C need not be stored internally in memory device 100 and may be located at some other location such as the Cloud or a user device, for example.

At the stage 2008, the media device 100 may playback other content C (e.g., an mp3 or mpeg file) while recording the content C to the selected location. For example, if three users (U1-U3) approach media device 100 with their respective user devices, are detected by one or more of the proximity detection islands (e.g., I1, I2, I3, I4) and/or by RF 107, then post detection, media device 100 may begin to handle the content C from the various user devices as described in reference to FIGS. 19 and 20. However, assume for purposes of explanation, that users U1 and U3 have static content C to be handled by media device 100 and user U2 has dynamic content C. Furthermore, assume that queuing of the content C may not be in the order in which media device 100 detected the user devices, and that order is U2, U3, U1. Now, per flows 1900 and 2000, media device 100 begins to record and store the dynamic content C from U2 (e.g., U2 was streaming video); however, the recording is not complete and media device 100 handles the content C from U1 next, followed by the content C of U3. Content C from U1 comprises a playlist for songs stored in the Cloud and C from U3 comprises alarms A, notifications N, and data D from a data capable wristband/wristwatch. Media device 100 handles and stores the content C from U3 in its internal memory (e.g., DS 103) and queues U3 content first for display, playback, or other on media device 100. Media device 100 accesses the songs from U1's playlist from the Cloud and queues U1 next in the queue behind U3 for playback on the SPK 160 of media device 100. Finally, the recording is complete on U2's dynamic content C and the video stream is recorded on NAS and media device 100 has accesses to the NAS via WiFi 130. U2 is queued behind U1 for playback using DISP 180 and SPK 160 of media device 100. In some examples, where there are not conflicts in handling content C, the media device may display U3's content C on DISP 180 while playing back U1's mp3 songs over SPK 160, even thou U1 is behind U3 in the queue. Here, there is no or minimal conflict in handling content C because U1's content is primarily played back using the media device's 100 audio systems (e.g., SPK 160) and U3's content C is primarily visual and is displayed using the media device's 100 video systems (e.g., DISP 180). Servicing content C from U3 and U1 at the same time may mean temporarily bumping visual display of U1's playlist on DISP 180 to display U3's content C.

Figure 21:
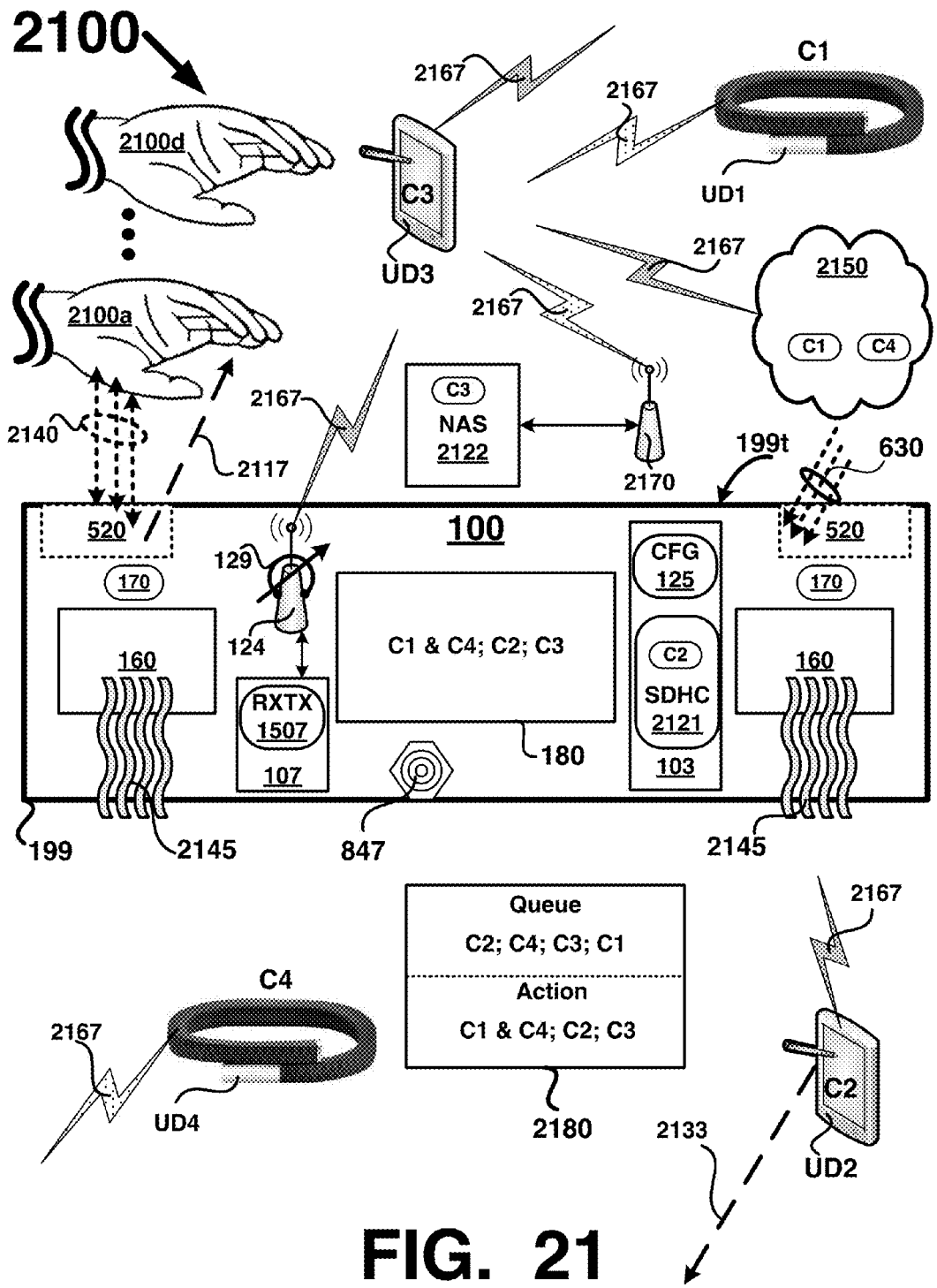
FIG. 21 depicts one example of a media device handling, storing, queuing, and taking action on content from a plurality of user devices according to embodiments of the present application.

Moving now to FIG. 21 where one example 2100 of a media device 100 handling, storing, queuing, and taking action on content from a plurality of user devices is depicted. In FIG. 21, four users denoted by hands 2100*a-d* move within proximity detection range of islands 520, are detected 2140, and the users are notified 2117 of the detection, as described above. The four users 2100*a-d* each have their respective user devices UD1-UD4 having content C1-C4. For purposes of explanation, assume the order in which the user devices are discovered by the media device (e.g., via RF 107) is UD2; UD4; UD3; and UD1 and the content C on those devices are queued in the same order as the detection as denoted by C2; C4; C3; and C1 in diagram 2180. The media device 100, the user devices UD1-UD4, wireless router 2170, and Cloud 2150 are all able to wirelessly communicate with one another as denoted by 2167.

C2 comprises a playlist and songs, is static, and each song is stored in a mp3 file in memory internal to UD2. As per the flows 1900 and 2000, media device queues C2 first and stores C2 in a SDHC card 2121 such that the playlist and mp3 files now reside in SDHC 2121. C1 and C4 both comprise information stored in a data capable wristband/wristwatch. Cb1 and C4 are static content. Media device queues C4 behind C2, and stores C4 in Cloud 2150. C3 comprises dynamic content in the form of an audio book being played back on UD3 at the time it was detected by media device 100. C3 is queued behind C4 and is recorded on NAS 2122 for later playback on media device 100. C1 is queued behind C3 and is stored in Cloud 2150.

However, the queuing order need not be the order in which content C is played back or otherwise acted on by media device 100. In diagram 2180, media device has ordered action to be taken on the queued content in the order of C1 and C4 first, C2 second and C3 third. C3 may be third in order because it may still be recording to NAS 2122. The information comprising C1 and C4 may be quickly displayed on DISP 180 for its respective users to review. Furthermore, the size of data represented by C1 and C4 may be much smaller than that of C2 and C3. Therefore, while C3 is recording to NAS 2122 and C2 is being copied from UD2 into SDHC 2121, action is taken to display C1 and C4 on DISP 180. Action is then taken on C2 and a portion of the playlist from C2 is displayed on DISP 180 with the song currently being played highlighted in that list of songs. The music for the song currently being played is output on SPK 160. Finally, the recording of C3 is completed and DISP 180 displays the title, author, current chapter, and publisher of the audio book. Action on C3 may be put on hold pending C2 completing playback of the songs stored in SDHC 2121.

Here, media device 100 handled the various types of content C and operated on one type of content (recording C3) while other content (C1 & C4, C2) were being acted on, such as displaying C1 and C4 or playback of mp3 files from C2. In FIG. 21, if UD2 moves 2133 out of RF range of media device 100, C2 may be released from the queue and action on C2 may stop and the next item of content in the queue is acted on (e.g., C3). FIG. 21 is a non-limiting example and nothing precludes one of the users taking action to change the queuing order or the order in which the media device acts on queued content. Moreover, CFG 125 and/or APP 225 may be used to determine content queuing and an order in which queued content is acted on by media device 100. One of the users may have super user capability (e.g., via that user's APP 225 and/or CFG 125) that allows the super user to override or otherwise control content handling on media device 100.

Figure 22:
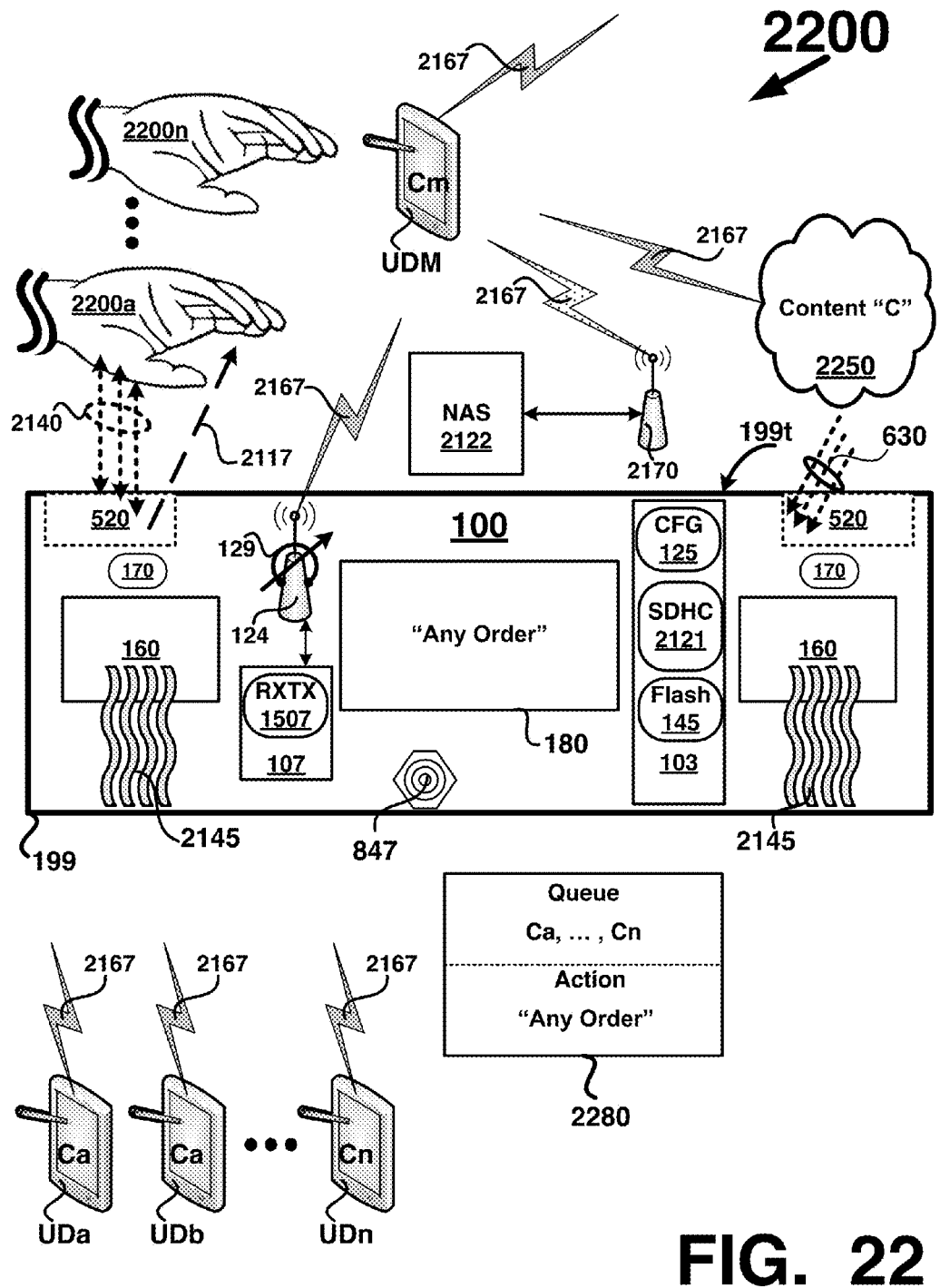
FIG. 22 depicts another example of a media device handling, storing, queuing, and taking action on content from a plurality of user devices according to embodiments of the present application.

FIG. 22 depicts another example 2200 of a media device handling, storing, queuing, and taking action on content from a plurality of user devices. Here, a plurality of users 2200a-2200n have approached media device 100 and have been detected by a proximity island 520. A plurality of user devices UDa-UDn, having content Ca-Cn, are in wireless communications 2167 as described above. In diagram 2280, the content Ca-Cn from the user devices is queued in the order the user devices were detected by media device 100. Content Ca-Cn may be stored and/or accessed by media device 100 from any location that may be directly accessed or wirelessly accessed by media device 100 such as in DS 103 (directly accessed), NAS 2122, the user devices UDa-UDn, the Cloud 2250, etc.

Media device 100 may take action on the queued content in any order including but not limited to random order, the order in which it is queued, or commanded order, just to name a few. Media device 100 may be configured to operate in a "party mode" where each of the users 2200a-2200n in proximity of the media device 100 desires to have their content played back on the media device 100. Media device 100 may harvest all of the content and then act on it by randomly playing back content from Ca-Cn, allowing one of the users to control playback, like a DJ, or allowing a super user UDM to control playback order and content out of Ca-Cn. One of the users may touch or otherwise actuate one of the control elements 503-512 and/or one of the proximity detector islands 520 or an icon on DISP 180 to have their content acted on by media device 100. Content in Ca-Cn may be released by media device 100 if the user device associated with that content moves out of RF range of the media device 100.

Figure 23:
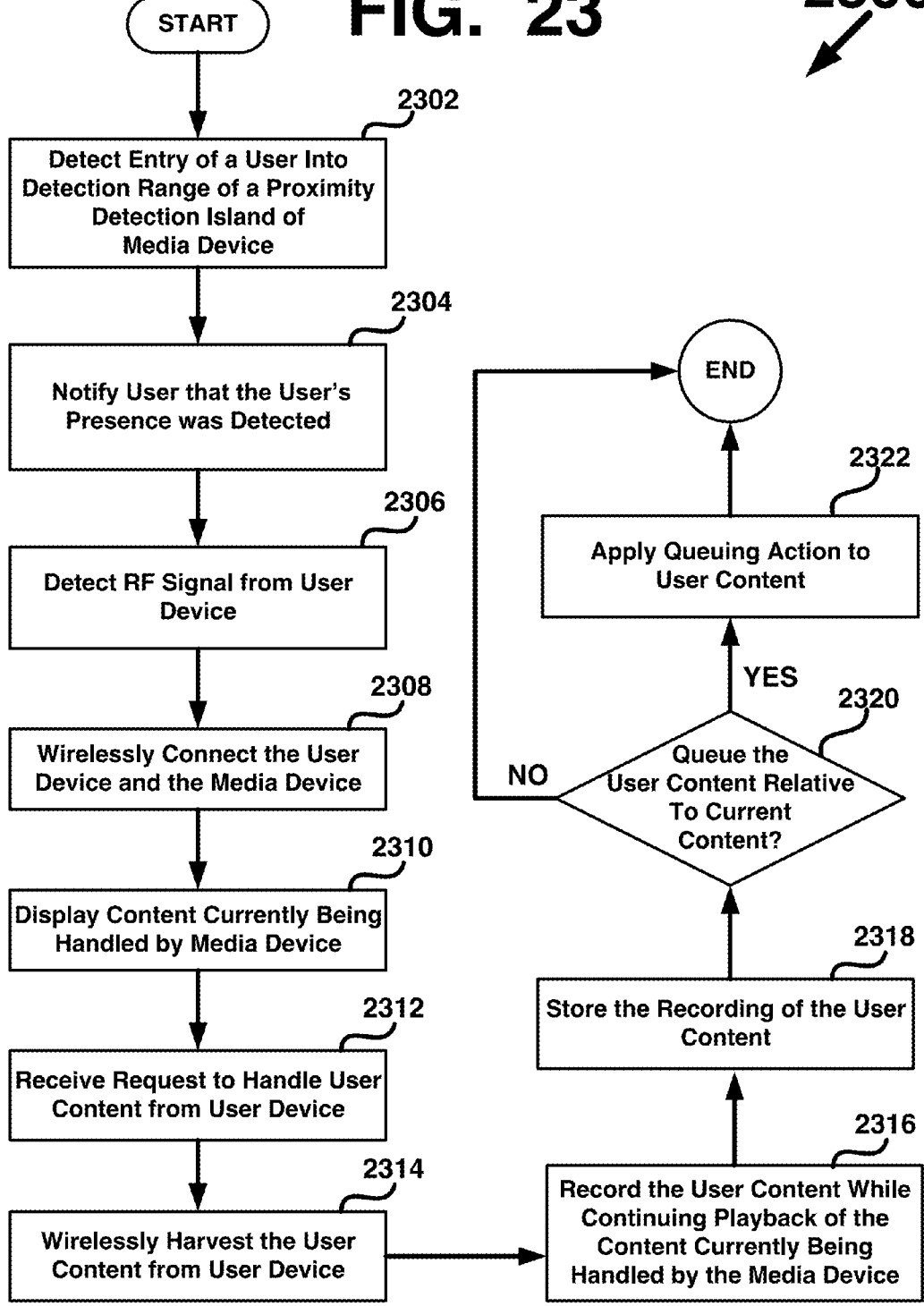
FIG. 23 depicts one example of a flow for recording user content on a media device while the media device handles current content according to embodiments of the present application.

In FIG. 23, a flow 2300 for recording user content on a media device while the media device handles current content is depicted. At a stage 2302 entry of a user (e.g., hand of a user) into detection range of a proximity detection island 520 of media device 100 is detected. At a stage 2304 the user is notified that media device 100 has detected the user's presence (e.g., using light, sound, vibration, etc.). At a stage 2306, media device 100 may use RF system 107 to detect RF signals being transmitted by a user device (e.g., 220) as described above. At a stage 2308, the media device 100 and the user device wirelessly connect with each other (e.g., using WiFi 130 or BT 120). At a stage 2310 content currently being handled by media device 100 (e.g., being played back or queued for playback) is displayed on the media device 100 (e.g., DISP 180) or on a display of the user device, or both, for example. APP 225 or other software and/or hardware may be used to display the current content being handled on media device 100 on the user device. At as stage 2312, a request from the user device to the media device 100 for the media device 100 to handle user content from the user device is received. At a stage 2314, the media device 100 harvests the user content from the user device (e.g., wirelessly copies, streams, or otherwise accesses the user content). The user content may reside on the user device or may be located elsewhere at a location the media device 100 or user device may access, such as the Cloud, the Internet, an intranet, NAS, or other, for example. At a stage 2316 the media device 100 begins recording the user content while continuing playback of the content currently being handled by the media device 100. As was described above in reference to FIG. 22, the media device 100, based on a size of the user content (e.g., file size in MB or GB) may record the user content to memory internal to the media device 100 or to a location external to the media device 100 (e.g., NAS, the Cloud, a server, the Internet). Content that was being handled by the media device 100 continues with little or no interruption while the user content is recorded. At a stage 2318 the user content is stored as described above and flow 2300 may terminate at the stage 2318. Optionally, at a stage 2320, a determination may be made to queue the user content relative to the current content being handled by the media device 100. If no queuing action is to be taken, then a NO branch may be taken and the flow 2300 may terminate. However, if the user content is to be queued, then a YES branch may be taken to a stage 2322 where a queuing action is applied to the user content. Queuing action may mean any action taken by the media device 100 (e.g., via controller 101, CFG 125, hardware, or software) and/or user device (e.g., via APP 225) that affects the queuing of content on the media device 100.

Queuing action may include but is not limited: to waiting for the user content to complete recording and then placing the user content in a queuing order relative to other content already queued on the media device 100 (e.g., at the back of the queue); bumping content presently at the front of the queue once the user content has completed recording and beginning playback of the recorded user content; placing the user content behind the content currently being handled by the media device 100 such that the user content will be next in line for playback; moving the user content to the front of the queue; randomly placing the user content in the queue; allowing the user of the user device to control the queuing of the user content; allowing a DJ or other user to control the queuing of the user content; and allowing each user that is detected by the proximity detection islands, have one or more items in their content harvested and pushed to the top of the queue or placed next in line in the queue; and placing the user content in a queue deck with other content, shuffling the deck and playing on of the items of content from the deck, and reshuffling the deck after playback of item; just to name a few.

Content, including the user content that was recorded may be queued in a party mode where each user who wants their content played back on the media device 100, approaches the media device 100, is detected by the proximity detection islands, receives notification of detection, has at least one selected item of user content harvested by the media device 100, and has the item of user content played back either immediately or after the current content being played back finishes. In some examples, the queue for content playback on media device 100 is only two items of content deep and comprises the current piece of content being played back and the user content of the user who approached the media device 100 and had their content harvested as described above.

Figure 24:
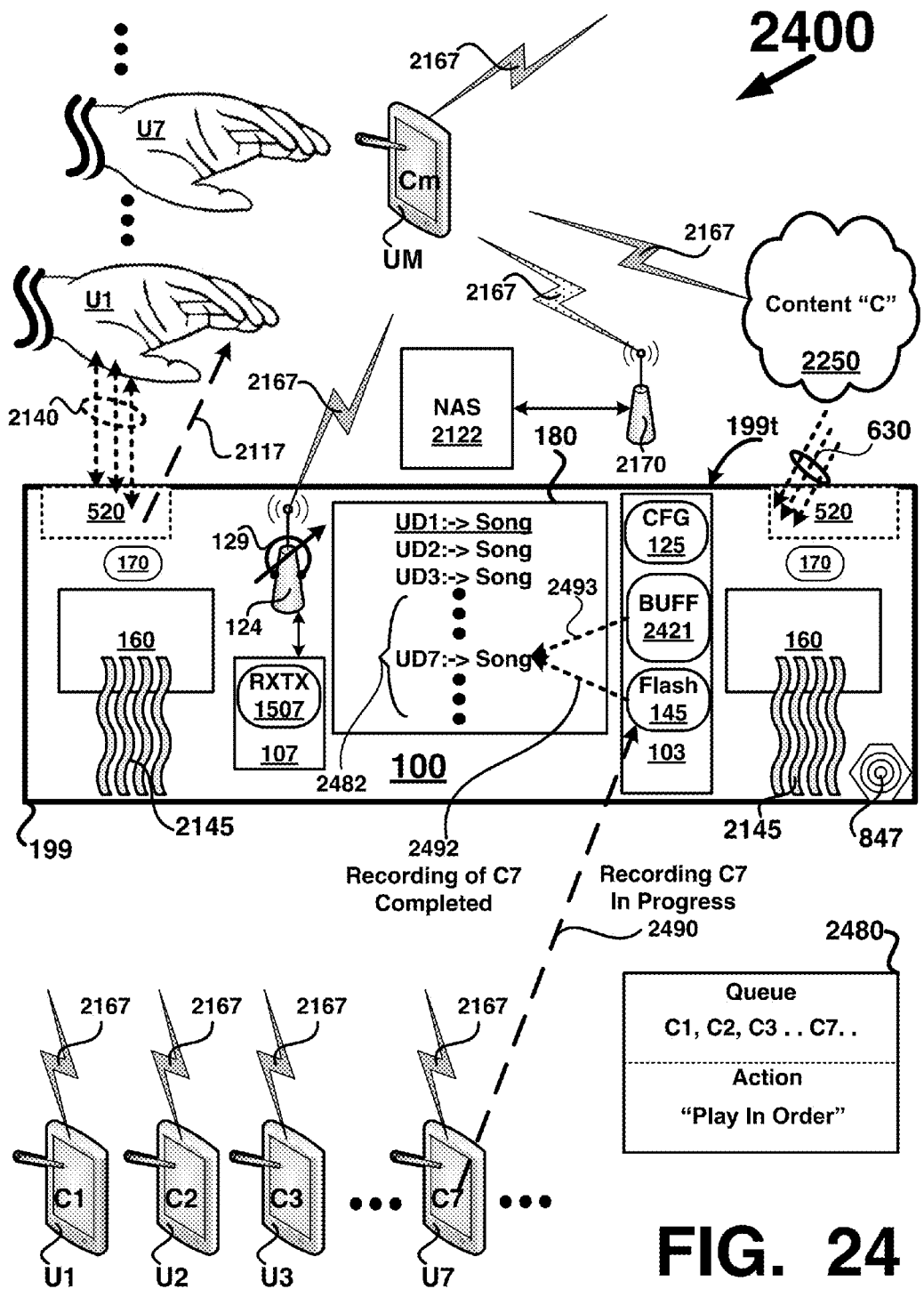
FIG. 24 depicts one example of queuing action for user content in a queue of a media player according to embodiments of the present application.

Now referencing FIG. 24, one example 2400 of queuing action for user content in a queue of a media player is depicted. In example 2400 there are at least seven users U1-U7 and at least seven user devices UD1-UD7. For purposes of simplifying the description, assume that all seven users have approached media device 100, have been detected 2140 and notified 2117 by proximity island 520, and all user devices have been detected and wirelessly connected with media device 100. Here user content C1, C2, and C3 has been queued in queue 2480 and DISP 180 is displaying the queued order of the playlist as Song for UD1 currently being played back because it is underlined (e.g., over SPK 160), with Songs for UD2 and UD3 being next in the playlist. User content for UD1-UD3 may reside in DS 103 or other location such as NAS 2122 or Cloud 2250. User devices UD1-UD3, in that order, were the first three devices to wirelessly connect and have their user content C1-C3 harvested by media device 100. The Action for the queuing order in queue 2480 is "Play In Order", so C1 is first, C2 is second, and C3 is third in the playback order as displayed on DISP 180. At some point in time, UD7 also wirelessly connected and had its user content C7 harvested by media device 100. Media device 100 begins the process of recording 2490 the content into DS 103 (e.g., into Flash 145). In the meantime, other user devices (not shown) may also have their user content harvested. In that the recording 2490 of C7 is still in progress, intervening user content will be placed ahead of C7 until C7 has completed 2492 recording 2492. Upon completion of recording, C7 is positioned 2482 in the playlist below some already queued user content and ahead or other user content lower in the queue. In other examples, C7 may be queued in the order it was presented to the media device 100 and the media device 100 begins the recording 2490 process and allows C7 to be played back when it moves to the top of queue, but if C7 has not completed recording 2492, then media device 100 begins the playback 2493 of C7 from a buffer BUFF 2421 where a portion of recorded C7 is stored. The playback from BUFF 2421 may continue until the recording catches up with the buffered content or is completed 2492.

As described above, one of the users or user devices may have super user (e.g., UM) or other form of override authority and that user may order the queue to their liking and control the order of playback of user content. Queue 2480 and/or the user content being queued need not reside in memory internal to media device 100 and may be located externally in NAS 2122, a USB Hard Drive, Cloud 2250, and a server, just to name a few. In some examples, media device 100 may delete or bump user content from queue 2480 if the wireless connection 2167 between media device 100 and the user device is broken or interrupted for a predetermined amount of time, such as two minutes, for example. The "Play In Order" example depicted is a non-limiting example and one skilled in the art will appreciate that the queuing may be ordered in a variety of ways and may be determined by executable program code fixed in a non-transitory medium, such as in DS 103, Flash 145, CFG 125, and APP 225, just to name a few. Therefore, controller 101 or a controller in a user device may execute the program code that determines and controls queuing of user content on the media device 100.

Although the foregoing examples have been described in some detail for purposes of clarity of understanding, the above-described conceptual techniques are not limited to the details provided. There are many alternative ways of implementing the above-described conceptual techniques. The disclosed examples are illustrative and not restrictive.

What is claimed is:

1. A method for radio frequency (RF) communication between wireless devices, comprising:
broadcasting over at least one RF band, packets included in an active wireless scan transmitted by a wireless client;
receiving the packets in a wireless media device configured to decode packet data included in one or more of the packets;
calculating RF signal strength of at least some of the packets to determine a near field communication (NFC) distance between the wireless client and the wireless media device, wherein RF signal strength from the calculating increases with decreasing NFC distance;
establishing a NFC link between the wireless client and the wireless media device when RF signal strength from the calculating is indicative of physical contact between the wireless client and the wireless media device; and
transferring content, content handling or both from the wireless client to the wireless media device using information wirelessly communicated between the wireless client and the wireless media device using the NFC link.

2. The method of claim 1, wherein the broadcasting occurs irrespective of a RF presence of one or more wireless access points.

3. The method of claim 1, wherein the broadcasting occurs irrespective of one or more wireless communication links between the wireless client and one or more wireless access points.

4. The method of claim 1, wherein the broadcasting occurs irrespective of access credentials between the wireless client and one or more wireless access points.

5. The method of claim 1 and further comprising:
installing an application (APP) embodied in a non-transitory computer readable medium disposed in the wireless client;
executing the APP on a processor of the wireless client; and
calling an application programming interface (API) from the APP during the executing, the API configured to cause the broadcasting, the transferring or both.

6. The method of claim 5, wherein the APP is installed using information wirelessly communicated from the wireless media device using a wireless communications link between the wireless client and the wireless media device.

7. The method of claim 1, wherein the content is active on the wireless client prior to or subsequent to the establishing the NFC link.

8. The method of claim 1, wherein the active scan comprises a wireless (WiFi) active scan using one or more IEEE 802.x wireless communication protocols.

9. The method of claim 1, wherein decoded packet data includes a header.

10. The method of claim 1, wherein decoded packet data includes a data payload.

11. The method of claim 1, wherein the NFC link comprises one or more wireless communications link selected from the group consisting of a Bluetooth (BT) link, a BT low power link, an IEEE 802.x link, an Ad Hoc (AH) link, and a cellular link.

12. The method of claim 1 and further comprising:
initiating playback of at least some of the content from the transferring, using one or more systems of the wireless media device, of one or more other wireless media devices or both.

13. The method of claim 1 and further comprising:
queuing into a queue, content from the transferring by the wireless client, by one or more other wireless clients that also established the NFC link with the wireless media device or both; and
initiating playback of the content from the queue using one or more systems of the wireless media device, of one or more other wireless media devices or both.

14. The method of claim 13, wherein the one or more other wireless media devices are wirelessly linked with one another, are wirelessly linked with the wireless media device or both.

15. The method of claim 1 and further comprising:
verifying an actual physical contact between the wireless client and the wireless media device by analyzing one or more signals from one or more sensors of the wireless media device.

16. A wireless device, comprising:
a controller, and in electrical communication with the controller
a data storage system,
a proximity detection system,
an audio/video (A/V) system, and
a radio frequency (RF) system including a radio in electrical communication with an antenna and configured to receive packets included in an active wireless scan transmitted by a wireless client,
to decode packet data included in one or more of the packets,
to calculate RF signal strength of at least some of the packets to determine a near field communication (NFC) distance between the wireless client and the wireless media device, wherein calculated RF signal strength increases with decreasing NFC, and
to establish a NFC link between another radio in the wireless client device and the radio when calculated RF signal strength is indicative of physical contact between the wireless client and the wireless media device,
wherein content accessible by the wireless client, content being handled by the wireless client or both are transferred to the wireless media device for processing using information wirelessly communicated between the wireless client and the wireless media device using the NFC link.

17. The device of claim 16, wherein the information comprises access credentials for one or more wireless access points (AP) that are transmitted from the wireless media device to the wireless client over the NFC link, and subsequent wireless communications between the wireless media device and the wireless client occur over a wireless link with the one or more wireless AP.

18. The device of claim 16, wherein the wireless media device analyzes one or more signals from one or more sensors to verify an actual physical contact between the wireless client and the wireless media device, and the NFC link is established after the actual physical contact is verified.

19. The device of claim 16, wherein the RF system activates a plurality of radios configured for wireless communication using different protocols, different RF bands or both to passively scan for other RF signals transmitted by the wireless client, and the RF system calculates RF signal strength of one or more of the other RF signals to verify the NFC distance, the contact or both.

20. The device of claim 16, wherein the wireless media device includes location data that is wirelessly communicated to the wireless client using one or more forms of wireless communication selected from the group consisting of a RF link, an acoustic link, an optical link, and an imaging link, the location data is used by the wireless client to install an application (APP) configured to execute on the wireless client, the APP operative to initiate the active wireless scan.

* * * * *